(12) United States Patent
Ota et al.

(10) Patent No.: US 7,659,029 B2
(45) Date of Patent: Feb. 9, 2010

(54) BATTERY MODULE WITH INSULATING PLATES NIPPING ELECTRODE TABS

(75) Inventors: Masayasu Ota, Yokohama (JP); Ryuichi Amagai, Isehara (JP); Taisuke Isonaga, Atsugi (JP); Etsuo Oogami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 478 days.

(21) Appl. No.: 11/257,499

(22) Filed: Oct. 25, 2005

(65) Prior Publication Data

US 2006/0088761 A1 Apr. 27, 2006

(30) Foreign Application Priority Data

Oct. 26, 2004 (JP) .............................. 2004-310545
Dec. 27, 2004 (JP) .............................. 2004-376184

(51) Int. Cl.
H01M 6/46 (2006.01)
H01M 2/24 (2006.01)

(52) U.S. Cl. ........................ 429/152; 429/157; 429/158; 429/160

(58) Field of Classification Search ................. 320/112; 429/175, 159, 152, 96–100
See application file for complete search history.

(56) References Cited

U.S. PATENT DOCUMENTS 5,770,332 A * 6/1998 Narukawa et al. ........... 429/175

| | | | |
|---|---|---|---|
| 7,241,530 B2 * | 7/2007 | Oogami | 429/159 |
| 7,291,422 B2 * | 11/2007 | Oogami et al. | 429/152 |
| 2004/0021442 A1 * | 2/2004 | Higashino | 320/112 |

FOREIGN PATENT DOCUMENTS

| | | |
|---|---|---|
| CN | 1619858 A | 5/2005 |
| EP | 1530247 A2 | 5/2005 |
| JP | 2000-195480 A | 7/2000 |
| JP | 2001-256934 A | 9/2001 |
| JP | 2001-256941 A | 9/2001 |
| JP | 2003-323873 A | 11/2003 |
| JP | 2003-323882 A | 11/2003 |
| JP | 2004-6141 A | 1/2004 |
| JP | 2005-116433 A | 4/2005 |
| JP | 2005-116436 A | 4/2005 |
| KR | 2005-0035112 A | 4/2005 |

* cited by examiner

Primary Examiner—Dah-Wei D Yuan
Assistant Examiner—Maria J Laios
(74) Attorney, Agent, or Firm—Foley & Lardner LLP

(57) ABSTRACT

A battery module has stacked therein a plurality of flat cells each formed by sealing a power generating element with a package member and deriving to the exterior electrode tabs from the package member and has the electrode tabs of the flat cells connected electrically. The battery module includes electrically insulated spacers adapted to nip the electrode tab from the opposite surface sides of the electrode tab along the stacking direction of the plurality of flat cells. The paired spacers nipping the electrode tab include an engaging member adapted to fasten the electrode tab by being passed through the electrode tab along the stacking direction.

21 Claims, 49 Drawing Sheets

BATTERY MODULE WITH INSULATING PLATES NIPPING ELECTRODE TABS

BACKGROUND OF THE INVENTION

1. Field of the Invention

This invention relates to a battery module.

2. Description of Related Art

A flat thin cell which is formed by sealing a power generating element created by laminating positive and negative electrode plates with a package member such as a laminate film and deriving a platelike electrode tab to the exterior from the package member (hereinafter referred to as "flat cell") has been known. In recent years, the practice of producing a battery module of high output and high capacity by stacking a plurality of such flat cells and, at the same time, electrically connecting the individual flat cells in series and/or in parallel has become popular (refer to Unexamined Japanese Patent Publication JP-A-2000-195480 and JP-A-2001-256934).

For the purpose of mounting the battery module on a vehicle, it is desirable to decrease the distance between adjacent flat cells to the fullest possible extent thereby compacting the whole volume of the battery module and as well forming a battery module structure that is less susceptible to the influence of the input of vibration. When a vibration is exerted to bear on the battery module, it may result in inducing concentration of stresses on the parts joining the electrode tabs.

BRIEF SUMMARY OF THE INVENTION

An object of the present invention is to provide a battery module which is less susceptible to the influence of vibrations and is capable of reducing the overall volume.

The battery module of this invention comprises a plurality of flat cells each furnished with a package member sealing a power generating element and a platelike electrode tab derived to the exterior from the package member, the plurality of the flat cells being stacked and the electrode tabs of the flat cells positioned adjacent to each other in a stacking direction to be connected electrically; and insulating plates nipping the electrode tab from the opposite surface sides of the electrode tab along the stacking direction of the plurality of the flat cells and possessing an electric insulating property.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENTS

Now, the embodiments of the present invention will be explained below with reference to the drawings annexed hereto.

First Embodiment

Figure 1:
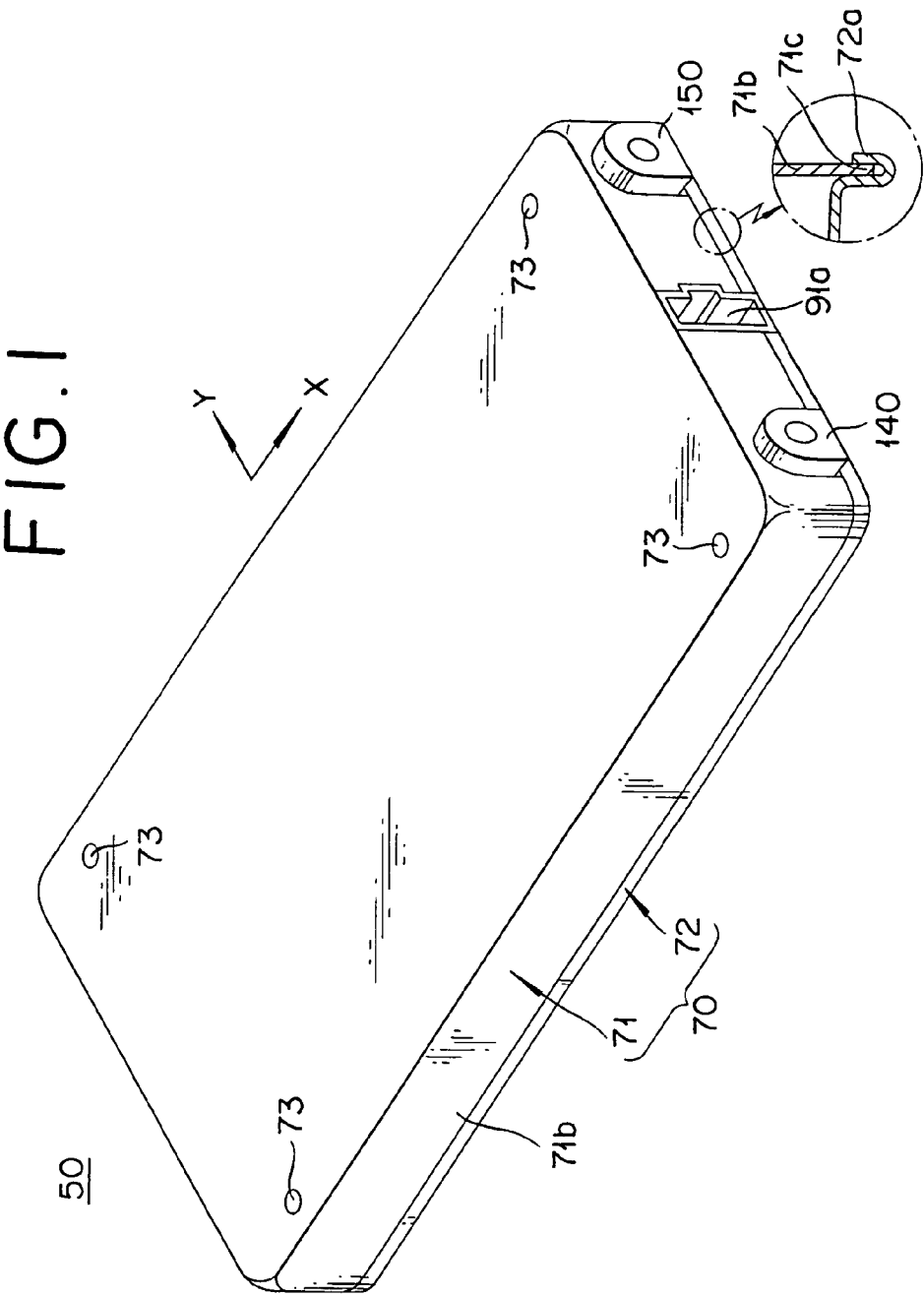
FIG. 1 is a perspective view illustrating a battery module of the first embodiment according to the present invention.

The direction of the X axis shown in FIG. 1 will be referred to as the longer direction of a battery module 50, a cell unit 60, a case 70, etc. and the direction of the Y axis as the shorter direction thereof. Then, the surface situated on the forward side of the longer direction in FIG. 1 will be referred to as the front surface and the surface situated on the rearward side of the longer direction as the rear surface. In the following explanation, the flat cell will be abbreviated simply as "the cell."

Figure 2:
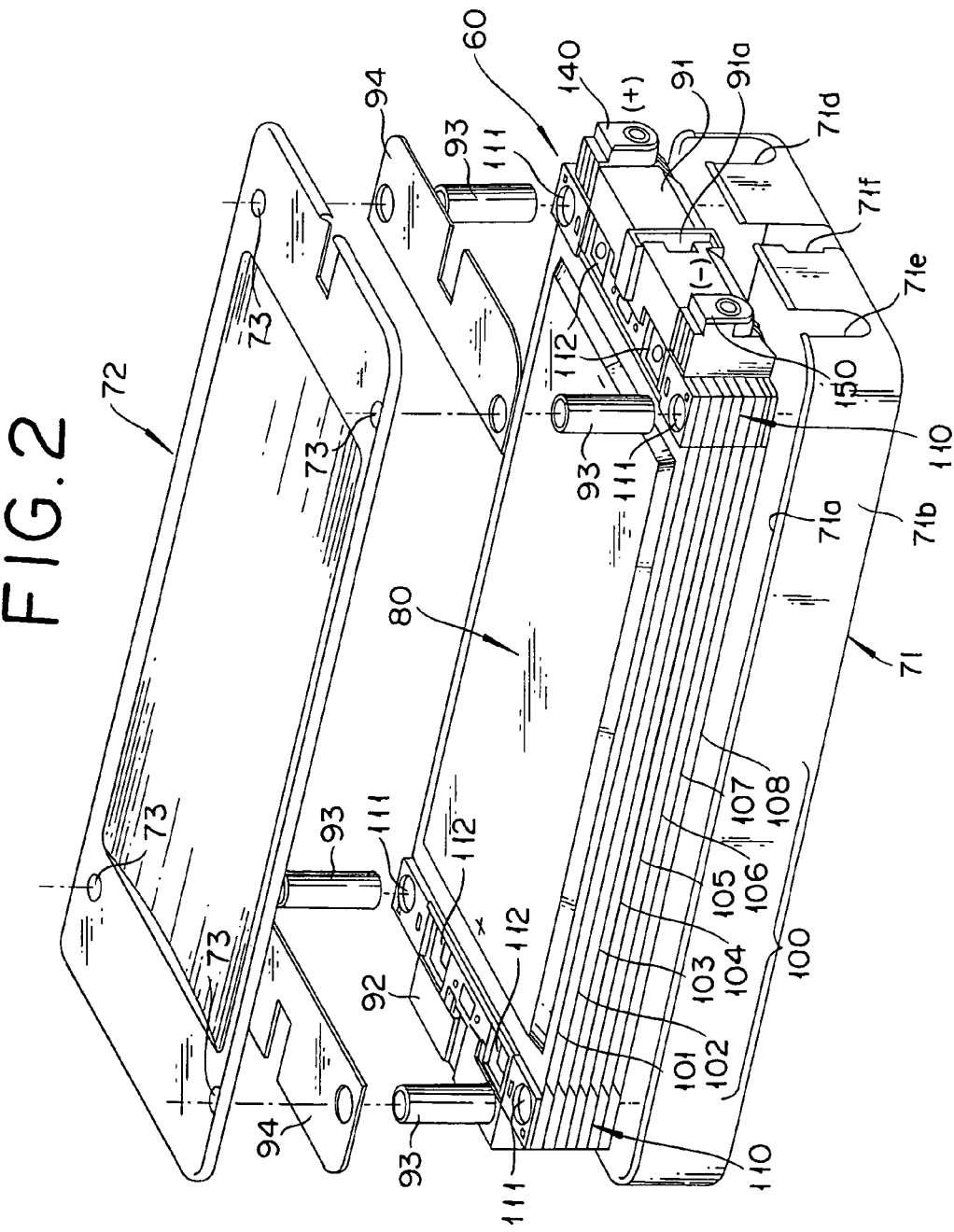
FIG. 2 is a perspective view illustrating the battery module shown in FIG. 1 in a vertically inverted and further exploded state.

Referring to FIG. 1 and FIG. 2, the battery module 50 contains within the case 70 the cell unit 60 which contains a plurality (8 in the illustrated example) of cells 100 (collectively referring to 101-108). The battery module 50 is mounted on a vehicle such as, for example, an automobile or an electric train which may generate a vibration transmitted to the cell unit 60. Though not illustrated, an on-vehicle battery conforming to necessary electric current, voltage, and capacity can be formed by stacking an arbitrary number of battery modules 50 and joining the individual battery modules in serial-parallel connection as well. A proper connecting member such as a bus bar is used when the battery modules 50 are joined in serial-parallel connection. The battery module 50 is cooled with air while in service. The plurality of battery modules 50 are stacked as separated across an empty space with intervening collars. The empty spaces are utilized as an air passageway for enabling air to flow and cool the individual battery modules 50. By causing the cool air to flow down and cool the individual battery modules 50, it is made possible to lower the battery temperature and repress the deterioration of characteristic properties such as the charging efficiency.

The case 70 mentioned above comprises a lower case 71 shaped like a box forming an opening 71a and an upper case 72 constituting a lid member for closing the opening 71a. An edge part 72a of the upper case 72 is rolled round an edge part 71c of a peripheral wall 71b of the lower case 71 by a caulking work. The lower case 71 and the upper case 72 are formed of a steel or aluminum plate a relatively small thickness and each given the shown shape by a press fabrication.

The cell unit 60 mentioned above, as illustrated in FIG. 3-FIG. 9, comprises a cell unit main body 80 formed by stacking cells 100 and joining the individual cells 100 in serial connection and insulating covers 91 and 92 mounted freely detachable to the front surface and the rear surface of the cell unit main body 80.

The cell unit main body 80 further comprises spacers 110 (corresponding to insulating plates) for nipping electrode tabs 100t and positive and negative output terminals 140, 150 (corresponding to battery module terminals). Here, the electrode tabs 100t refer collectively to a positive electrode tab 100p and a negative electrode tab 100m. The positive electrode tabs 100p refer collectively to the positive electrode tabs 101p, 102p, 103p, 104p, 105p, 106p, 107p, and 108p respectively of the cells 101-108 and the negative electrode tabs 100m refer collectively to the negative electrode tabs 101m, 102m, 103m, 104m, 105m, 106m, 107m, and 108m respectively of the individual cells 101-108. Then, the spacers 110 refer collectively to spacers 121-138.

Figure 23A:
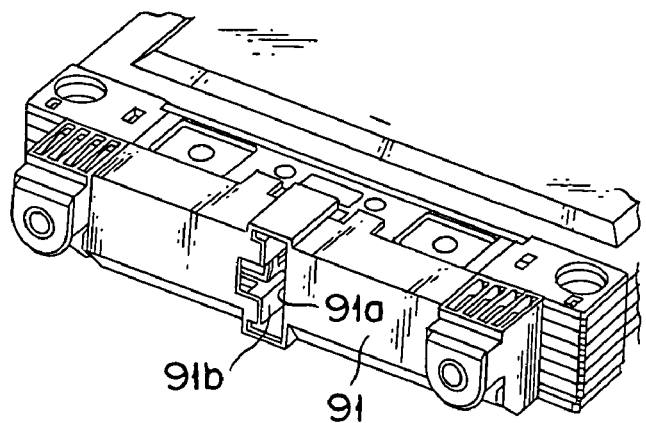
FIG. 23A is a perspective view illustrating the state in which the connector has been extracted from the state of FIG. 22B.

The insulating covers 91 and 92 are used for the purpose of covering the front surface and the rear surface of the cell unit main body 80. The insulating cover 91 and 92 are furnished at the central positions thereof respectively with inserting holes 91a, 92a formed for accepting a connector 170 which will be specifically described herein below (refer to FIG. 23). The connector 170 is connected to a voltage detecting part 160 for detecting the voltage of the cells 100 (refer to FIG. 6, FIG. 7, and FIG. 9). The detection of the voltage is implemented for the purpose of managing the charge and discharge of the battery modules 50. The insulating covers 91, 92 are provided on the inner sides thereof with guide plates 91b, 92b for guiding the insertion and extraction of the connector 170 and on the peripheral edges thereof with a plurality of snap fit claws 91c, 92c for causing the insulating covers 91, 92 to engage with the spacers 110 and the output terminals 140, 150 (refer to FIG. 6-FIG. 8).

Referring again to FIG. 1 and FIG. 2, the positive and negative output terminals 140, 150 are passed through notched parts 71d, 71e formed in part of the peripheral wall 71b of the lower case 71 and led out through the case 70. The insertion holes 91a, 92a of the insulating cover 91, 92 are similarly passed through a notched part 71f formed in part of the peripheral wall 71b and exposed to the exterior of the case 70. For the purpose of inserting bolts (not shown) at four portions in the corner parts of the case 70, bolt holes 73 are formed at four portions in the corner parts of the lower case 71 and the upper case 72 and bolt holes 111 are formed at two portions of each of the spacers 110. The reference numeral 93 in FIG. 2 denotes sleeves to be inserted into the bolt holes 111 of the spacers 110 and the reference numeral 94 denotes buffer members to be interposed between the cell unit 60 and the upper case 72.

The case 70 fixes the positions of the spacers 110 and contains a plurality of cells 100. By causing the bolts to be inserted through the bolt holes 73 of the lower case 71 and the upper case 72 and through the sleeve 93 inserted in the bolt holes 111 of the spacers 110, the positions of the spacers 110 are fixed relative to the case 70. Since the positions of the spacers 110 are fixed because the spacers 110 nip the electrode tabs 110t, the positions of the plurality of cells 100 are consequently fixed relative to the case 70.

Figure 10:
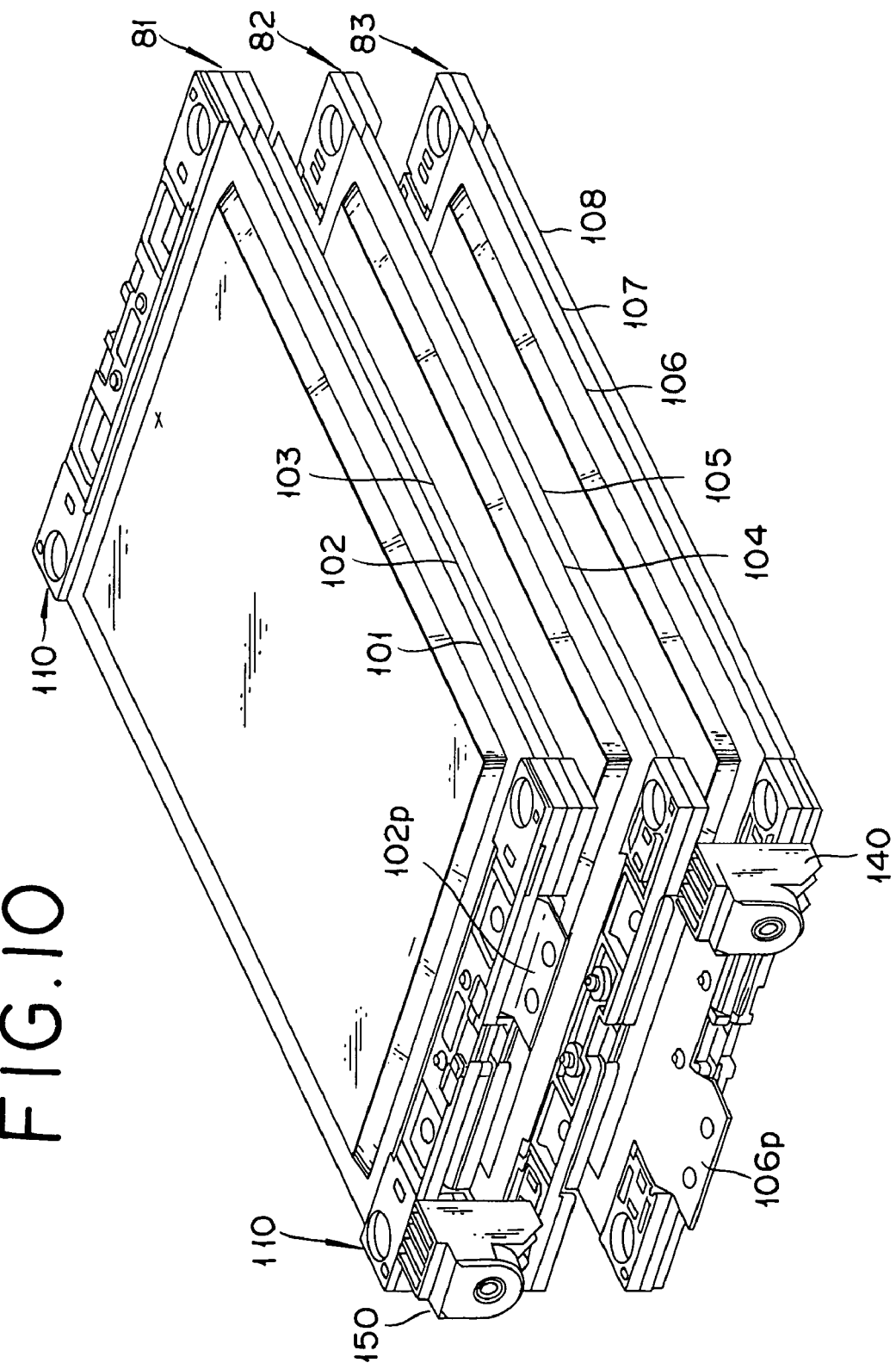
FIG. 10 is a perspective view illustrating three sub-assemblies forming the main body of the cell unit with the front surface side thereof placed on the forward side.
Figure 11:
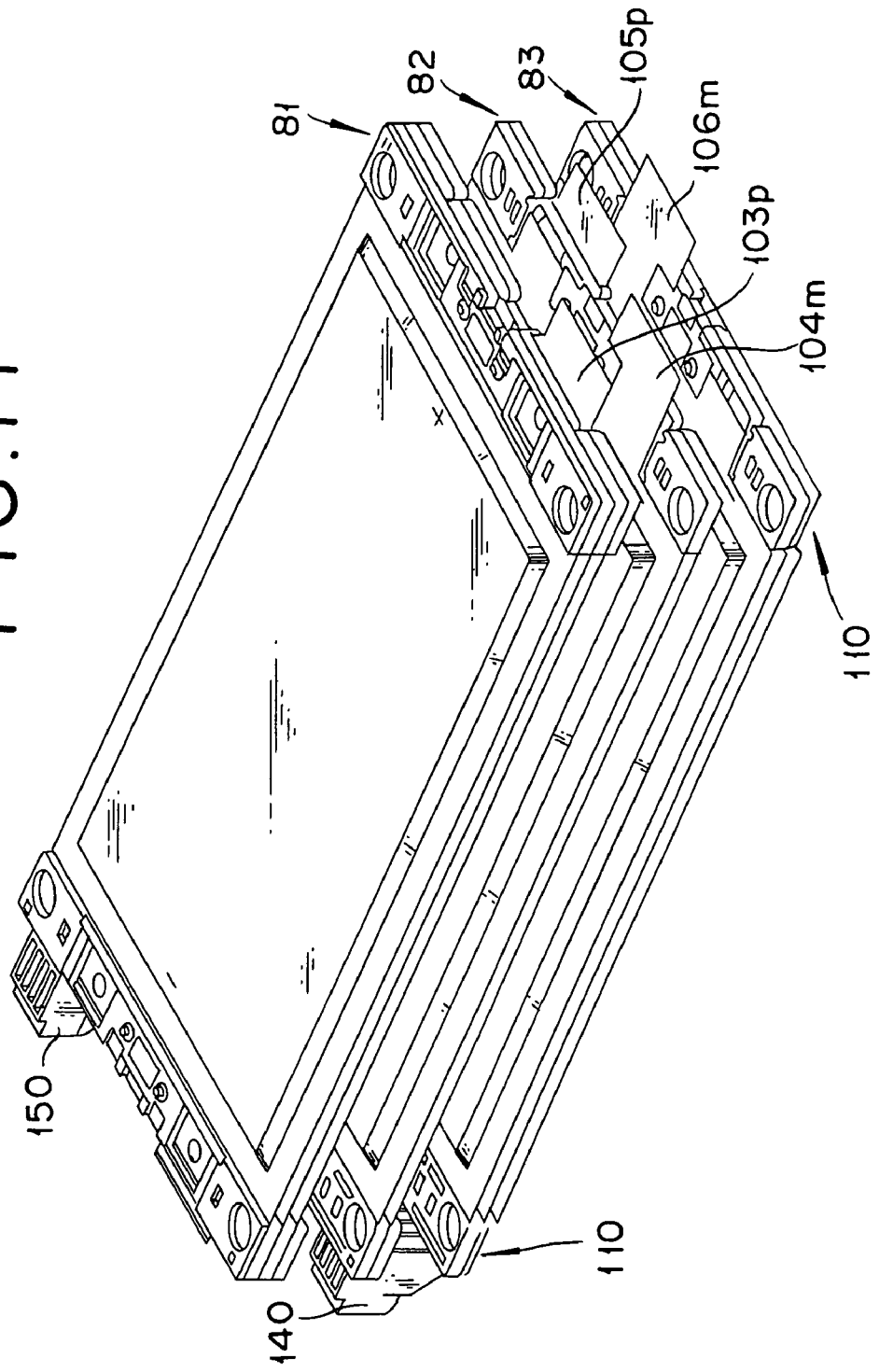
FIG. 11 is a perspective view illustrating the sub-assemblies with the rear surface side thereof placed toward the front.
Figure 12:
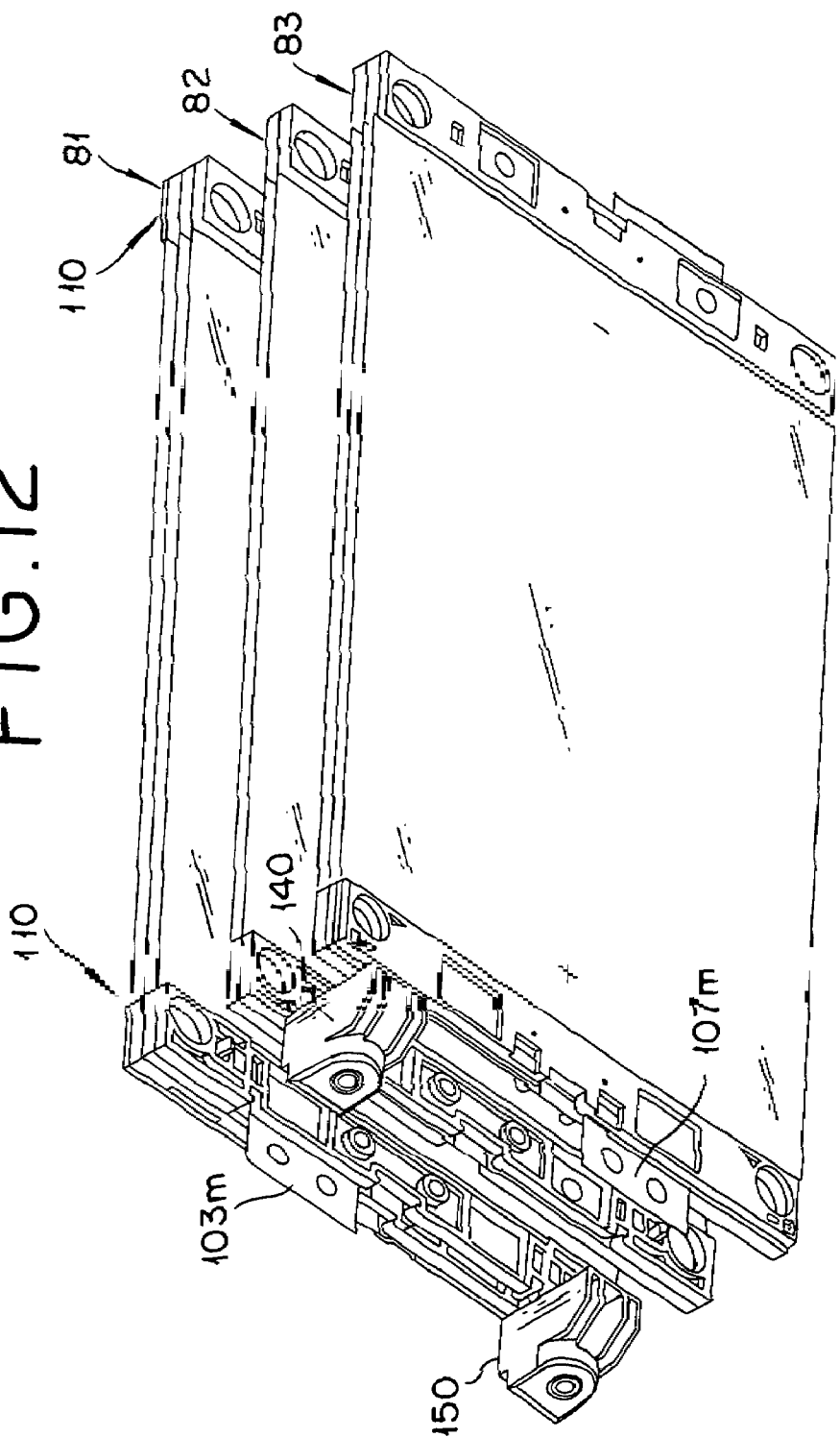
FIG. 12 is a perspective view illustrating these sub-assemblies as viewed from the bottom surface side.

Referring to FIG. 10-FIG. 12, the cell unit main body 80 results from assembling the first through third three sub-assemblies 81, 82, and 83. In FIG. 10, the first sub-assembly 81 shown at the uppermost position is configured by having three cells 101, 102, and 103 stacked thereon and having these cells 101, 102, and 103 joined in series connection as well. The second sub-assembly 82 shown in the middle position is configured by having two cells 104 and 105 stacked thereon and having these cells 104 and 105 joined in serial connection. The third sub-assembly 83 shown in the lowermost position is configured by having three cells 106, 107, and 108 stacked thereon and having these cells 106, 107, and 108 joined in serial connection. The first sub-assembly 81 has the negative output terminal 150 imposed therein and the third sub-assembly 83 has the positive output terminal 140 imposed therein. The first sub-assembly 81 and the second sub-assembly 82 are electrically connected by causing the electrode tabs 103p and 104m confronting the outer sides of the spacers 110 on the rear surface side to be mutually joined. The second sub-assembly 82 and the third sub-assembly 83 are likewise electrically connected by causing the electrode tabs 105p and 106m confronting the outer sides of the spacers 110 on the rear surface side to be mutually joined. The opposed surfaces of the cell 103 of the first sub-assembly 81 and the cell 104 of the second sub-assembly and the opposed surfaces of the cell 105 of the second sub-assembly 82 and the cell 106 of the third sub-assembly 83 are severally bonded with a double-coated tape.

Figure 13:
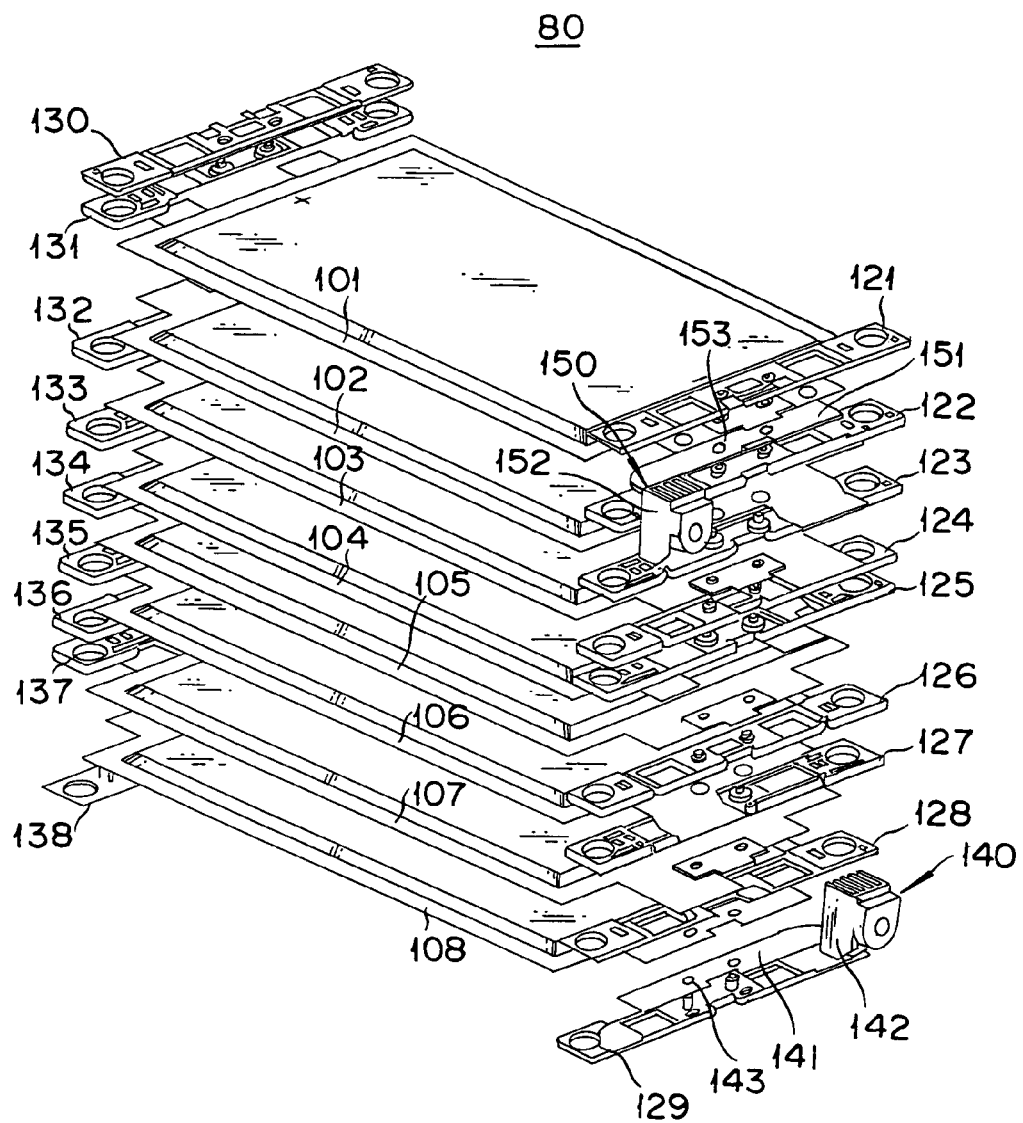
FIG. 13 is an exploded perspective view illustrating the main body of the cell unit with the front surface side directed toward the front.
Figure 14:
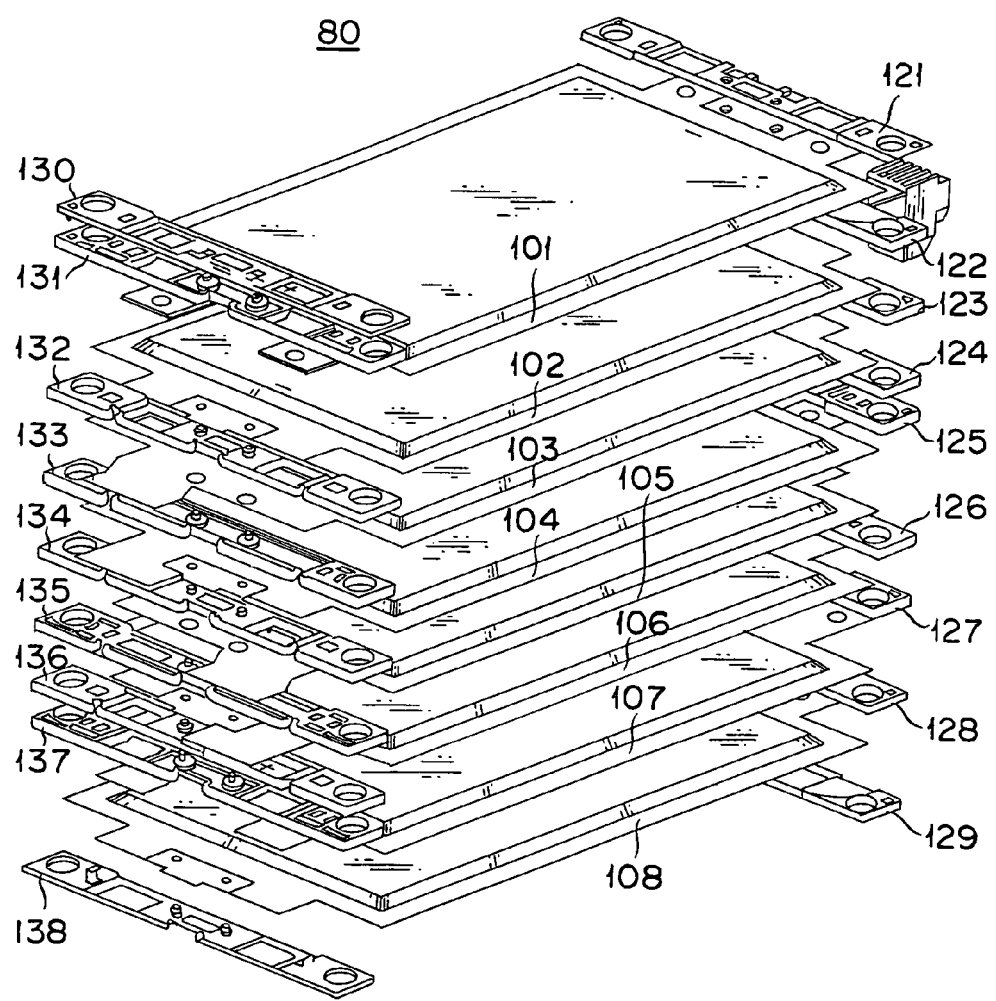
FIG. 14 is an exploded perspective view illustrating the main body of the cell unit with the rear surface side directed toward the front.
Figure 15:
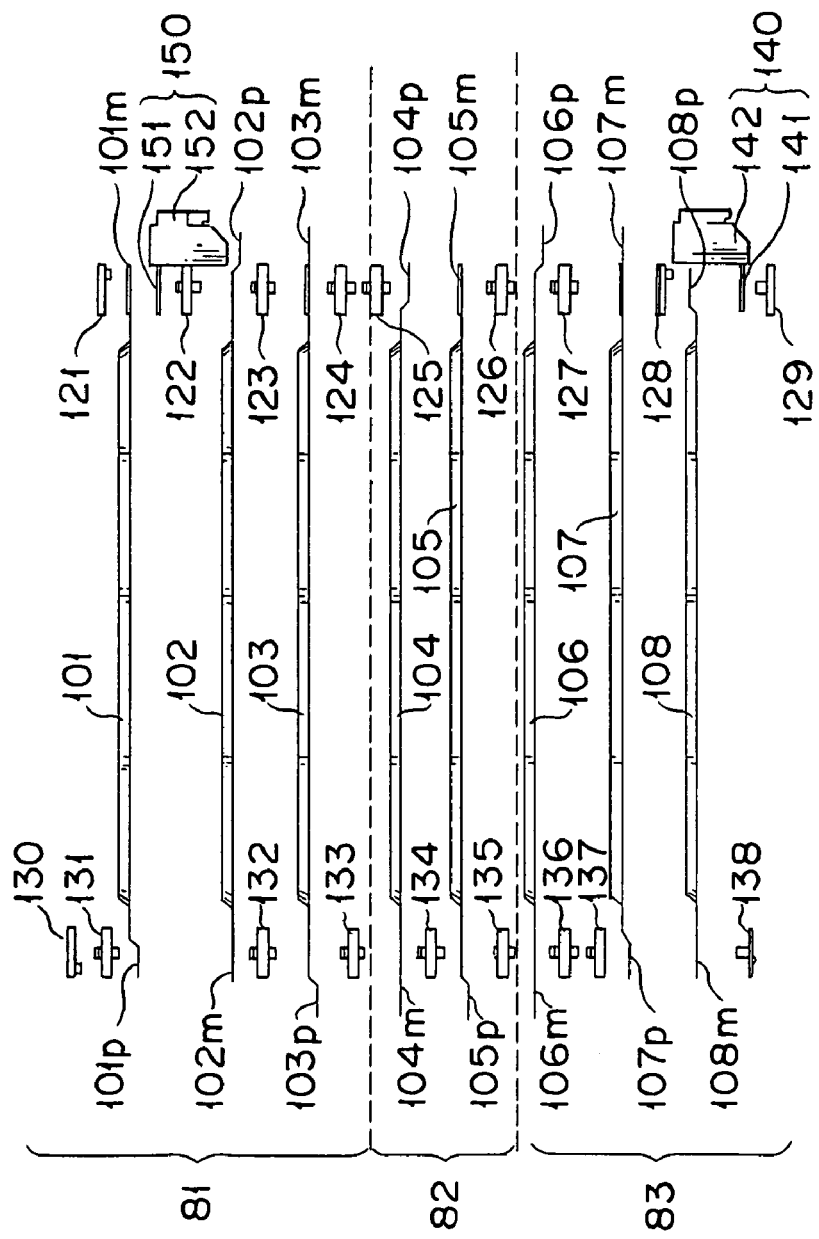
FIG. 15 is a diagram of the stacking of flat cells and insulating plates in the main body of the cell unit.

The right side of FIG. 15 is the front surface side and the left side thereof is the rear surface side. Referring to FIG. 13-FIG. 15, the cell unit main body 80 comprises cells 101-108, spacers 121-138, and output terminals 140 and 150. The spacers 121-138 are disposed on the front surface side and on the rear surface side. For the sake of convenience of explanation, the cells 101-108 will be referred to as the first cell 101. The spacers 121-129 on the front surface side will be referred to as the first spacer 121. By the same token, the spacers 130-138 on the rear surface side will be referred to as the spacer 130.

The spacers 121-138 are so disposed as to nip the electrode tabs 100t from the opposite surface sides of the electrode tabs 100t along the stacking direction of the cells. The positive output terminal 140 comprises a platelike bus bar 141 superposed on the positive electrode tab 108p of the cell 108 and a cover 142 for concealing the electrode disposed on the terminal part of the bus bar 141. The negative output terminal 150 comprises a platelike bus bar 151 superposed on the negative electrode tab 101m of the first cell 101 and a cover 152 for concealing the electrode disposed on the terminal part of the bus bar 151. The bus bars 141 and 151 are each formed of a copper plate. The positive output terminal 140 has the electrode and the cover 142 thereof positioned on the right terminal part of the bilateral terminal parts of the bus bar 141 as viewed from the front surface side. Conversely, the negative output terminal 150 has the electrode and the cover 152 thereof positioned on the left terminal part of the bus bar 151. Incidentally, of the opposite surfaces of the electrode tab 100t and the spacer 110 along the stacking direction of cells, the upper side surface in FIG. 15 will be referred to as the front face and the lower side surface as the rear face. The bus bars 141 and 151 respectively have paired through holes 143 and 153 extending from the front face to the rear face along the stacking direction.

Figure 16:
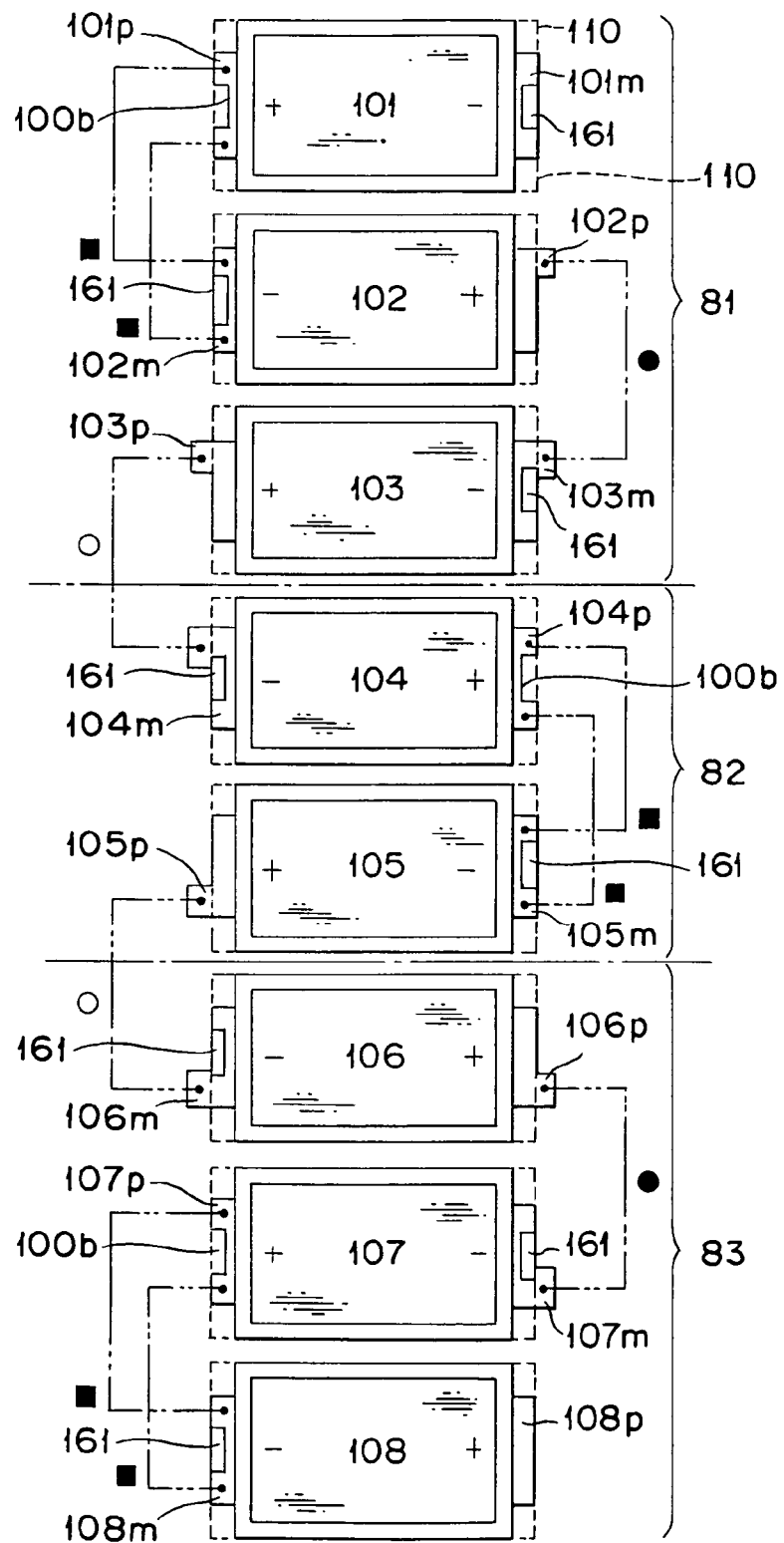
FIG. 16 is a diagram of the electric connection of the flat cells in the main body of the cell unit.
Figure 17:
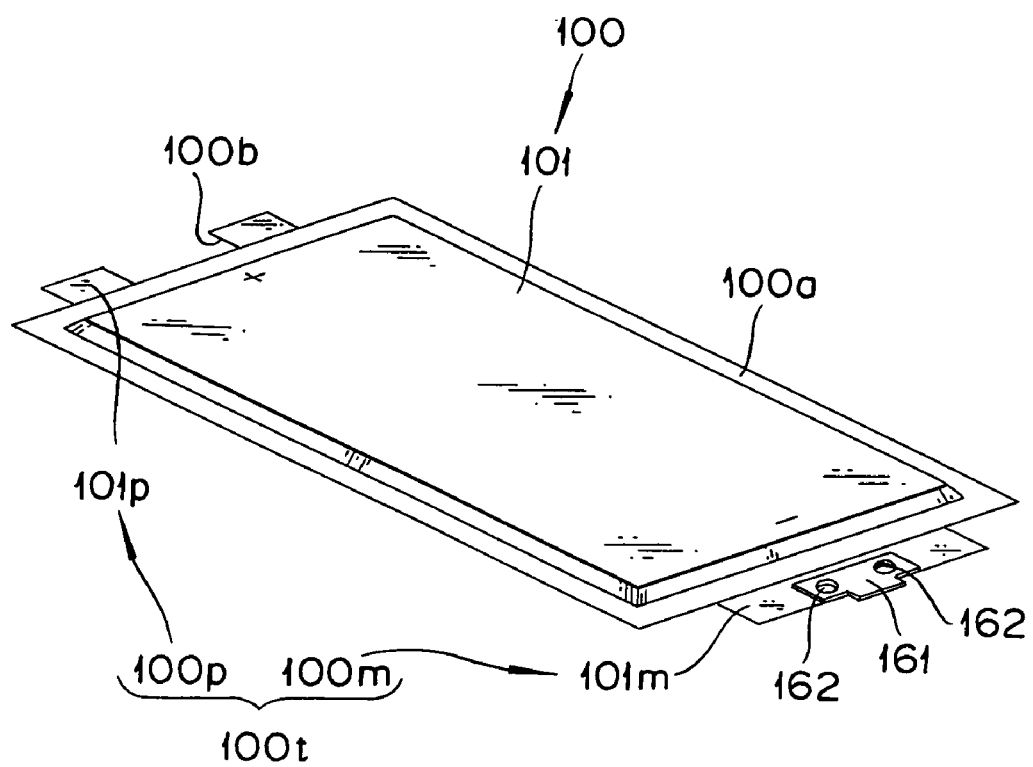
FIG. 17 is a perspective view illustrating an embodiment of the flat cell contained in the main body of the cell unit.

FIG. 17 illustrates the first cell 101 as one example of the cell 100. In FIG. 16, the right side constitutes the front surface side and the left side the rear surface side. Referring to FIG. 16 and FIG. 17, the cell 100 is a flat lithium ion secondary cell, which has the package member 100a such as a laminate film seal a stack type power generating element (not shown) resulting from sequentially laminating a positive electrode plate, a negative electrode plate, and a separator. In the cell 100, the electrode tabs 100t have ends thereof electrically connected to the power generating element and assuming the shape of a plate are derived to the exterior from the package member 100a. The positive electrode tab 100p and the negative electrode tab 100m are extended toward the opposite sides (the front surface side and the rear surface side) of the cell 100 in the long direction. In the case of the cell 100 which is furnished with the stack type power generating element, the power generating element is required to be held together with pressure for the purpose of keeping a uniform distance between the adjacent electrode plates and maintaining the cell performance. Thus, the individual cells 100 are contained in the case 70 so that the power generating element may be held together.

In FIG. 17, the reference numeral 161 denotes a terminal plate (corresponding to a voltage detecting terminal plate) superposed on and bonded to the negative electrode tab 100m and the reference numeral 162 denotes a pair of through holes formed in the terminal plate 161. In the negative electrode tab 100m, a pair of through holes 109 communicating with the through holes 162 of the terminal plate 161 are formed (refer to FIG. 24B). The positive electrode tab 100p may optionally have the through holes 109 formed therein. Specifically, the positive electrode tabs 102p, 103p, 105p, 106p, and 108p have the through holes 109, respectively (refer to FIG. 13 and FIG. 14). The through holes 109 and 162 are extended from the front face to the rear face along the stacking direction.

Figure 18A:
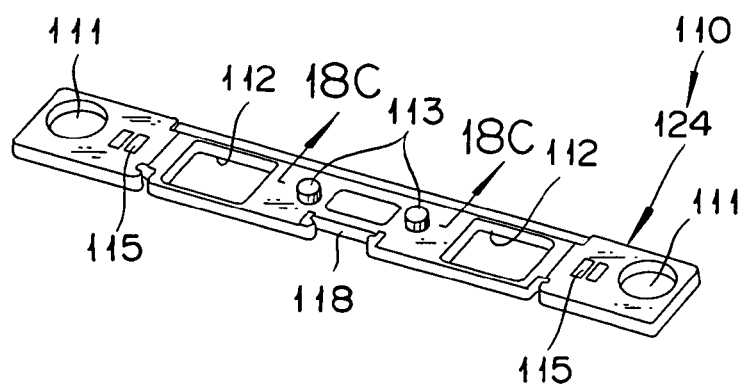
FIG. 18A is a perspective view illustrating an embodiment of the insulating plate contained in the main body of the cell unit.
Figure 19A:
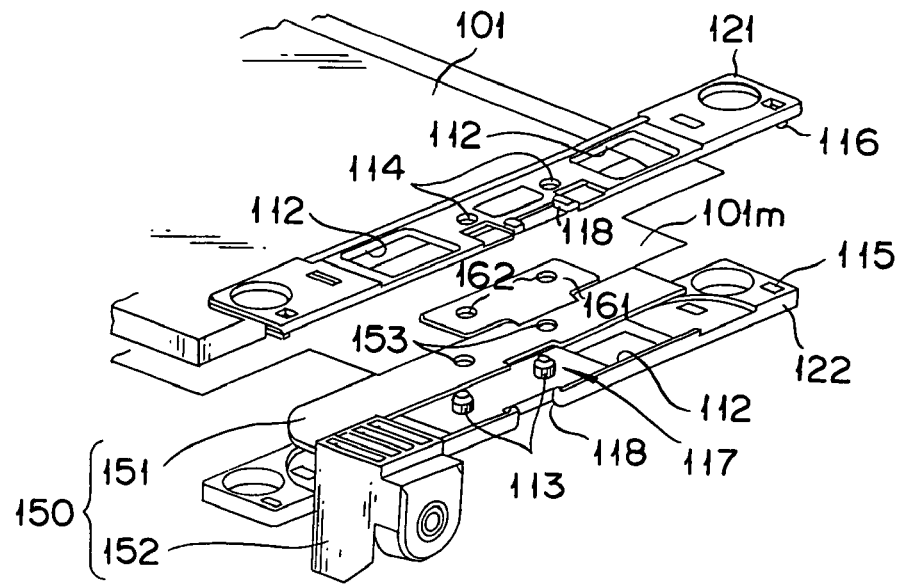
FIG. 19A and FIG. 19B are perspective views of one electrode tab and output terminal of the battery module are piled and nipped by one pair of insulating plates.
Figure 19B:
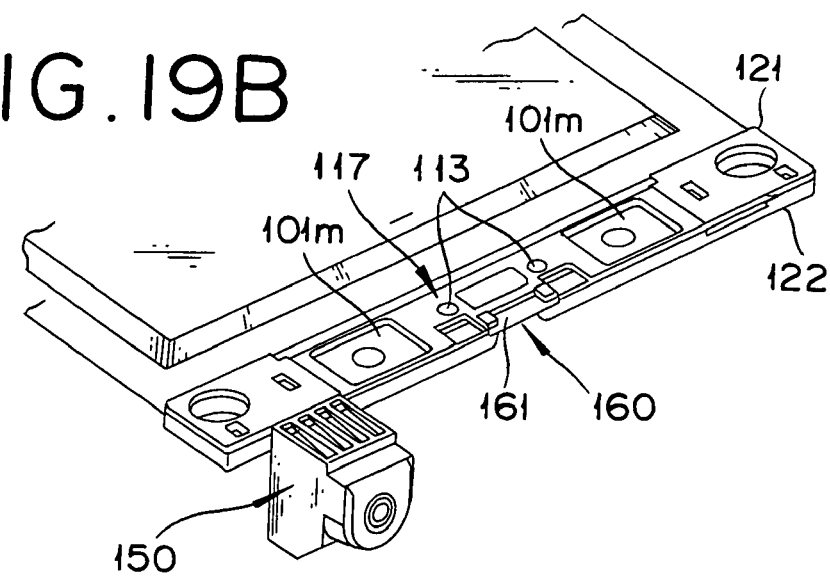
Figure 20A:
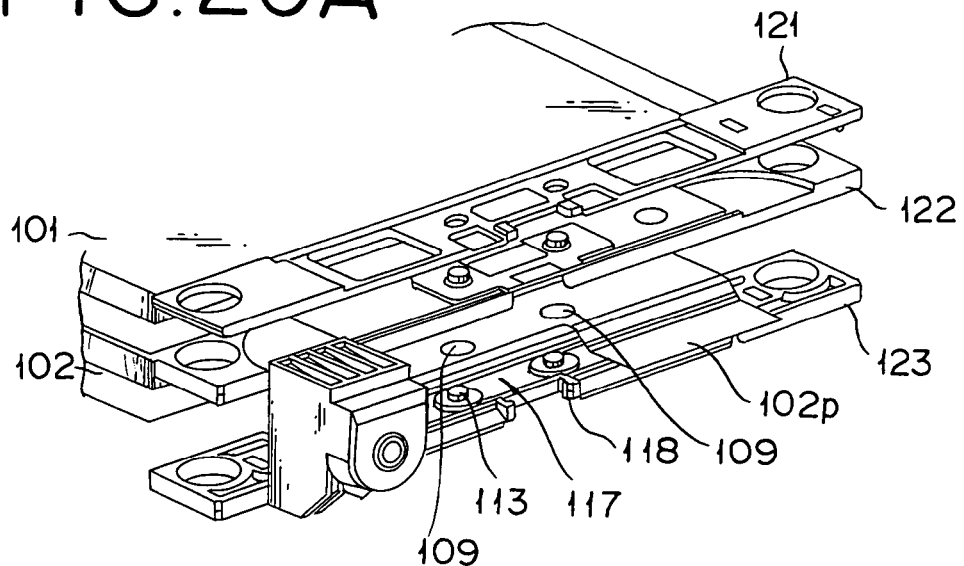
FIG. 20A and FIG. 20B are perspective views of which the electrode tabs of the flat cells stacked on the lower position side in the diagram of FIG. 19A which are further nipped.
Figure 20B:
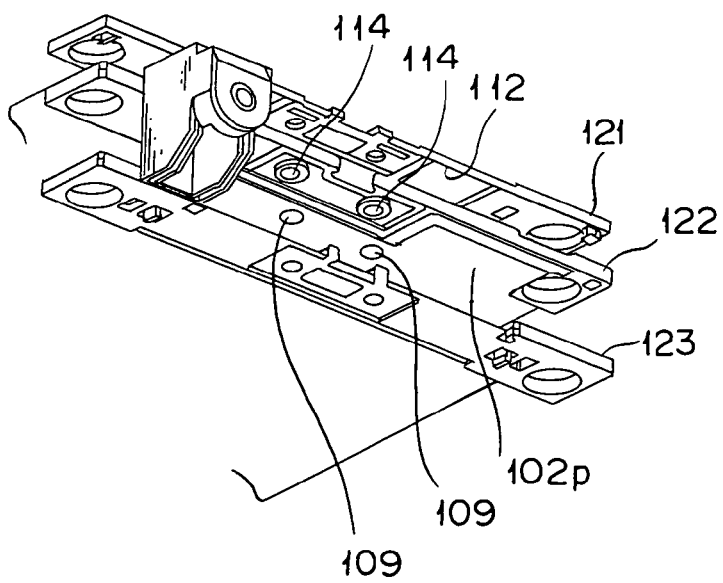
Figure 21A:
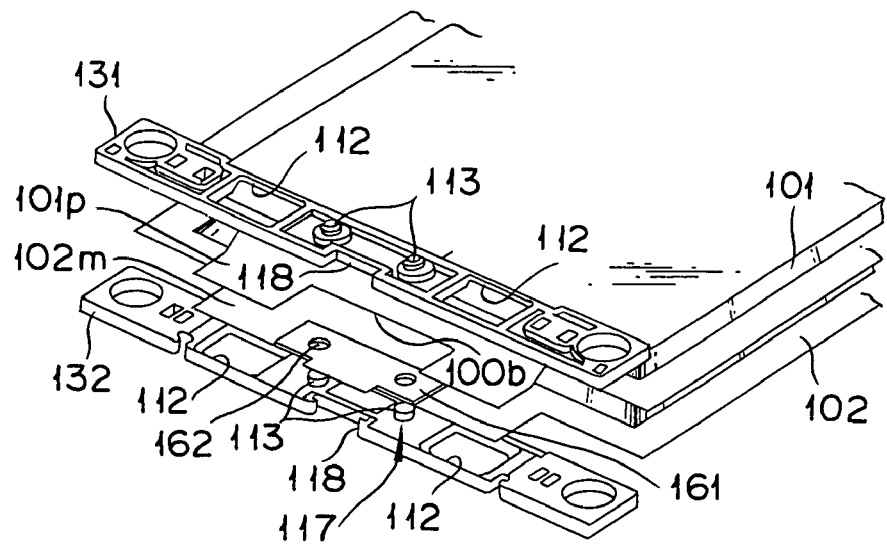
FIG. 21A, FIG. 21B, and FIG. 21C are perspective views provided for aiding the explanation of the state in which a plurality of electrode tabs are nipped as piled by one pair of insulating plates.
Figure 21B:
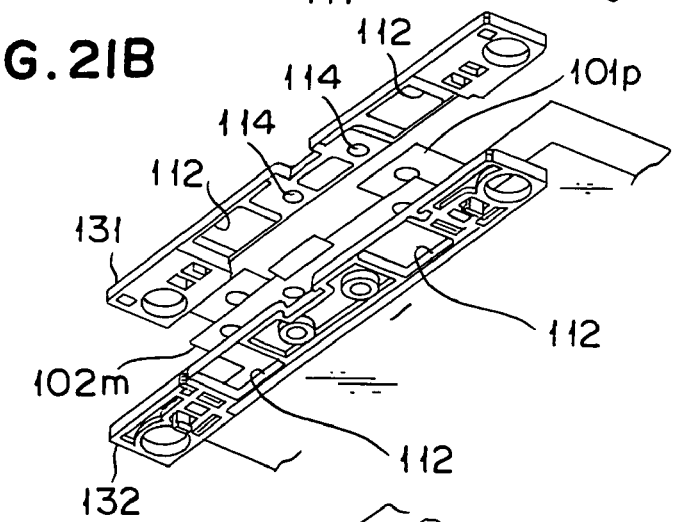
Figure 21C:
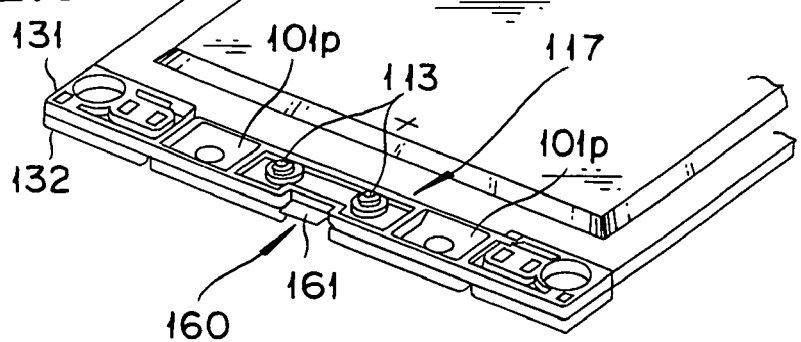

FIG. 18A shows the spacers 124, 126, 132, 134, and 136 as one example of the spacer 110. FIG. 19A and FIG. 19B illustrate the state in which the negative electrode tab 101m of the cell 101 and the negative terminal 150 are nipped as piled by the pair of spacers 121 and 122. FIG. 20A and FIG. 20B illustrate the positive electrode tab 102p of the cell 102 stacked on the lower position side in the diagram of FIG. 19A is further nipped. FIG. 21A, FIG. 21B, and FIG. 21C illustrate the plurality of electrode tabs 101p and 102m that are nipped as piled by the pair of spacers 131 and 132.

Referring to FIG. 18, the spacer 110 is formed in the shape of a plate for nipping the electrode tab 100t from the opposite surface sides of the electrode tab 100t along the stacking direction of a plurality of cells 100 and is furnished with an electric insulating property.

The material for the spacer 110 does not need to be particularly restricted but is only required to be furnished with an electric insulating property and endowed with strength enough to nip the electrode tab 100t. An electrically insulating resinous material, for example, may be used. In the opposite ends along the longer direction of the spacer 110, bolt holes 111 for allowing insertion of the sleeve 93 (refer to FIG. 2) are formed as extended from the front face to the rear face. By having the spacers 110 nip the electrode tab 100t, it is made possible to reduce the vibration of the electrode tab 100*t* and prevent the concentration of stress on the electrode tab 100*t* when the battery module 50 is exposed to the vibration. As a result, it is possible to improve the durability of the electrode tab 100*t* and consequently the durability of the battery module 50. Further, since the electrode tab 100*t* is nipped by the spacers 110 which are furnished with an electric insulating property, the electrode tabs 100*t* can be prevented from forming a short circuit even when the distance between the cells 100, namely the distance between the electrode tabs 100*t*, is decreased. As a result, the battery module 50 in its entirety can be given necessary compaction in space by decreasing the distance between the cells to the fullest possible extent. Consequently, it is made possible to provide the battery module 50 which exhibits an increased shock resisting strength, reveals reduced susceptibility to the influence of the input of vibration, and permits reduction in size. Further, since the cell unit main body 80 has the spacers 110 positioned in the opposite ends along the stacking direction of the cells, it can allay the exposure of the electrode tabs 100*t* and can easily facilitate the handling of the cell unit main body 80 as during the assemblage of the battery module 50. Incidentally, the insulating covers 91 and 92 are formed of the same material as the spacers 110.

In the spacer 110, open window parts 112 extending from the front face to the rear face along the stacking direction are formed. In the illustrated example, rectangular open window parts 112 are formed one each at the two portions separated equally toward the bilateral sides from the center in the longer direction of the spacer 110. The open window parts 112 are confronted by part of the nipped electrode tab 110*t* (refer to FIG. 19B and FIG. 21C).

The spacer 110 is further provided on the front face which is one of the opposite surfaces along the stacking direction with pins 113 (corresponding to projecting parts) and on the rear face which is the remainder of the opposite surfaces along the stacking direction with concave parts 114. These pins 113 and the concave parts 114 are disposed on one line along the stacking direction (refer to FIG. 18C). In the illustrated example, one pair of pins 113 and one pair of concave parts 114 are disposed toward the center in the longer direction of the spacer 110 from the open window parts 112. Incidentally, the pins 113 may be otherwise referred to as embosses.

One of the paired spacers which nip the electrode tab concurrently serves as one of the paired spacers which nip the other electrode tab. As illustrated in FIG. 15, for example, the negative electrode tab 101*m* of the first cell 101 is nipped by the paired first and second spacers 121 and 122 and the positive electrode tab 102*p* of the second cell 102 is nipped by the paired second and third spacers 122 and 123. In this example, the second spacer 122 is used for nipping the negative electrode tab 101*m* and, at the same time, nipping the positive electrode tab 102*p*. By concurrently using the spacer 122 as described above, it is made possible to decrease the distance between the negative electrode tab 101*m* on the upper position side and the positive electrode tab 102*p* on the lower position side. By decreasing the distance between the cells 100 to the fullest possible extent, therefore, it is made possible to effect compaction of the whole battery module 50.

As illustrated also in FIG. 19A and FIG. 19B, engaging holes 115 extended from the front face to the rear face are formed in the spacer 122 on the lower position side and snap fit claws 116 are formed as projected on the rear face of the spacer 121 on the upper position side. The snap fit claws 116 are inserted into the engaging holes 115 of the spacer 122 disposed on the rear face and then brought into engagement with the spacer 122. That is, the spacers 110 are joined by mutual insertion. As a result, the mutual union of the spacers 110 can be effected easily and quickly and the work of nipping the electrode tab 110*t* can be implemented easily and quickly.

Referring now to FIG. 19-FIG. 21, the paired spacers which nip the electrode tab 100*t* are provided with engaging members 117 intended for penetrating the electrode tab 100*t* and engaging the electrode tab 100*t*. Specifically, as illustrated in FIG. 19, the negative electrode tab 101*m* has formed therein the through holes 109 extending throughout along the stacking direction and the engaging member 117 is provided with the pin 113 inserted into the through hole 109 formed in the one spacer 122 of the paired spacers 121, 122 and the concave part 114 for permitting insertion of the leading end of the pin 113 inserted in the through hole 109 disposed on the remainder 121 of the paired spacers 121, 122. Owing to the engaging member 117 mentioned above, the possible deviation of the positions of the spacers 121 and 122 relative to the negative electrode tab 101*m* can be eliminated and consequently the possible formation of a short circuit between the electrode tabs in consequence of the deviation mentioned above can be precluded when the battery module is exposed to the incidence of vibration.

Figure 18B:
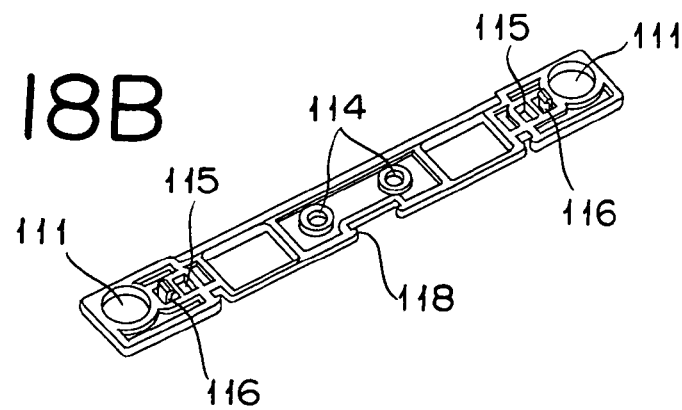
FIG. 18B is a perspective view illustrating the insulating plate of FIG. 18A where the front and rear faces thereof are inverted.
Figure 18C:
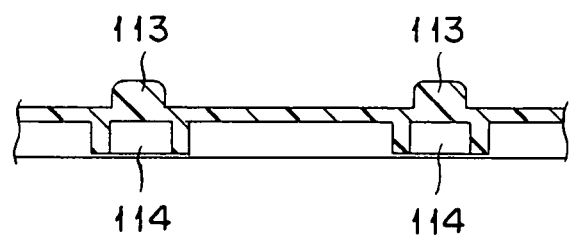
FIG. 18C is a cross section taken through FIG. 18A along the line 18C-18C.

Here, the spacer 110 is provided on the front face thereof with the pins 113 and on the rear face thereof with the concave parts 114 and the pins 113 and the concave parts 114 are disposed on one and the same line along the stacking direction (refer to FIG. 18C). When the electrode tab 100*t* having the through holes 109 formed therein is nipped by the spacers 110 constructed as described above, the engaging member 117 is constructed as described above, the possible deviation of the positions of the spacers 110 relative to the electrode tab 100*t* can be eliminated and consequently the possible formation of a short circuit between the electrode tabs 100*t* in consequence of the deviation can be precluded when the battery module is exposed to the incidence of vibration. Further, when the plurality of cells 100 are stacked to give rise to the battery module 50, the positions of the spacers 110 relative to the electrode tab 100*t* and the mutual positions of the cells 100 can be simultaneously fixed by inserting the leading terminals of the pins 113 of the spacers 110 on the lower position side into the concave parts 114 of the spacers 110 on the upper position side. By enabling the pins 113 and the concave parts 114 to manifest the positioning function as described above, the workability during the assemblage of the battery module 50 can be improved.

Since the bus bars 141 and 151, the terminal plate 161, and the electrode tab 100*t* each have through holes 143, 153, 162, and 109 formed at two points, they are prevented from freely rotating by the insertion of the pins 113 in the through holes. Preferably, one of each of the pairs of through holes 143, 153, 162, and 109 is formed in a circular shape and the remainder in an elliptical shape. The reason for the use of these two shapes for the through holes is that the insertion of the pins 113 can be carried out easily.

Referring to FIG. 19, the negative electrode tab 101*m* and the bus bar 151 of the negative output terminal 150 are superposed and part of the negative electrode tab 101*m* and part of the bus bar 151 are nipped as verging on the open window parts 112 by means of the pair of spacers 121 and 122 which are furnished with the open window parts 112 extending along the stacking direction. By joining the negative electrode tab 101*m* verging on the open window parts 112 and the bus bar 151, the output terminal 150 is enabled to be electrically connected to the first cell 101. When the negative electrode tab 101*m* and the bus bar 151 are to be joined by welding, the negative electrode tab 101m and the bus bar 151 can be retained in a superposed state and further the welding head can be easily positioned in the open window parts 112 by utilizing the spacers 121 and 122 each as a jig. As a result, the welding can be carried out through the open window parts 112 and the workability of welding can be exalted. The bus bar 151, the negative electrode tab 101m of the first cell 101, and the terminal plate 161 are positioned by the fact that the pins 113 of the second spacer 122 are inserted through the through holes 153, 109, and 162 of the bus bar 151, the negative electrode tab 101m of the first cell 101 and the terminal plate 161 and driven into the concave parts 114 of the first spacer 121. The negative electrode tab 101m and the bus bar 151, excepting the part confronting the open window parts 112 and the part constituting the voltage detecting part 160, have the peripheries thereof insulated with the spacers 121 and 122.

Referring to FIG. 20, the paired spacers 122 and 123 nip the positive electrode tab 102p with part of the positive electrode tab 102p verging on the outer sides of the spacers 122 and 123. The positive electrode tab 102p of the second cell 102 is positioned by the fact that the pins 113 of the third spacer 123 are passed through the through holes 109 of the second cell 102 and driven into the concave parts 114 of the second spacer 122. Incidentally, the positive electrode tab 102p verging on the outer sides of the spacers 122 and 123 are joined with the negative electrode tab 103m verging on the outer sides of the spacers 123 and 124, with the result that the second cell 102 and the third cell 103 will be electrically connected (refer to FIG. 15).

Referring to FIG. 21, the plurality of electrode tabs 101p and 102m are piled up and are nipped as well with the electrode tabs 101p and 102m partly verging on the open window parts 112 by means of the paired spacers 131 and 132 which are furnished with open window parts 112 extended throughout along the stacking direction. Then, by mutually joining the electrode tabs 101p and 102m confronting the open window parts 112 by ultrasonic welding, the plurality of cells 101 and 102 are enabled to be electrically connected. When the electrode tabs 101p and 102m are mutually joined by welding, the electrode tabs 101p and 102m can be retained in a mutually superposed state and further the welding head of the welding device can be readily positioned in the open window parts 112 by utilizing the spacers 131 and 132 each as a jig. As a result, the welding can be carried out through the open window parts 112 and the workability of welding can be improved similarly in this case. The negative electrode tab 102m of the second cell 102 and the terminal plate 161 are positioned by the fact that the pins 113 of the 12th spacer 132 are passed through the through holes 109 and 162 of the negative electrode tab 102m of the second cell 102 and the terminal plate 161 and driven into the concave parts 114 of the 11th spacer 131. The electrode tabs 101p and 102m, excepting the parts confronting the open window parts 112 and the parts constituting the voltage detecting part 160, have the peripheries thereof insulated by the spacers 131 and 132.

In the cell unit main body 80 in the present embodiment, the stacked plurality of cells 100 are serially connected by the mutual electric connection of the electrode tabs 100p and 100m differing in electric polarity and the positive output terminal 140 and the negative output terminal 150 are electrically connected respectively to the 8th and the first cell 108 and 101 which are positioned at the opposite ends along the stacking direction as illustrated in FIG. 15. The cell unit main body 80 is manufactured by combining the unions illustrated in FIG. 19-FIG. 21. The unions illustrated in FIG. 19-FIG. 21 are improved in the workability of welding. As a result, the workability of welding during the manufacture of the cell unit main body 80 can be improved.

Figure 22A:
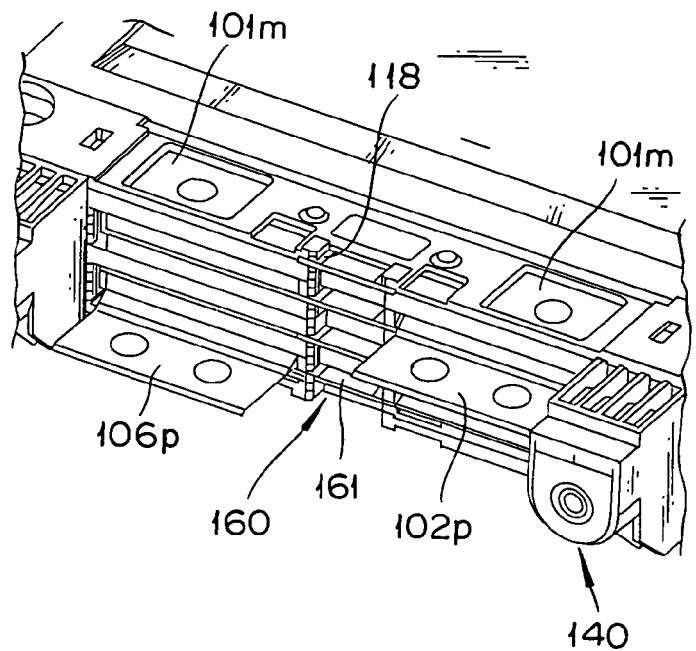
FIG. 22A is a perspective view illustrating a voltage detecting part on the front surface side of the main body of the cell unit.

Referring to FIG. 18A, FIG. 18B, and FIG. 22A, the spacers 110 are severally provided with a notch 118 for exposing part of the peripheral edge of the nipped electrode tab 100t and the region of the electrode tab 100t exposed through the notch 118 is utilized as the voltage detecting part 160 for detecting the voltage of the cell 100. Since the electrode tab 100t itself is utilized as the voltage detecting part 160, the saving of space can be promoted as compared with the case of disposing a terminal used exclusively for voltage detection as separated from the electrode tab 100t, with the result that the construction for the detection of voltage will be simplified and the assemblage of the battery module 50 will be facilitated.

Figure 22B:
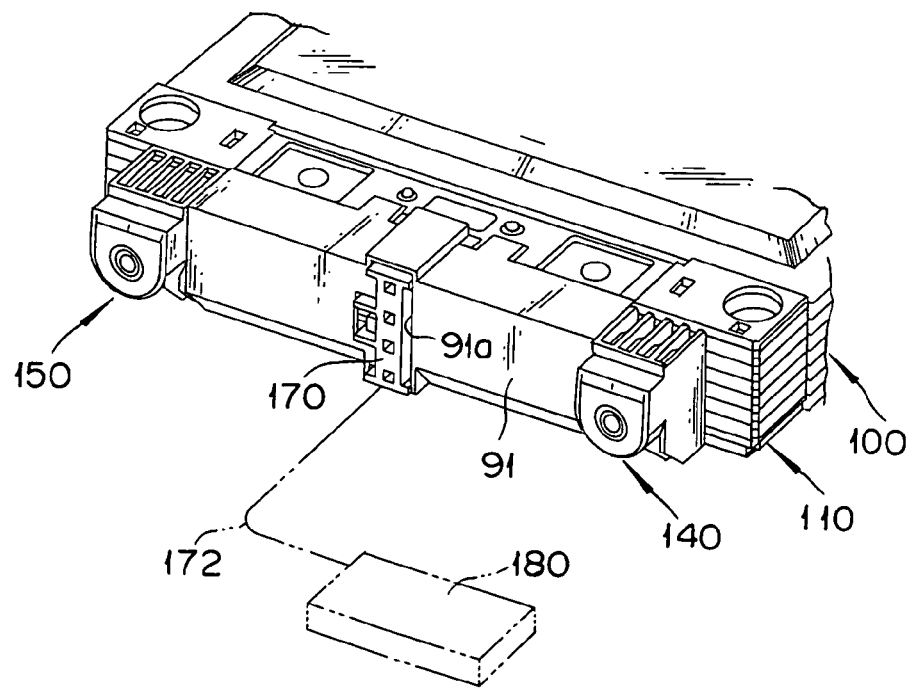
FIG. 22B is a perspective view illustrating the state in which a connector is inserted in an insulating cover attached to the front surface of the main body of the cell unit.
Figure 23B:
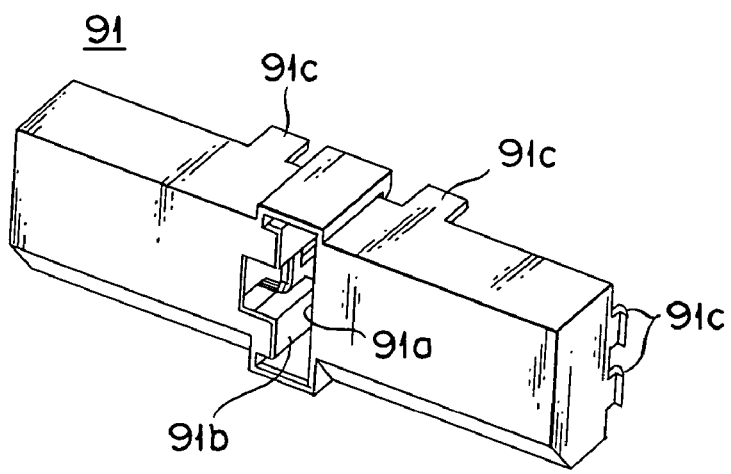
FIG. 23B is a perspective view illustrating the insulating cover.
Figure 23C:
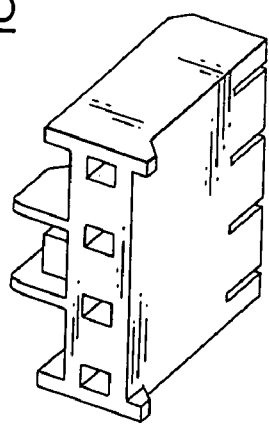
FIG. 23C is a perspective view illustrating the connector.

Referring to FIG. 22 and FIG. 23, the connector 170 is furnished with a connecting terminal 171 (refer to FIG. 24C) which can be connected to the voltage detecting part 160 is removably attached to the voltage detecting part 160 through the insertion hole 91a of the insulating cover 91. The connector 170 is connected to a voltage detecting device 180 via a lead wire 172. Solely by the insertion of the connector 170, the operation of electrically connecting the voltage detecting part 160 to the voltage detecting device 180 can be completed. Then, the operating conditions of the individual cells 100 can be checked by monitoring the voltage detected in the voltage detecting part 160.

A plurality of voltage detecting parts 160 are arrayed on one and the same line along the stacking direction of the cells. The connectors 170 are provided with a plurality of connecting terminals 171 so disposed as to coincide with the positions of the voltage detecting parts 160. The voltage detecting parts 160 are arrayed as halved, four each on the front surface side and the rear surface side. By establishing coincidence in advance between the positions of the plurality of voltage detecting parts 160 and the positions of the plurality of connecting terminals 171, the operation of electrically connecting the plurality of voltage detecting parts 160 collectively to the voltage detecting device 180 can be completed by simply inserting one connector 170, with the result that the workability of this electric connection will be exalted. Here, the cells 100 have the sizes thereof in the direction of thickness (cell heights) dispersed more or less in the part allowing the existence of the power generating element. In the present embodiment, the electrode tabs 100t are exclusively nipped by the spacers 110 which are rigid bodies and the plurality of voltage detecting parts 160 are formed of the electrode tabs 100t exposed through the notches 118. Thus, the intervals which intervene between the plurality of voltage detecting parts 160 are fated to be determined by the sizes of height of the stacked spacers 110. That is, the intervals of the plurality of voltage detecting parts 160 can be retained constant without being affected by the dispersion of the cell heights and the positions of the plurality of voltage detecting parts 160 do not give rise to any dispersion in mutual relationship. The plurality of the connecting terminals 171 of the connectors 170 do not give rise to any dispersion in positional relationship. Thus, such a complicated operation as adjusting the positions in height of the individual voltage detecting parts 160 does not need to be performed in enabling the plurality of voltage detecting parts 160 to coincide with the plurality of connecting terminals 171 in relative positional relationship. As a result, the voltage detecting parts 160 are simplified in structure, the plurality of voltage detecting parts 160 and the plurality of connecting terminals 171 are enabled to be easily connected collectively, and the workability of the insertion of the connectors 170 is exalted.

When the electrode tabs 100*t* have a comparatively large plate thickness, the situation that the electrode tabs 100*t* constituting the voltage detecting parts 160 are deformed during the insertion or extraction of the connectors 170 does not take place. When the electrode tabs 100*t* have a comparatively small plate thickness, however, the electrode tabs 100*t* constituting the voltage detecting parts 160 are possibly deformed during the insertion or extraction of the connectors 170. For the purpose of preventing the electrode tabs 100*t* from this deformation, therefore, the voltage detecting parts 160 are furnished with the terminal plates 161 are joined as piled up to the electrode tabs 100*t*. The terminal plates 161 are formed of a metal plate having a larger plate thickness than the electrode tabs 100*t*. The spacers 110 are provided on the rear faces thereof with dents (not shown) for admitting the terminal plates 161. By being provided with the terminal plates 161, it is made possible to increase the strength of the voltage detecting parts 160 and prevent the voltage detecting parts 160 from being deformed in consequence of insertion and extraction of the connectors 170 as compared with the case of using the electrode tabs 100*t* exclusively. Further, since the terminal plates 161 are directly joined onto the electrode tabs 100*t*, the saving on space can be enhanced as compared with the case of disposing the terminal plates 161 as separated from the electrode tabs 100*t*.

The terminal plates 161 also have formed therein the through holes 162 permitting insertion therein of the pins 113 of the spacers 110. By causing the pins 113 inserted in the through holes 162 to bear the load exerted on the terminal plates 161, it is made possible to decrease the load exerted on the electrode tabs 100*t* and the power generating elements during the insertion and extraction of the connectors 170.

Incidentally, the electrode tabs 100*t* do not need to be provided with the terminal plates 161 when they have a comparatively large plate thickness and are not suffered to deform in consequence of insertion or extraction of the connectors 170.

Referring to FIG. 21A, the positive electrode tab 101*p* which is nipped as piled up by the negative electrode tab 102*m* provided with the terminal plate 161 is furnished with the notch 100*b* intended to admit the terminal plate 161. No gap can occur between the negative electrode tab 102*m* and the positive electrode tab 101*p* because the positive electrode tab 101*p* is not allowed to be superposed on the terminal plate 161. As a result, the electrode tabs 102*m* and 101*p* are enabled to be nipped as joined tightly and to be electrically connected ideally.

The electrode tabs 100*t* are mutually joined by ultrasonic welding. To be specific, the electrode tabs 102*m* and 101*p* verging on the open window parts 112 of the spacers 131 and 132 (refer to FIG. 21) are mutually joined by ultrasonic welding. Likewise, the negative electrode tab 101*m* and the bus bar 151 of the output terminal 150 which are verging on the open window parts 112 of the spacers 121 and 122 (refer to FIG. 19) are joined by supersonic welding. The electrode tabs 102*p* and 103*m* which are verging on the outer sides of the spacers 121-124 are mutually joined outside the spacers 121-124 by ultrasonic welding. The electrode tabs 106*p* and 106*m* which are verging on the outer sides of the spacers 127-129 are mutually joined outside the spacers 127-129 by ultrasonic welding (refer to FIG. 20 and FIG. 22A).

Figure 24A:
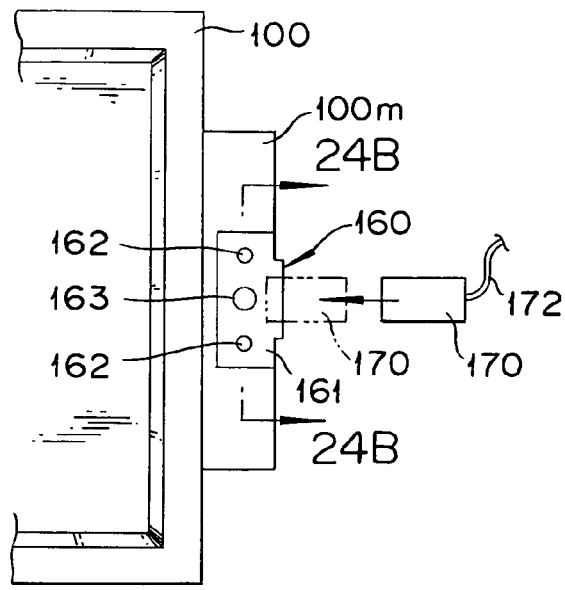
FIG. 24A is a plan view illustrating part of a flat cell having a voltage detecting terminal plate joined as superposed to the electrode tab.
Figure 24B:
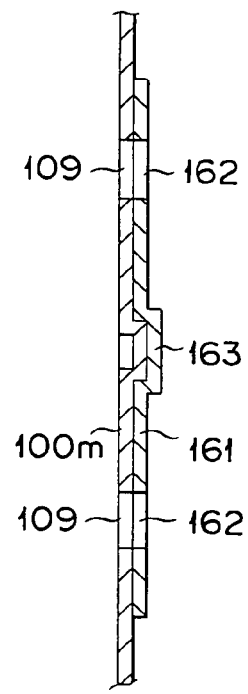
FIG. 24B is a cross section taken through FIG. 24A along the line 24B-24B to depict the electrode tab and the voltage detecting terminal plate are joined by punch caulking.
Figure 24C:
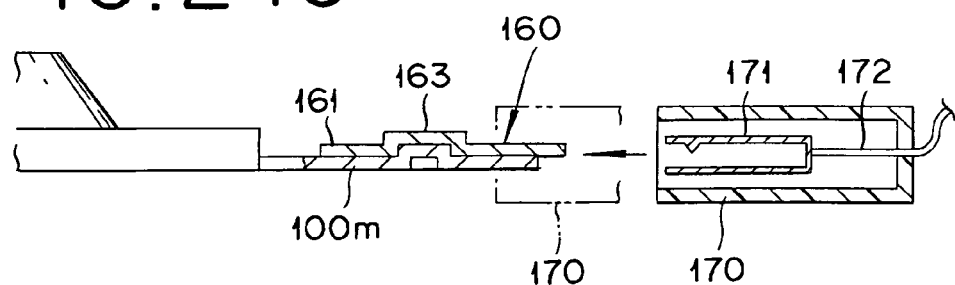
FIG. 24C is a cross section illustrating the manner of inserting a connector into the voltage detecting part.

This invention does not exclude the joining of the electrode tabs 100*t* and the terminal plates 161 mutually by ultrasonic welding. When the electrode tabs 100*t* and the terminal plates 161 are joined by ultrasonic welding and the electrode tabs 100*t* are subsequently joined mutually by ultrasonic welding, however, the joined parts of the electrode tabs 100*t* and the terminal plates 161 are exposed to the vibration accompanied by the welding and the joined parts of the electrode tabs 100*t* and the terminal plates 161 sustain separation and possibly suffer the joining strength to decline. When the electrode tabs 100*t* are mutually joined by ultrasonic welding, therefore, it is preferable that the electrode tabs 100*t* and the terminal plates 161 are joined by at least either of punch caulking and the use of a rivet 165. Even by mutually joining the electrode tabs 100*t* by ultrasonic welding at the positions approximating closely to the joined parts of the electrode tabs 100*t* and the terminal plates 161, it is made possible to maintain the joining strength between the electrode tabs 100*t* and the terminal plates 161 and attain easy maintenance of the expected quality. During the insertion and extraction of the connectors 170, the terminal plates 161 are exposed to a thrust force owing to the friction and catch occurring between the connecting terminals 171 of the connector 170 and the terminal plates 161. The occurrence of separation in the joined parts of the electrode tabs 100*t* and the terminal plates 161 can be precluded by causing this thrust force to be countered by the shearing strength generated by the punch caulking or the rivet 165, FIG. 24A illustrates the essential part of the cell 100 having the terminal plate 161 joined as piled up to the negative electrode tab 100*m*. Referring to FIG. 24A-FIG. 24C, in the present embodiment, the negative electrode tab 100*m* and the terminal plate 161 are joined by punch caulking. The punch caulking results in forming a convex part 163 on the front face of the terminal plate 161 and concave parts on the rear face of the terminal plate 161 and the negative electrode tab 100*m* (refer to FIG. 24B and FIG. 24C). The connector 170 is furnished with the connecting terminal 171 possessing elasticity and is inserted into the terminal plate 161 and the negative electrode tab 100*m*. The position of insertion of the connector 170 is indicated by a two-dot chain line in FIG. 24A and FIG. 24C. When the punch caulking is effected, the negative electrode tab 100*m* and the terminal plate 161 are brought into convexo-concave union and the surface along the convexo-concave direction perpendicularly intersects the direction of the thrust force generated during the insertion or extraction of the connector 170. As a result, it is made possible to offer resistance to the thrust force and prevent the joined parts of the negative electrode tab 100*m* and the terminal plate 161 from generating separation.

Figure 25A:
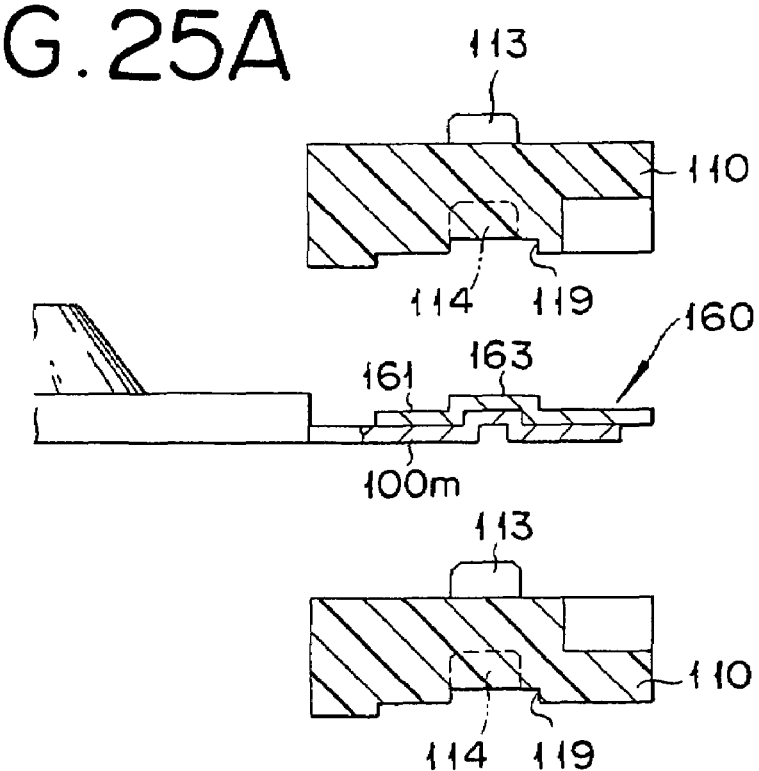
FIG. 25A is a cross section illustrating an insulating plate furnished with a concave part for admitting a convex part formed by the punch caulking on the surface of the voltage detecting terminal plate.

Referring to FIG. 25A, the spacer 110 is furnished with a concave part 119 permitting insertion therein of a convex part 163 which is formed on the surface of the terminal plate 161 by the punch caulking. When the negative electrode tab 100*m* is nipped, the concave part 119 of the spacer 110 and the convex part 163 on the surface of the terminal plate 161 are mutually fit. When the vibration is injected via the connector 170 into the terminal plate 161, the spacers 110 are enabled to repress the vibration and prevent the vibration from entering the negative electrode tab 100*m*. As a result, the electrode tab 100*t* is enabled to acquire exalted durability and the battery module 50 to manifest enhanced reliability without suffering the stress to concentrate on the parts of mutual union of the electrode tabs. Further, since the thrust force exerted on the terminal plate 161 is caught by the spacers 110, the thrust force exerted on the negative electrode tab 100*m* is alleviated and, in this respect, the durability of the negative electrode tab 100*m* can be exalted. The reference numeral 113 found in FIG. 25A denotes the pin which is disposed on the front face of the spacer 110. As already described, the pin 113 of the spacer 110 on the lower position side is inserted into the through holes 109 and 162 formed in the negative electrode tab 100*m* and the terminal plate 161 and fit into the concave part 114 of the spacer 110 on the upper position side.

Figure 25B:
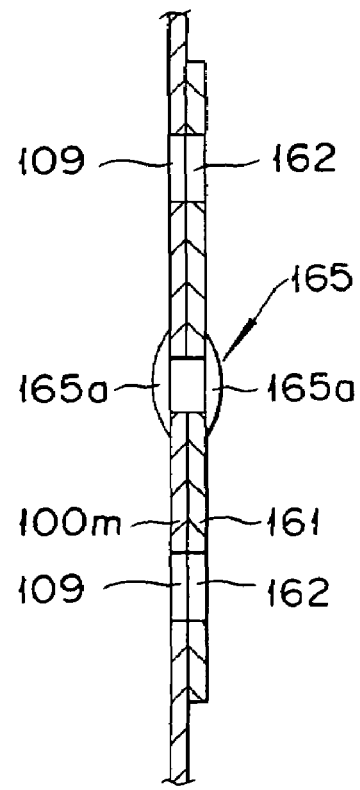
FIG. 25B is a cross section illustrating the state in which the electrode tab and the voltage detecting terminal plate are joined by a rivet.

FIG. 25B illustrates the state in which the negative electrode tab 100m and the terminal plate 161 are joined by means of the rivet 165. A head 165a of the rivet 165 protrudes from the opposite sides, i.e. the front face and the rear face, of the terminal plate 161 and forms convex pattern. When the union is attained by means of the rivet 165, the spacers 110 are preferably furnished with the concave parts 119 permitting insertion therein of the riveted heads 165a protruded from the front face and the rear face of the terminal plate 161 for the purpose of preventing the vibration and the thrust force from entering the negative electrode tab 100m.

Referring again to FIG. 15 and FIG. 16, the state of stacking of the cells 100 and the spacers 110 in the cell unit main body 80, the shapes of the electrode tabs 100t, and the state of electrical connection of the cells 100 will be further explained below. In FIG. 16, the spacers 110 are indicated with a broken line.

Referring first to FIG. 16, the shapes of the electrode tabs 100t will be explained. The electrode tabs 100t are possessed of varying shapes. The shapes of the electrode tabs 100t are fixed with a view to facilitating the union of the electrode tabs 100t in the sub-assemblies 81, 82, and 83 and as well facilitating the union of the electrode tabs 100t between the sub-assemblies 81, 82, and 83. The second cell 102 and the fifth cell 105 have the front and rear sides of a cell simply disposed as reversed in direction while retained per se and use the same cell. By the same token, the third cell 103 and the sixth cell 106 use the same cell and the fourth cell 104 and the seventh cell 107 use the same cell. The present cell unit main body 80, therefore, contains eight cells 101-108 and nevertheless use five kinds of cells differing in the shape of the electrode tab 100t. By decreasing the number of kinds of cells, the expense required for the production of the cells 100 can be decreased.

The shapes of the electrode tabs 100t are broadly divided under two types, i.e. the type having part of a tab elongated in the longer direction and verging on the outer side of the spacer 110 and the type having a tab wholly concealed by the spacer 110. The former type includes the positive electrode tab 102p of the second cell 102, the positive and negative electrode tabs 103p and 103m of the third cell 103, the negative electrode tab 104m of the fourth cell 104, the positive electrode tab 105p of the fifth cell 105, the positive and negative electrode tabs 106p and 106m of the sixth cell 106, and the negative electrode tab 107m of the seventh cell 107. The remainder electrode tabs, namely, the positive and negative electrode tabs 101p and 101m of the first cell 101, the negative electrode tab 102m of the second cell 102, the positive electrode tab 104p of the fourth cell 104, the negative electrode tab 105m of the fifth cell 105, the positive electrode tab 107p of the seventh cell 107, and the positive and negative electrode tabs 108p and 108m of the eighth cell 108 are included in the latter type.

The terminal plate 161 is joined as superposed to the negative electrode tab 100m in each cell 100. The positive electrodes 101p, 104p, and 107p which are nipped as superposed on the negative electrode tab 100m which is furnished with the terminal plate 161 possess the notches 100b for admitting the terminal plates 161 (refer additionally to FIG. 17).

Referring now to FIG. 16, the state of electrical connection of the cells 100 will be explained below. In FIG. 16, the electrically connected electrode tabs 100t are joined by connecting wires indicated by a two-dot chain line.

The "filled squares" affixed adjacently to the connecting lines indicate that in the first—third sub-assemblies 81, 82, and 83, the electrode tabs 100t verging on the open window parts 112 of the spacers 110 are mutually joined by ultrasonic welding. The "filled circles" annexed adjacently to the connecting lines indicate that in the first and the third sub-assemblies 81 and 83, the electrode tabs 100t verging on the outer sides of the spacers 110 are joined by ultraviolet welding outside the spacers 110. The "blank circles" affixed adjacently to the connecting lines indicate that when the sub-assemblies 81 and 82 and 82 and 83 are mutually joined after the sub-assemblies 81, 82, and 83 have been assembled, the electrode tabs 100t verging on the outer sides of the spacers 110 are mutually joined by ultraviolet welding outside the spacers 110.

When the first sub-assembly 81 is assembled, the positive electrode tab 101p of the first cell 101 and the negative electrode tab 102m of the second cell 102 are joined in the open window parts 112 and the positive electrode tab 102p of the second cell 102 and the negative electrode tab 103m of the third cell 103 are joined outside the spacers 110. The negative electrode tab 101m of the first cell 101 and the bus bar 151 of the negative output terminal 150 are also jointed in the open window parts 112 (refer to FIG. 19).

When the second sub-assembly 82 is assembled, the positive electrode tab 104 of the fourth cell 104 and the negative electrode tab 105m of the fifth cell 105 are joined in the open window parts 112.

When the third sub-assembly 83 is assembled, the positive electrode tab 107p of the seventh cell 107 and the negative electrode tab 108m of the eighth cell 108 are joined in the open window parts 112 and the positive electrode tab 106p of the sixth cell 106 and the negative electrode tab 107m of the seventh cell 107 are joined outside the spacers 110. The positive electrode tab 108p of the eighth cell 108 and the bus bar 141 of the positive output terminal 140 are joined in the open window parts 112.

When the first sub-assembly 81 and the second sub-assembly 82 are connected after the sub-assemblies 81, 82, and 83 have been assembled, the positive electrode tab 103p of the third cell 103 and the negative electrode tab 104m of the fourth cell 104 are joined outside the spacers 110. When the second sub-assembly 82 and the third sub-assembly 83 are connected, the positive electrode tab 105p of the fifth cell 105 and the negative electrode tab 106m of the sixth cell 106 are joined outside the spacers 110. Thus, the eight stacked cells 101-108 are joined in serial connection in consequence of the electrical connection of the electrode tabs 100p and 100m differing in electrical polarity and the positive output terminal 140 and the negative output terminal 150 are electrically connected to the eighth and first cells 108 and 101 which are positioned at the opposite ends along the stacking direction.

On the front surface side, four voltage detecting parts 160 are arrayed on one and the same line along the stacking direction of cells with the terminal plates 161 in the negative electrode tabs 101m, 103m, 105m, and 107m respectively of the first, third, fifth, and seventh cells 101, 103, 105, and 107. On the rear surface side, four voltage detecting parts 160 are arrayed on one and the same line along the stacking direction of cells with the terminal plates 161 in the negative electrode tabs 102m, 104m, 106m, and 108m respectively of the second, fourth, sixth, and eighth cells 102, 104, 106, and 108. For example, the voltage of the first cell 101 can be found by determining the voltage between the first voltage detecting part 160 from above on the front surface side and the first voltage detecting part 160 from above on the rear surface side. The voltage of the second cell 102 can be found by determining the voltage between the first voltage detecting part 160 from above on the rear surface side and the second voltage detecting part 160 from above on the front surface side. Likewise, the voltages of the third-eighth cells 103-108 can be found.

Now, the state of stacking of the cells 100 and the spacers 110 in the cell unit main body 80 will be explained below with reference to FIG. 15. In FIG. 15, the member projecting from the front face of the spacer 110 represents the pin 113 and the member projecting from the rear face thereof represents the snap fit claw 116. The front surface side and the rear surface side will be explained below as separated from each other.

First, on the front surface side, the first and second spacers 121 and 122 nip the negative electrode tab 101m and the bus bar 151 of the negative output terminal 150 in a superposed state. The second and third spacers 122 and 123 nip the positive electrode tab 102p of the second cell 102. The third and fourth spacers 123 and 124 nip the negative electrode tab 103m of the third cell 103. The fifth and sixth spacers 125 and 126 nip the positive electrode tab 104p of the fourth cell 104 and the negative electrode tab 105m of the fifth cell 105 in a superposed state. The sixth and seventh spacers 126 and 127 nip the positive electrode tab 106p of the sixth cell 106. The seventh and eighth spacers 127 and 128 nip the negative electrode tab 107m of the seventh cell 107. The eighth and ninth spacers 128 and 129 nip the positive electrode tab 108p of the eighth cell 108 and the bus bar 141 of the positive output terminal 140 in a superposed state.

On the rear surface side, the 10th spacer 130 is superposed on the 11th spacer 131. The 11th and 12th spacers 131 and 132 nip the positive electrode tab 101p of the first cell 101 and the negative electrode tab 102m of the second cell 102 in a superposed state. The 12th and 13th spacers 132 and 133 nip the positive electrode tab 103p of the third cell 103. The 13th and 14th spacers 133 and 134 nip the negative electrode tab 104m of the fourth cell 104. The 14th and 15th spacers 134 and 135 nip the positive electrode tab 105p of the fifth cell 105. The 15th and 16th spacers 135 and 136 nip the negative electrode tab 106m of the sixth cell 106. The 17th and 18th spacers 137 and 138 nip the positive electrode tab 107p of the seventh cell 107 and the negative electrode tab 108m of the eighth cell 108 in a superposed state.

The spacers 110 also have varying shapes. Some of the spacers have the front and rear sides thereof maintained per se and disposed as reversed in direction on the front surface side and the rear surface side. Further, the nine spacers 121-129 on the front surface side include the same spacers and the nine spacers 130-138 on the rear surface side include the same spaces. The cell unit main body 80 include 18 spacers 121-138 and use eight kinds of spacers differing in shape. The kinds of the first spacer 121—the 18th spacer 138 are shown below by using the signs of #8-#15.

| Rear surface side | | Front surface side | |
| --- | --- | --- | --- |
| The 10th spacer 130: | #9 | The first spacer 121: | #9 |
| The 11th spacer 131: | #12 | The second spacer 122: | #13 |
| The 12th spacer 132: | #11 | The third spacer 123: | #10 |
| The 13th spacer 133: | #10 | The fourth spacer 124: | #11 |
| The 14th spacer 134: | #11 | The fifth spacer 125: | #12 |
| The 15th spacer 135: | #10 | The sixth spacer 126: | #11 |
| The 16th spacer 136: | #11 | The seventh spacer 127: | #10 |
| The 17th spacer 137: | #15 | The eighth spacer 128: | #9 |
| The 18th spacer 138: | #14 | The ninth spacer 129: | #8 |

Now, the procedure for assembling the battery module 50 in the present embodiment will be described below. In FIG. 27, FIG. 29, FIG. 31, FIG. 33, FIG. 35, FIG. 37, and FIG. 29, the positions subjected to ultrasonic welding are indicated with hatching.

(Assemblage of First Sub-assembly 81)

Figure 26:
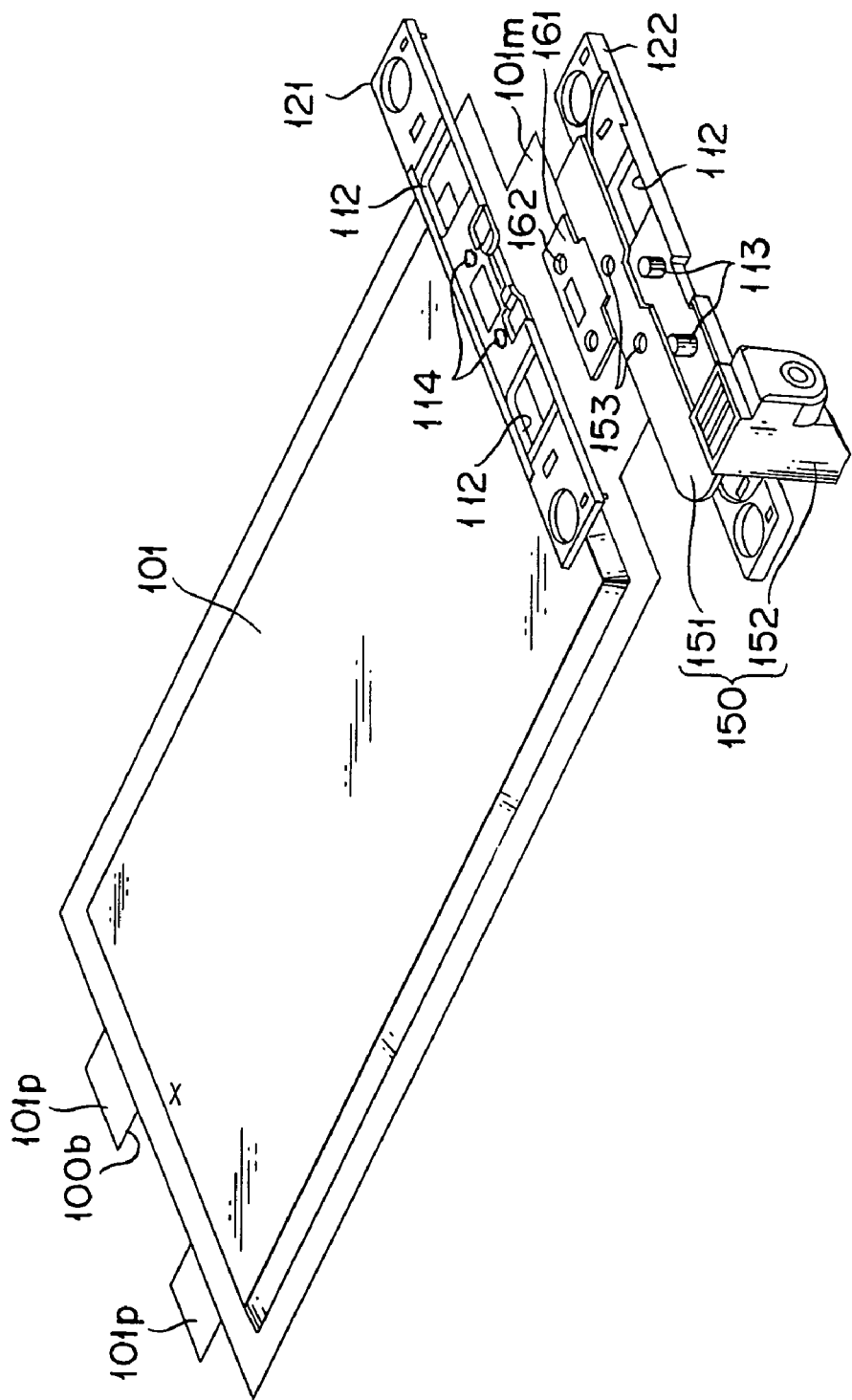
FIGS. 26-31 are diagrams showing a procedure for assembling a first sub-assembly according to an embodiment of the present invention.
Figure 27:
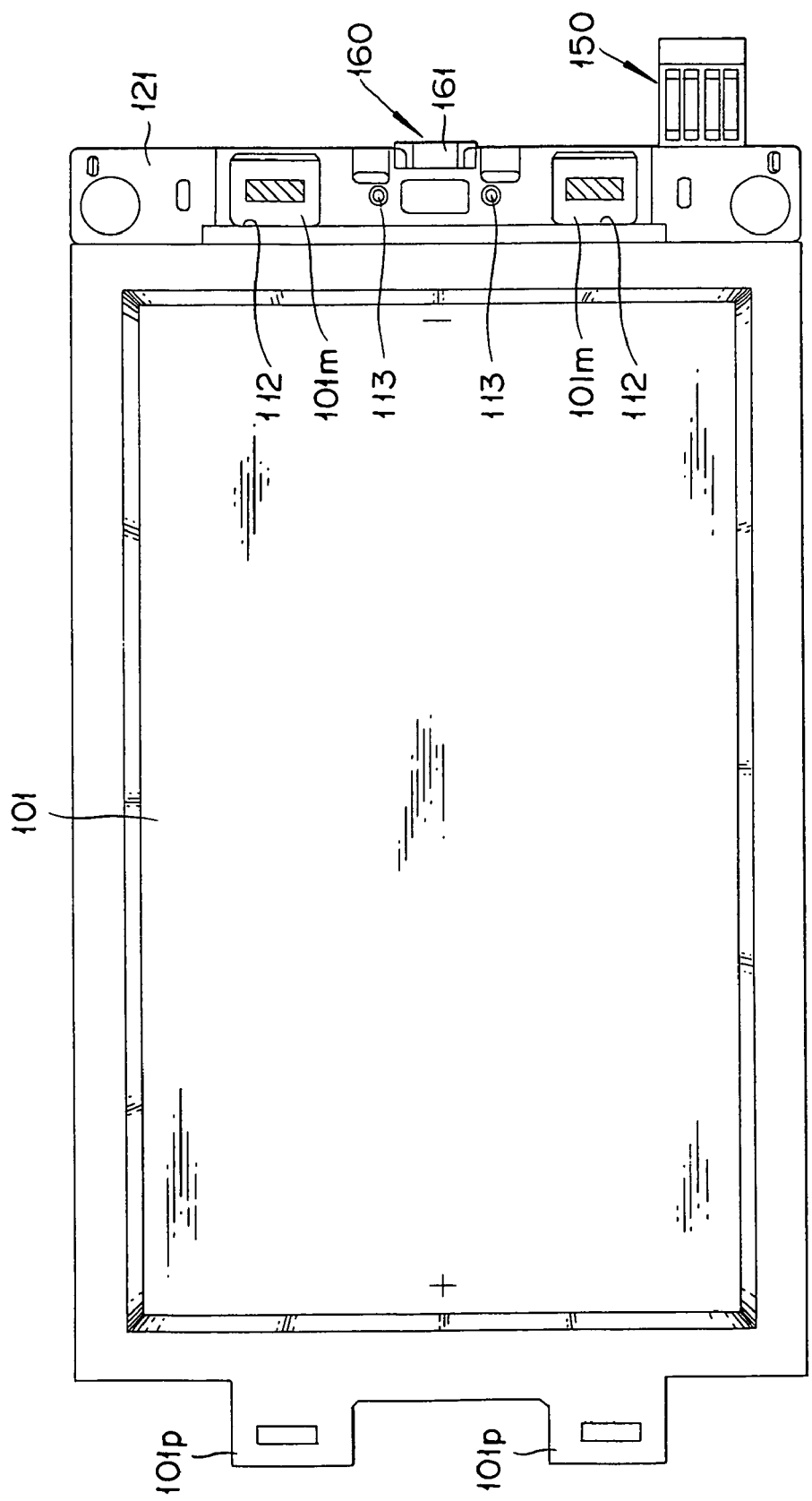

On the front surface side, the first and second spacers 121 and 122 nip the negative electrode tab 101m of the first cell 101 and the bus bar 151 of the negative output terminal 150 in a superposed state and part of the negative electrode tab 101m and part of the negative output terminal 150 as verging on the open window parts 112 as illustrated in FIG. 26. The pins 113 of the second spacer 122 are passed through the through holes 153, 109, and 162 respectively of the bus bar 151, the negative electrode tab 101m and the terminal plate 161 and fit into the concave parts 114 of the first spacer 121. The negative electrode tab 101m and the bus bar 151 which are verging on the open window parts 112 as illustrated in FIG. 27 are joined by ultrasonic welding. As a result, the negative output terminal 150 is electrically connected to the first cell 101.

Figure 28:
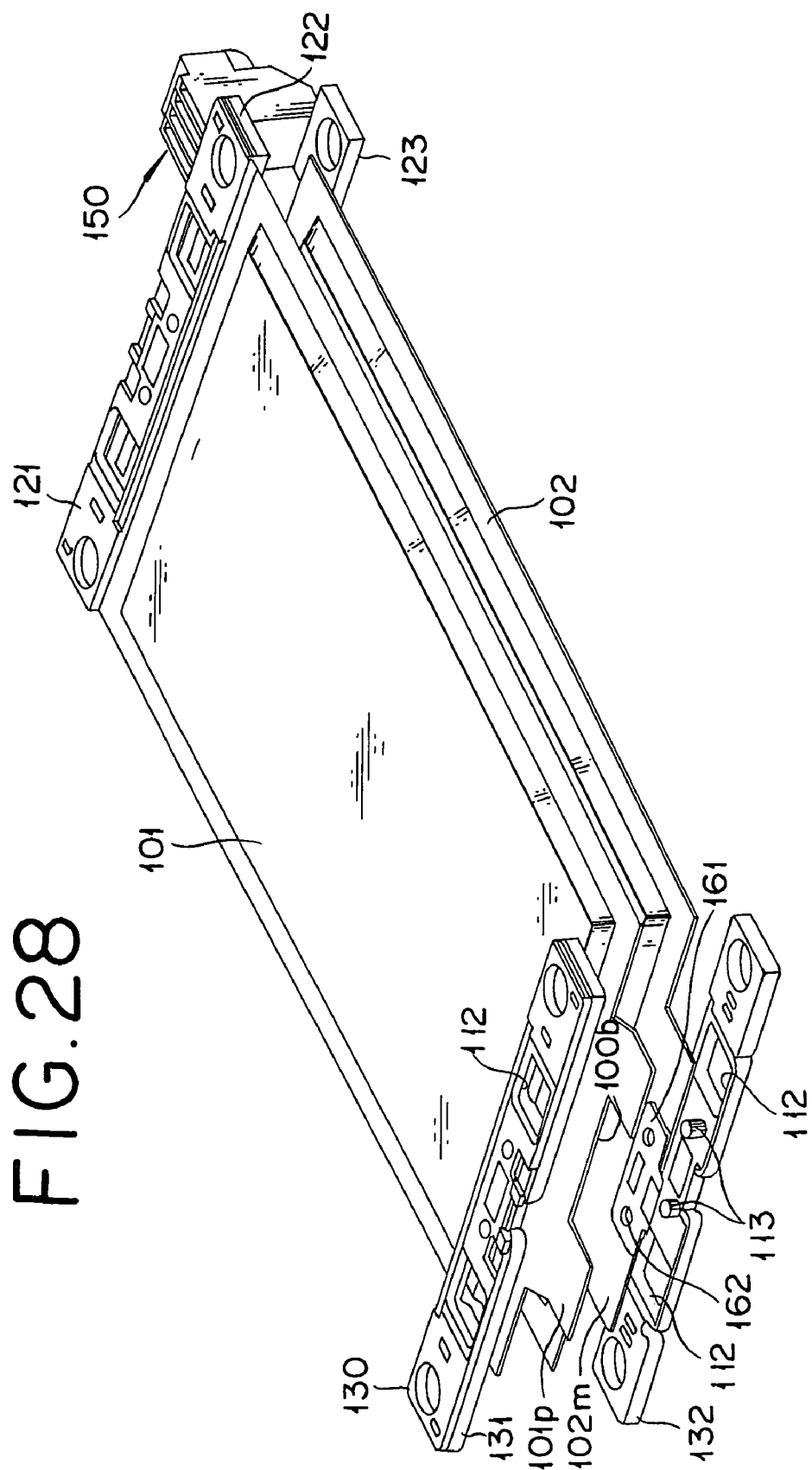
Figure 29:
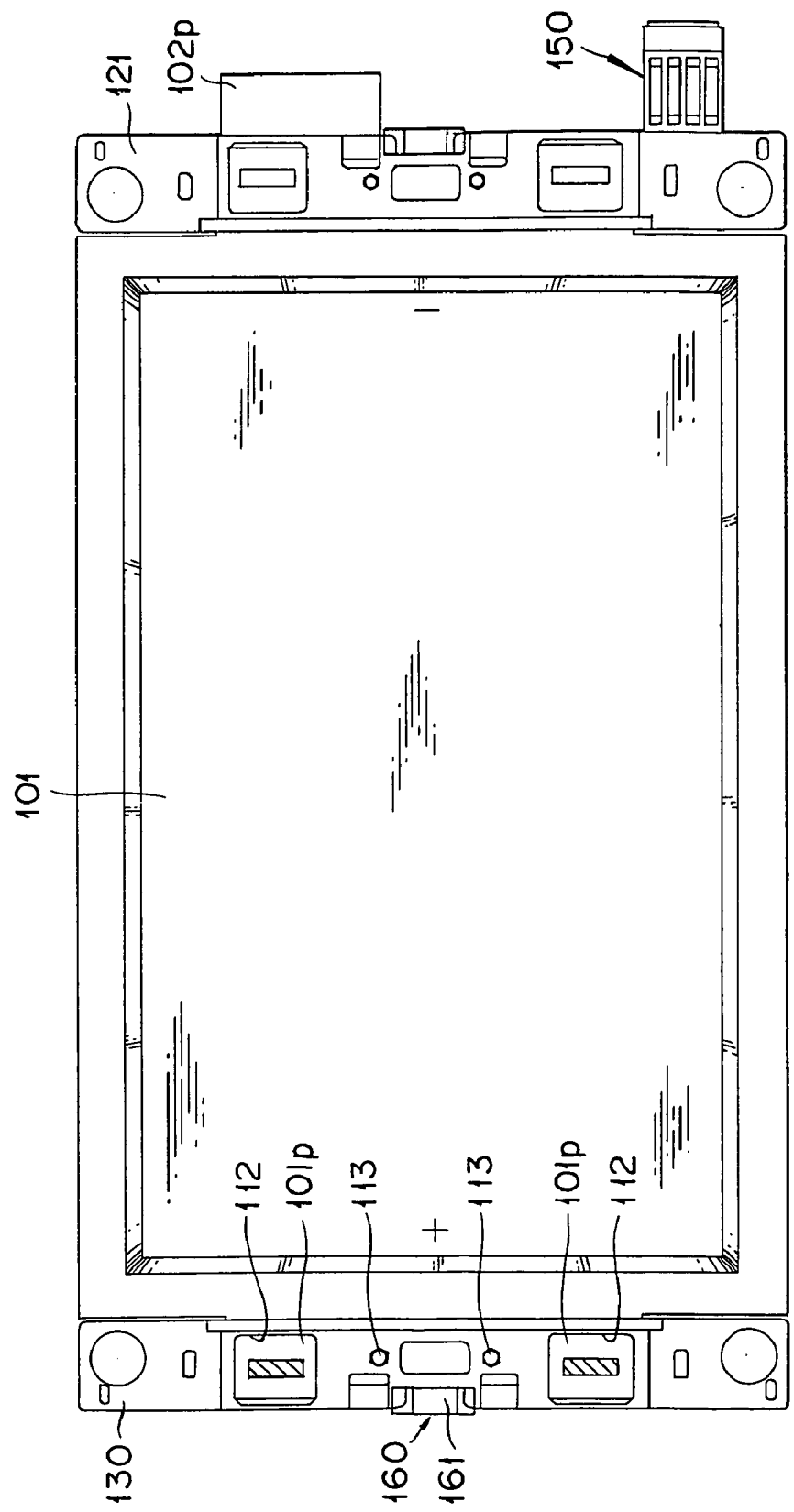

The tenth spacer 130 is superposed on the 11th spacer 131 on the rear surface side as illustrated in FIG. 28. The 11th and 12th spacers 131 and 132 nip the positive electrode tab 101p of the first cell 101 and the negative electrode tab 102m of the second cell 102 in a superposed state and the electrode tabs 101p and 102m as partly verging on the open window parts 112. The pins 113 of the 12th spacer 132 are passed through the through holes 109 and 162 respectively of the negative electrode tab 102m and the terminal plate 161 and fit into the convex parts 114 of the 11th spacer 131. Since the terminal plate 161 cannot overlie the positive electrode tab 101p, the electrode tabs 101p and 102m are nipped as mutually joined tightly. The opposed surfaces of the first cell 101 and the second cell 102 are joined with a double-coated tape. The positive electrode tab 101p and the negative electrode tab 102m which are verging on the open window parts 112 as illustrated in FIG. 29 are joined by ultrasonic welding. As a result, the first cell 101 and the second cell 102 are joined in serial connection. Further, on the front surface side, the second and third spacers 122 and 123 nip the positive electrode tab 102p of the second cell 102 with part of the positive electrode tab 102p verging on the outer sides of the spacers 122 and 123 (refer to FIG. 28 and FIG. 29). The pins 113 of the third spacer 123 are passed through the through holes 109 of the positive electrode tab 102p and fit into the concave parts 114 of the second spacer 122.

Figure 30:
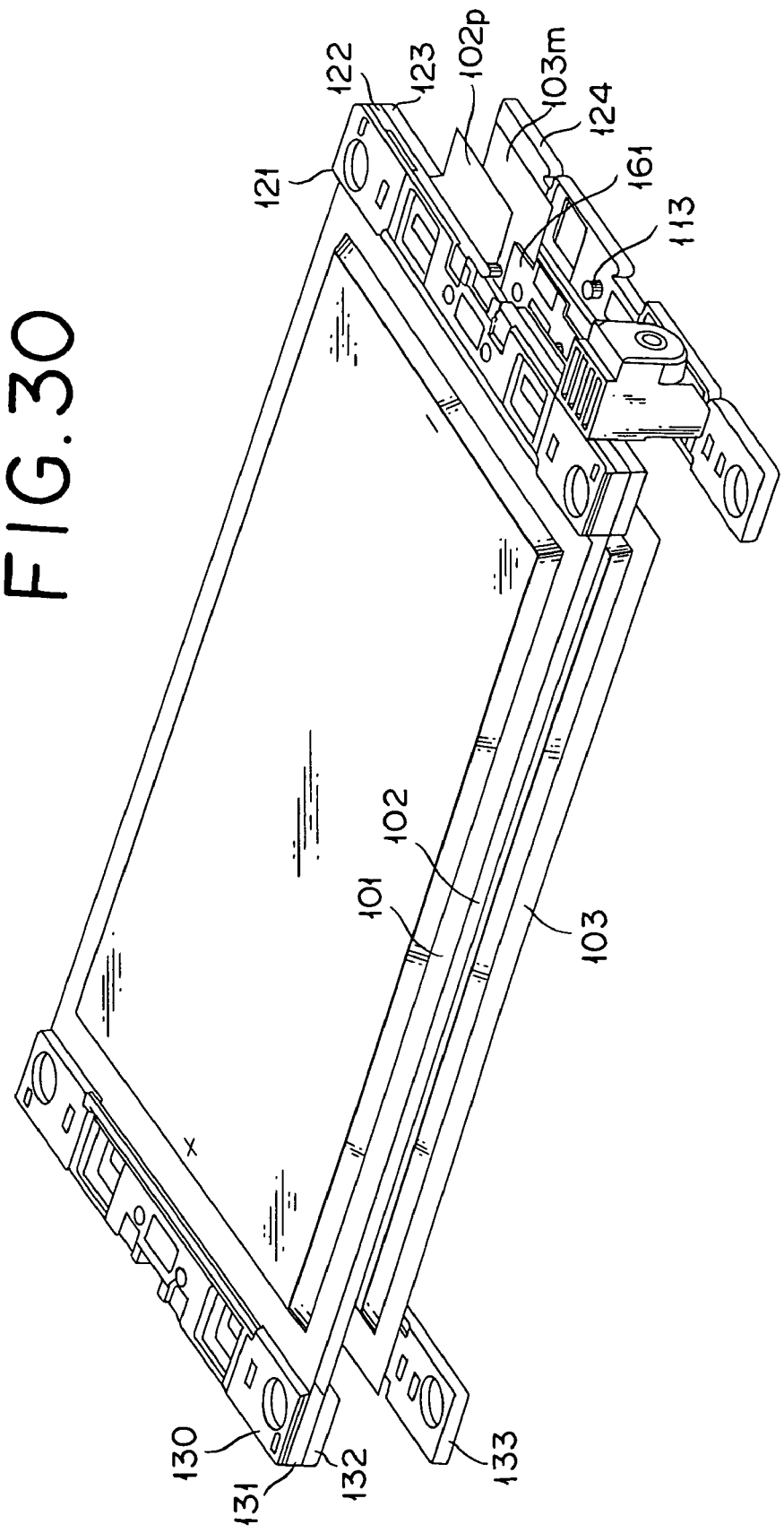
Figure 31:
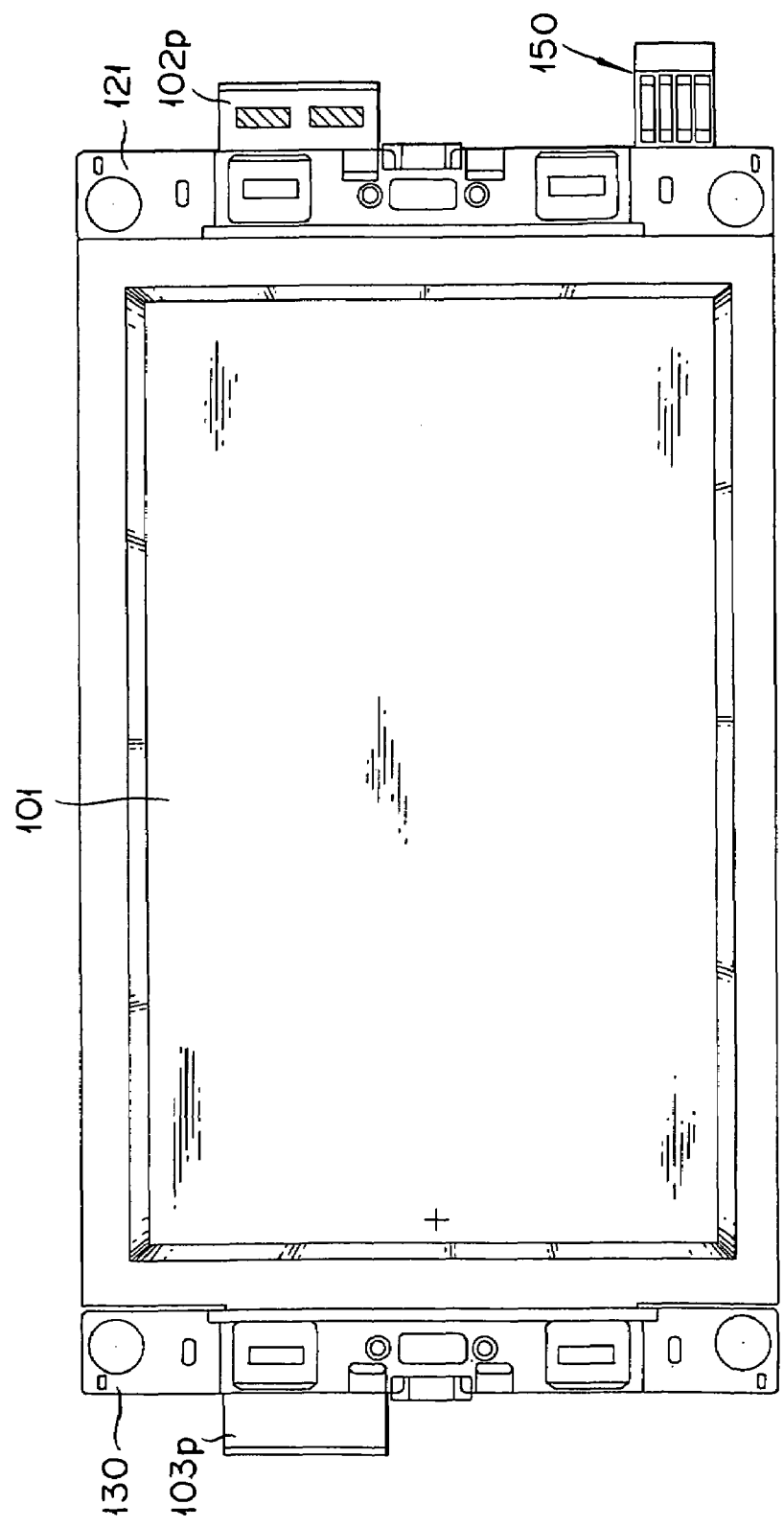

On the front surface side, the third and fourth spacers 123 and 124 nip the negative electrode tab 103m of the third cell 103 with part of the negative electrode tab 103 verging on the outer sides of the spacers 123 and 124 as illustrated in FIG. 30. The pins 113 of the fourth spacer 124 are passed through the through holes 109 and 162 respectively of the negative electrode tab 103m and the terminal plate 161 and fit into the concave parts 114 of the third spacer 123. The opposed surfaces of the second cell 102 and the third cell 103 are bonded with a double-coated tape. The positive electrode tab 102p of the second cell 102 and the negative electrode tab 103m of the third cell 103 which verge on the outer sides of the spacers 121-124 are joined by ultrasonic welding outside the spacers 121-124 as illustrated in FIG. 31. As a result, the second cell 102 and the third cell 103 are joined in serial connection. Then, on the rear surface side, the 12th and 13th spacers 132 and 133 nip the positive electrode tab 103p of the third cell 103 with part of the positive electrode tab 103p verging on the outer sides of the spacers 132 and 133 (refer to FIG. 30 and FIG. 31). The pins 113 of the 13th spacer 132 are passed through the through holes 109 of the positive electrode tab 103p and fit into the concave parts 114 of the 12th spacer 132.

By these steps, the assemblage of the first sub-assembly 81 is completed.

(Assemblage of the Second Sub-assembly 82)

Figure 32:
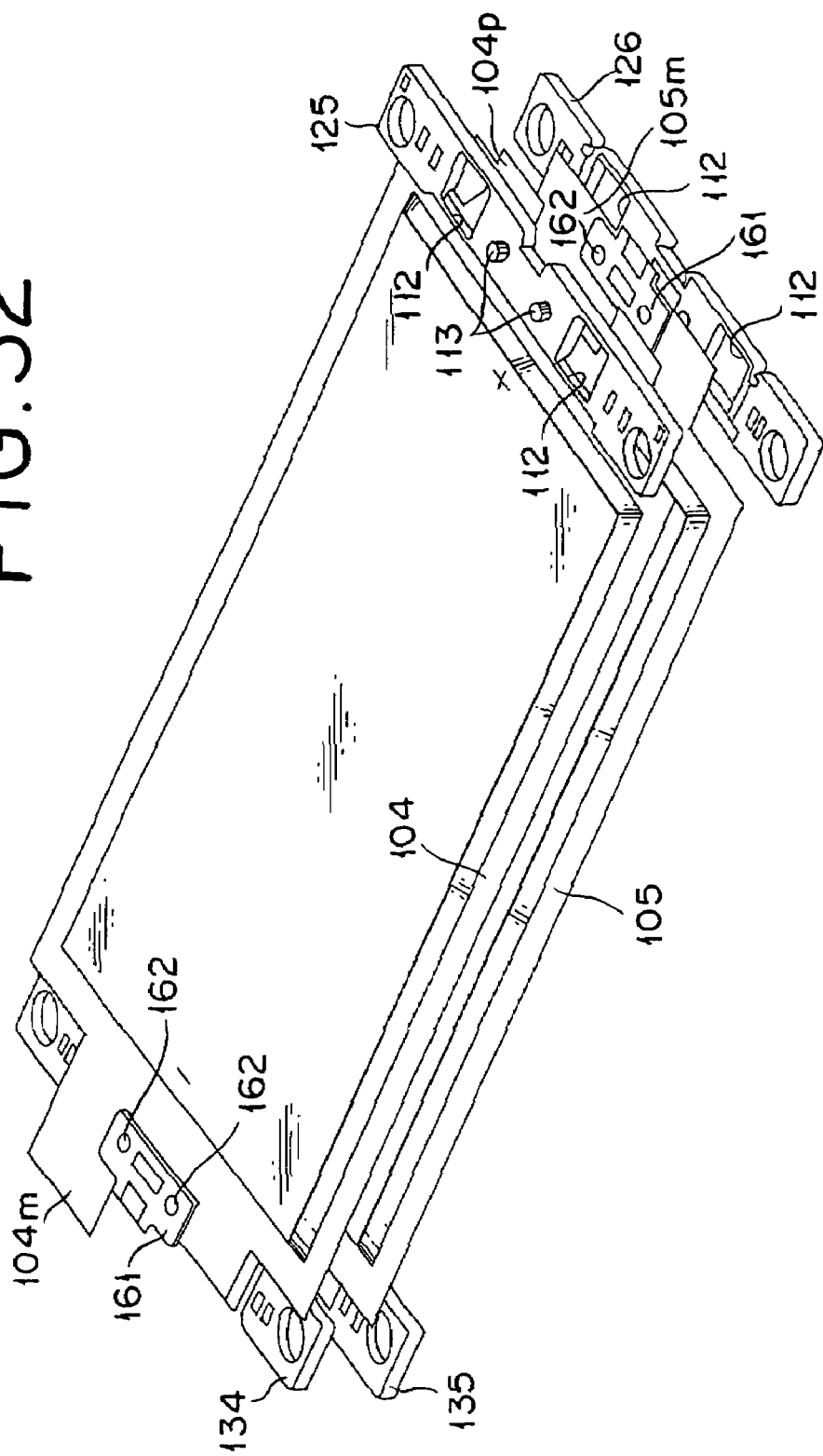
FIGS. 32 and 33 are diagrams showing a procedure for assembling a second sub-assembly according to an embodiment of the present invention.
Figure 33:
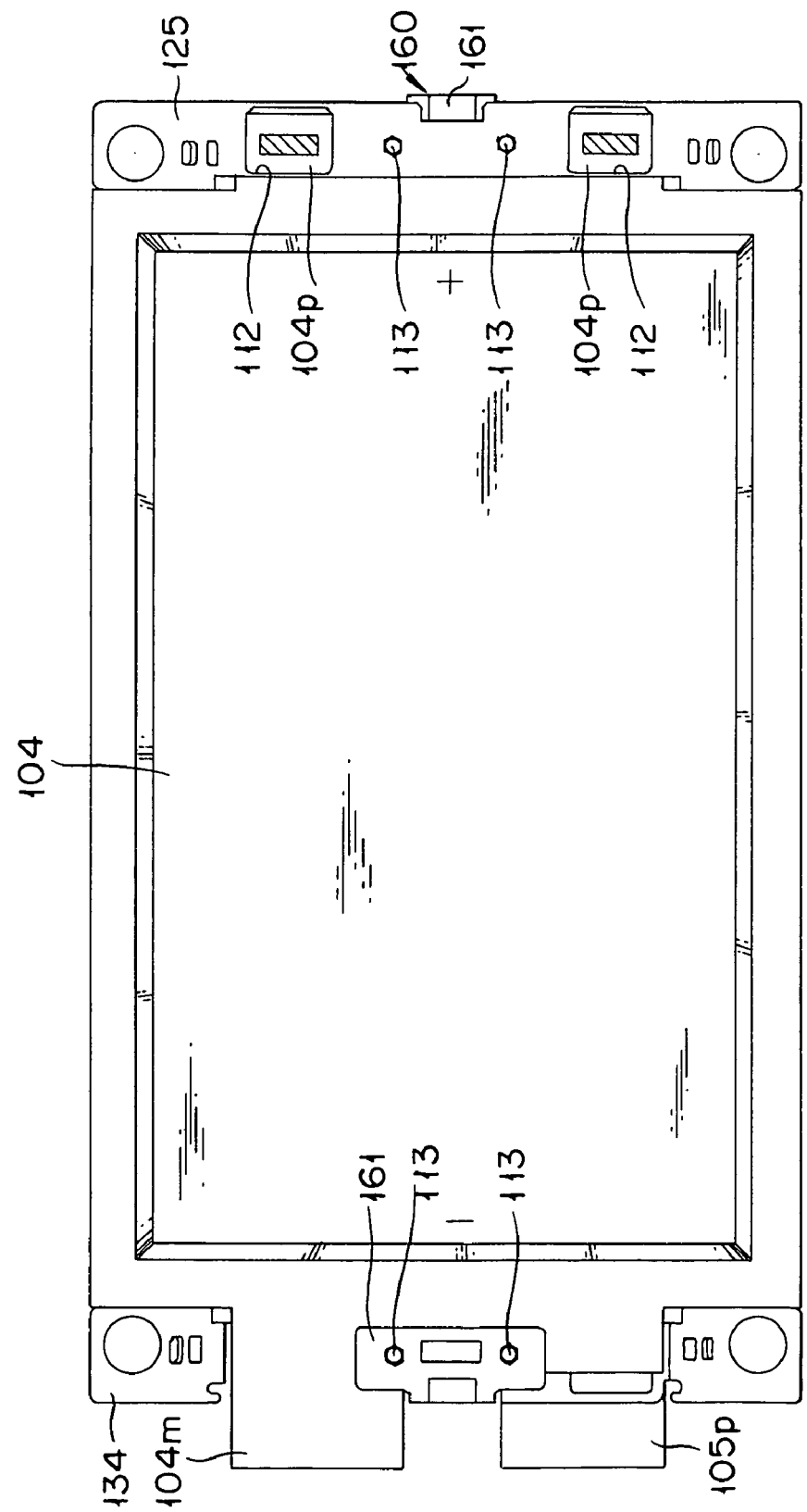

On the front surface side, the fifth and sixth spacers 125 and 126 nip the positive electrode tab 104p of the fourth cell 104 and the negative electrode tab 105m of the fifth cell 105, with the electrode tabs 104p and 105m piled up and partly verging on the open window parts 112 as illustrated in FIG. 32. The pins 113 of the sixth spacer 126 are passed through the through holes 109 and 162 respectively of the negative electrode tab 105m and the terminal plate 161 and fit into the concave parts 114 of the fifth spacer 125. Since the positive electrode tab 104p cannot overlie the terminal plate 161, the electrode tabs 104p and 105m are nipped as mutually joined tightly. The opposed surfaces of the fourth cell 104 and the fifth cell 105 are bonded with a double-coated tape. The positive electrode tab 104p and the negative electrode tab 105m which verge on the open window parts 112 as illustrated in FIG. 33 are joined by ultrasonic welding. As a result, the fourth cell 104 and the fifth cell 105 are joined in serial connection. Then, on the rear surface side, the 14th and 15th spacers 134 and 135 nip the positive electrode tab 105p of the fifth cell 105, with the positive electrode tab 105p partly verging on the outer sides of the spacers 134 and 135 (refer to FIG. 32 and FIG. 33). The pins 113 of the 14th spacer 134 are passed through the through holes 109 and 162 respectively of the negative electrode tab 104m and the terminal plate 161.

These steps complete the assemblage of the second sub-assembly 82.

(Assemblage of the Third Sub-assembly 83)

Figure 34:
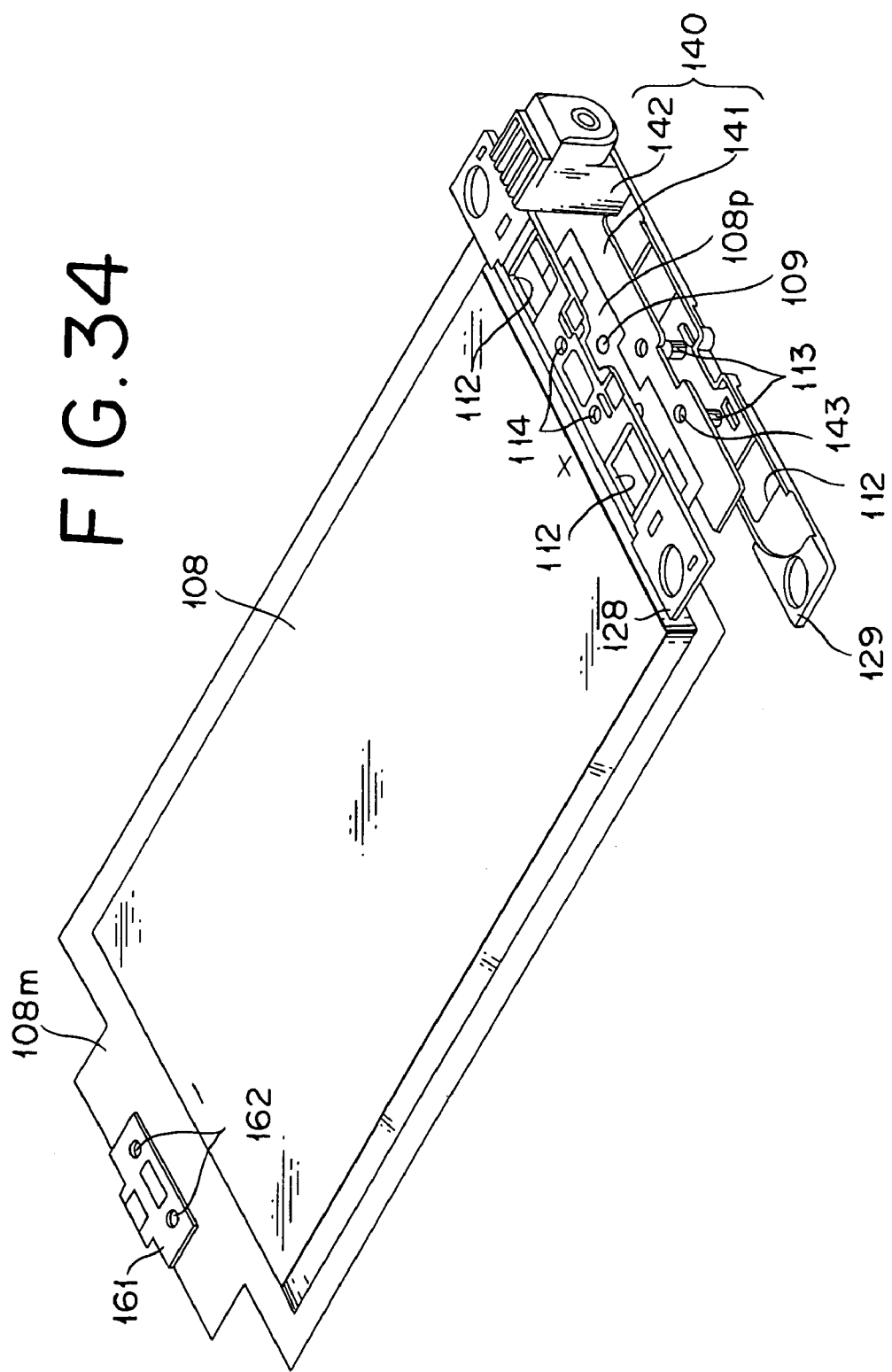
FIGS. 34-39 are diagrams showing a procedure for assembling a third sub-assembly according to an embodiment of the present invention.
Figure 35:
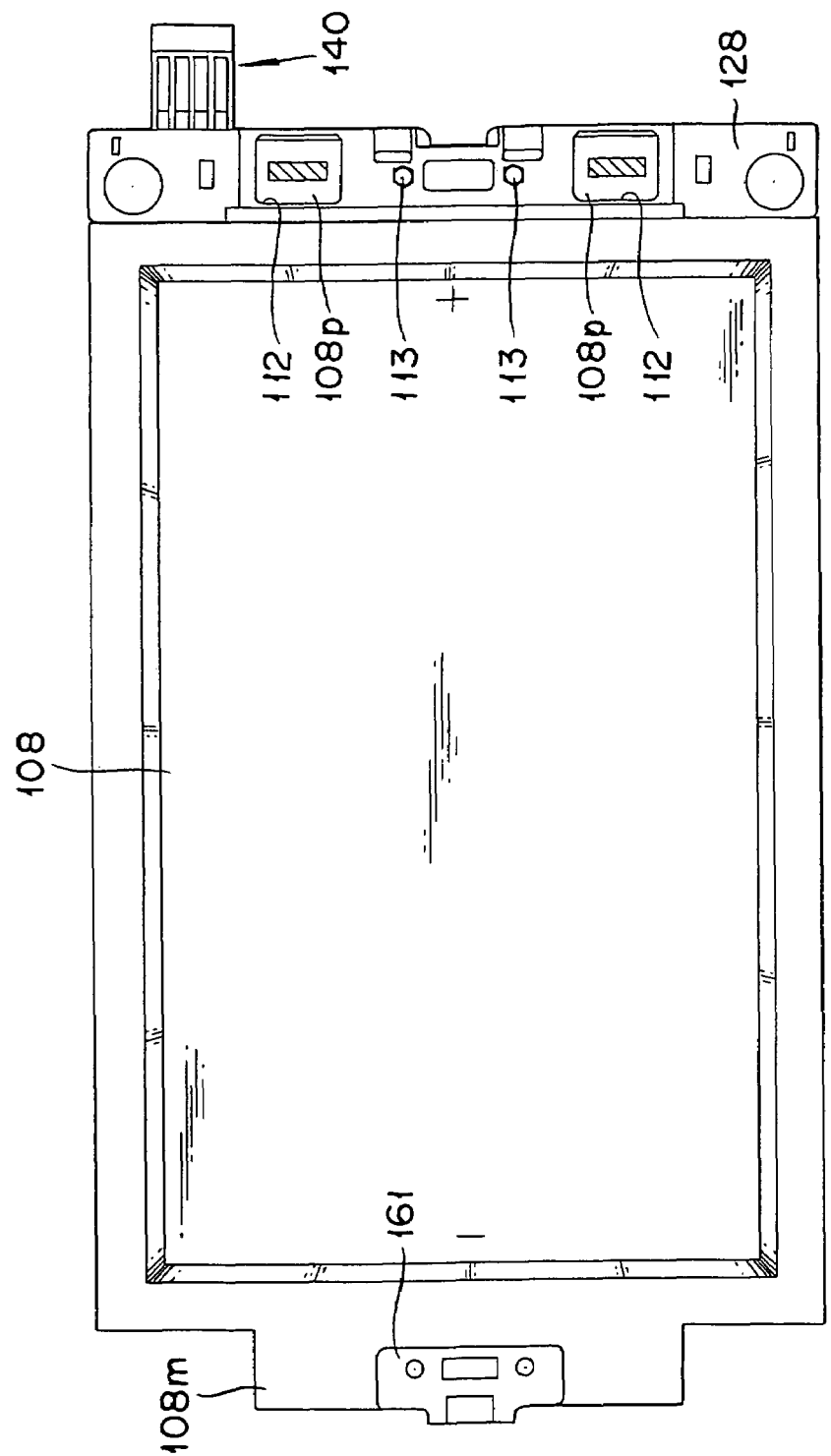

On the front surface side, the eighth and ninth spacers 128 and 129 nip the positive electrode tab 108p of the eighth cell 108 and the bus bar 141 of the positive output terminal 140 as piled up, with part of the positive electrode tab 108p and part of the positive output terminal 140 verging on the open window parts 112 as illustrated in FIG. 34. The pins 113 of the ninth spacer 129 are passed through the through holes 143 and 109 respectively of the bus bar 141 and the positive electrode tab 108p and fit into the concave parts 114 of the eighth spacer 128. The positive electrode tab 108p and the bus bar 141 which verge on the open window parts 112 as illustrated in FIG. 35 are joined by ultrasonic welding. As a result, the positive output terminal 140 is electrically connected to the eighth cell 108.

Figure 36:
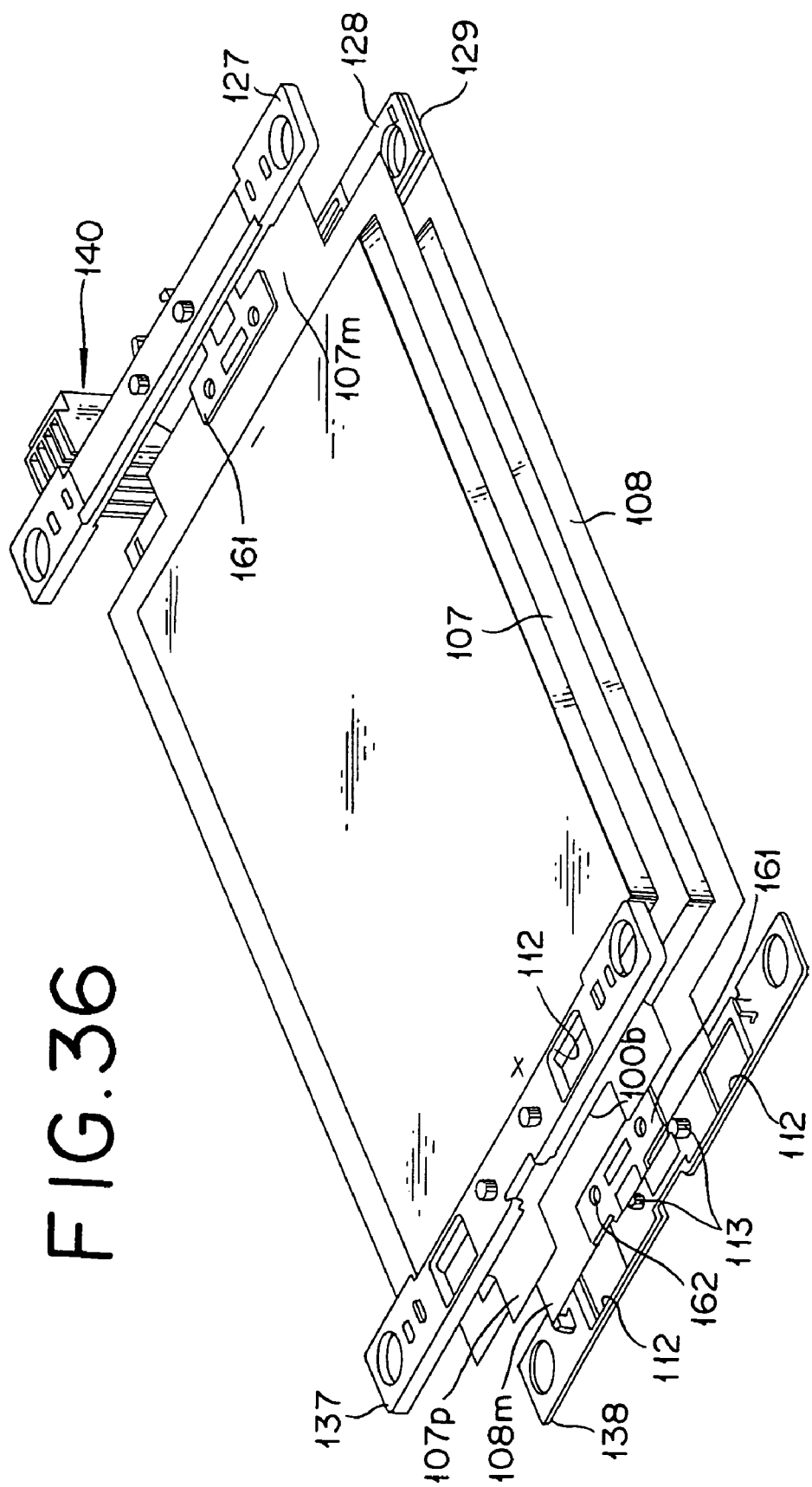
Figure 37:
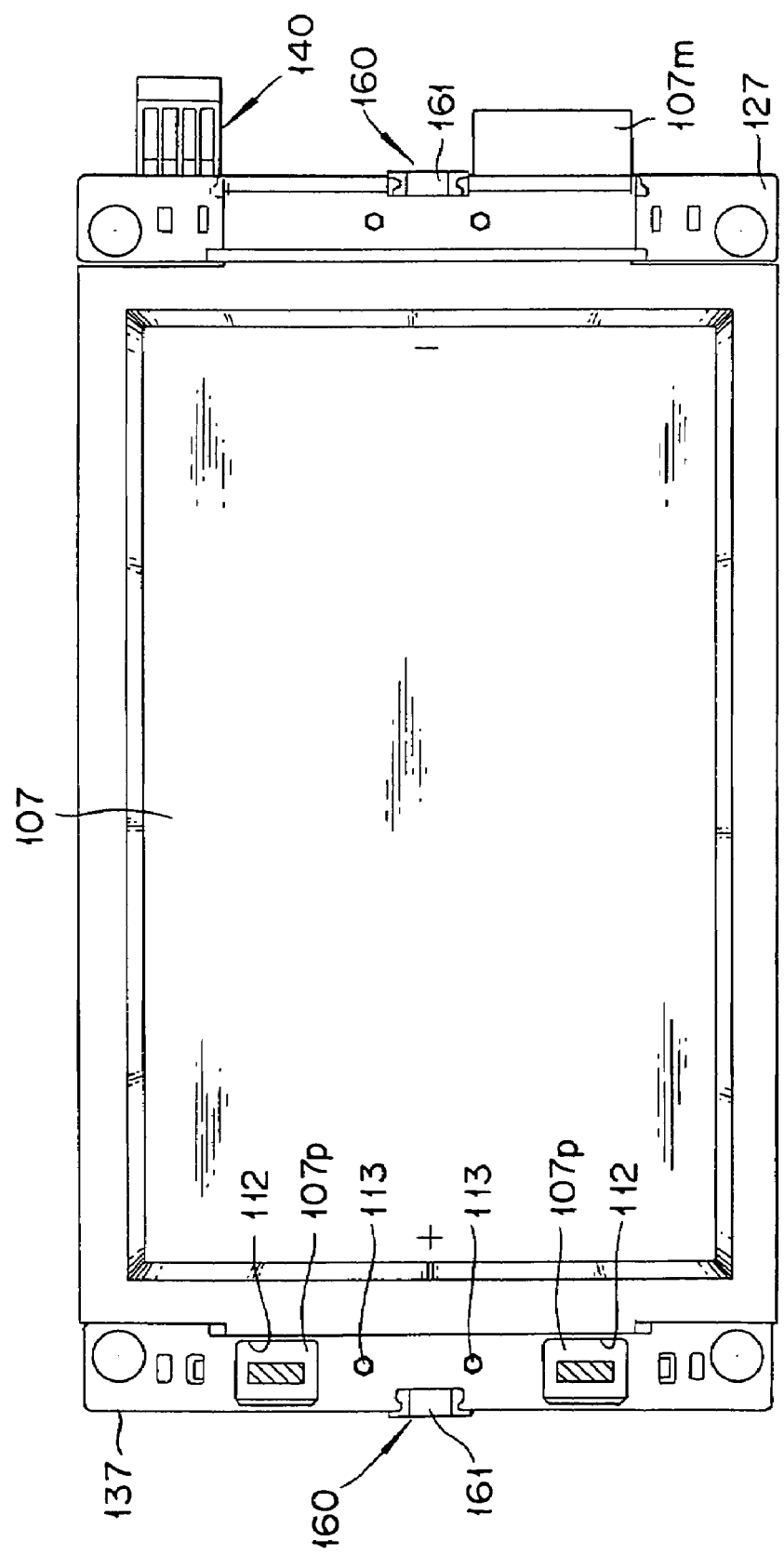

On the rear surface side, the 17th and 18th spacers 137 and 138 nip the positive electrode tab 107p of the seventh cell 107 and the negative electrode tab 108m of the eighth cell 108 as piled up, with the electrode tabs 107p and 108m partly verging on the open window parts 112 as illustrated in FIG. 36. The pins 113 of the 18th spacer 138 are passed through the through holes 109 and 162 respectively of the negative electrode tab 108m and the terminal plate 161 and fit into the convex parts 114 of the 17th spacer 137. Since the positive electrode tab 107p cannot overlie the terminal plate 161, the electrode tabs 107p and 108m are nipped as joined tightly. The opposed surfaces of the seventh cell 107 and the eighth cell 108 are bonded with a double-coated tape. The positive electrode tab 107p and the negative electrode tab 108m which verge on the open window parts 112 as illustrated in FIG. 37 are joined by ultrasonic welding. As a result, the seventh cell 107 and the eighth cell 108 are joined in serial connection. Then, on the front surface side, the seventh and eighth spacers 127 and 128 nip the negative electrode tab 107m of the seventh cell 107, with the negative electrode tab 107m partly verging on the outer sides of the spacers 127 and 128 (refer to FIG. 36 and FIG. 37). The pins 113 of the eighth spacer 128 are passed through the through holes 109 and 162 respectively of the negative electrode tab 107m and the terminal plate 161 and fit into the concave parts 114 of the seventh spacer 127.

Figure 38:
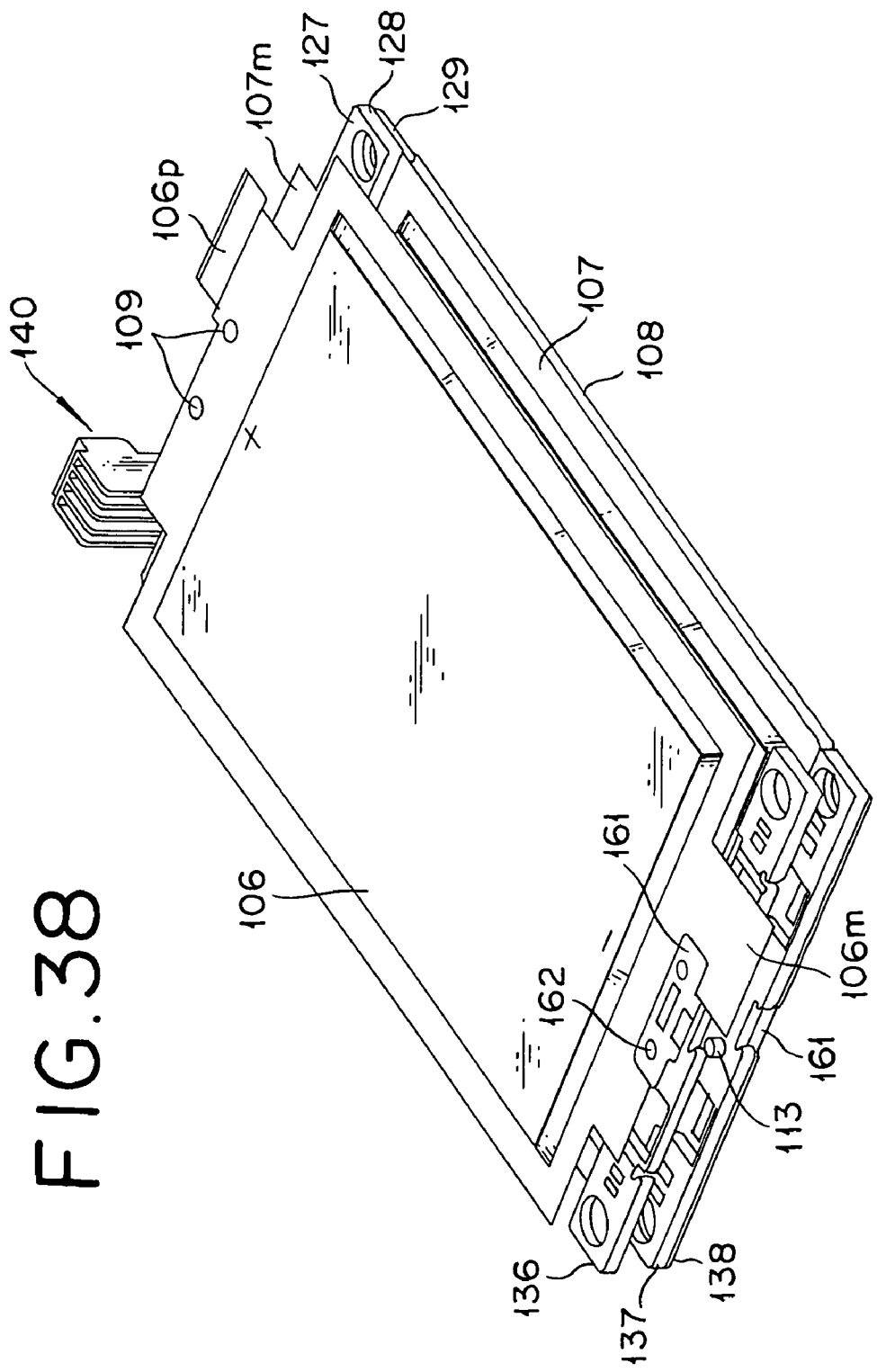
Figure 39:
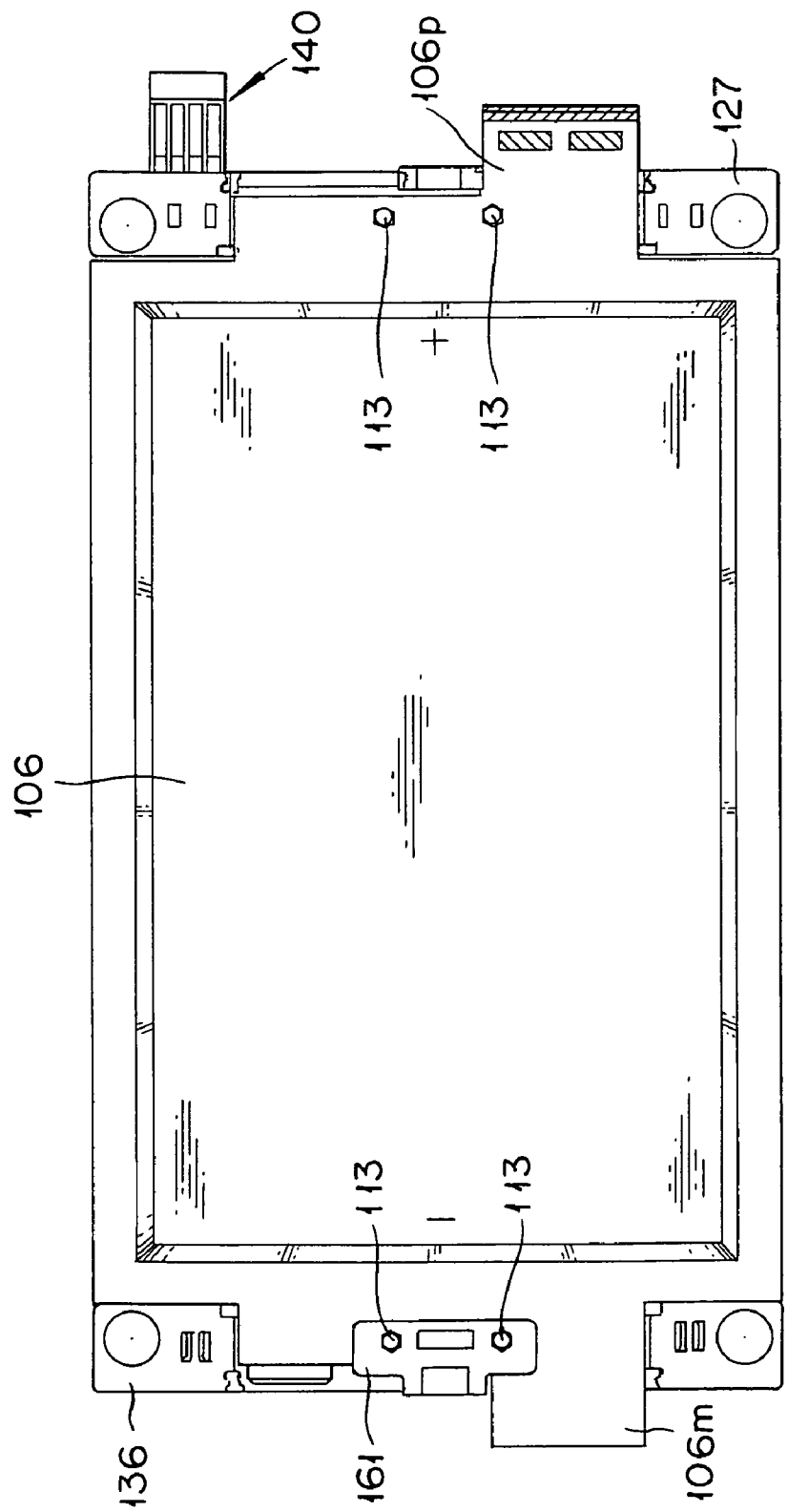

On the rear surface side, the 16th spacer 136 is stacked on the 17th spacer 137 as illustrated in FIG. 38. The pins 113 of the 17th spacer 137 are fit into the concave parts 114 of the 16th spacer 136. The negative electrode tab 106m of the sixth cell 106 is mounted on the 16th spacer 136, with the negative electrode 106m partly verging on the outer side of the spacer 136. The pins 113 of the 16th spacer 136 are passed through the through holes 109 and 162 respectively of the negative electrode tab 106m and the terminal plate 161. The opposed surfaces of the sixth cell 106 and the seventh cell 107 are bonded with a double-coated tape. On the front surface side, the positive electrode tab 106p of the sixth cell 106 is mounted on the seventh spacer 127, with the positive electrode tab 106p partly verging on the outer side of the spacer 127 as illustrated in FIG. 39. The pins 113 of the seventh spacer 127 are passed through the through holes 109 of the positive electrode tab 106p. Then, the positive electrode tab 106p and the negative electrode tab 107m which verge on the outer sides of the spacers 127 and 128 are joined by ultrasonic welding outside the spacers 127 and 128. As a result, the sixth cell 106 and the seventh cell 107 are joined in serial connection.

These steps complete the assemblage of the third sub-assembly 83.

(Mutual Connection of Sub-assemblies 81 and 82 and 82 and 83)

When the first sub-assembly 81 and the second sub-assembly 82 are to be connected, the pins 113 of the fifth spacer 125 are fit into the concave parts 114 of the fourth spacer 124 on the front surface side and the pins 113 of the 14th spacer 134 are passed through the through holes 109 and 162 respectively of the negative electrode tab 104m of the fourth cell 104 and the terminal plate 161 and then fit into the concave parts 114 of the 13th spacer 133 on the rear surface side by consulting FIG. 10-FIG. 12 and FIG. 15. As a result, the first sub-assembly 81 and the second sub-assembly 82 are positioned and connected. Then, on the rear surface side, the positive electrode tab 103p of the third cell 103 and the negative electrode tab 104m of the fourth cell 104 are joined by ultrasonic welding outside the spacers 130-135. As a result, the first sub-assembly 81 and the second sub-assembly 82 are joined in serial connection.

When the second sub-assembly 82 and the third sub-assembly 83 are to be joined, the pins 113 of the seventh spacer 127 are passed through the through holes 109 of the positive electrode tab 106p of the sixth cell 106 and then fit into the concave parts 114 of the sixth spacer 126 on the front surface side and the pins 113 of the 16th spacer 136 are passed through the through holes 109 and 162 respectively of the negative electrode tab 106m of the sixth cell 106 and the terminal plate 161 and subsequently fit into the concave parts 114 of the 15th spacer 135 on the rear surface side. As a result, the second sub-assembly 82 and the third sub-assembly 83 are positioned and connected. Then, on the rear surface side, the positive electrode tab 105p of the fifth cell 105 and the negative electrode tab 106m of the sixth cell 106 are joined by ultrasonic welding outside the spacers 130-138. As a result, the first—third sub-assemblies 81, 82, and 83 are joined in serial connection.

Figure 9:
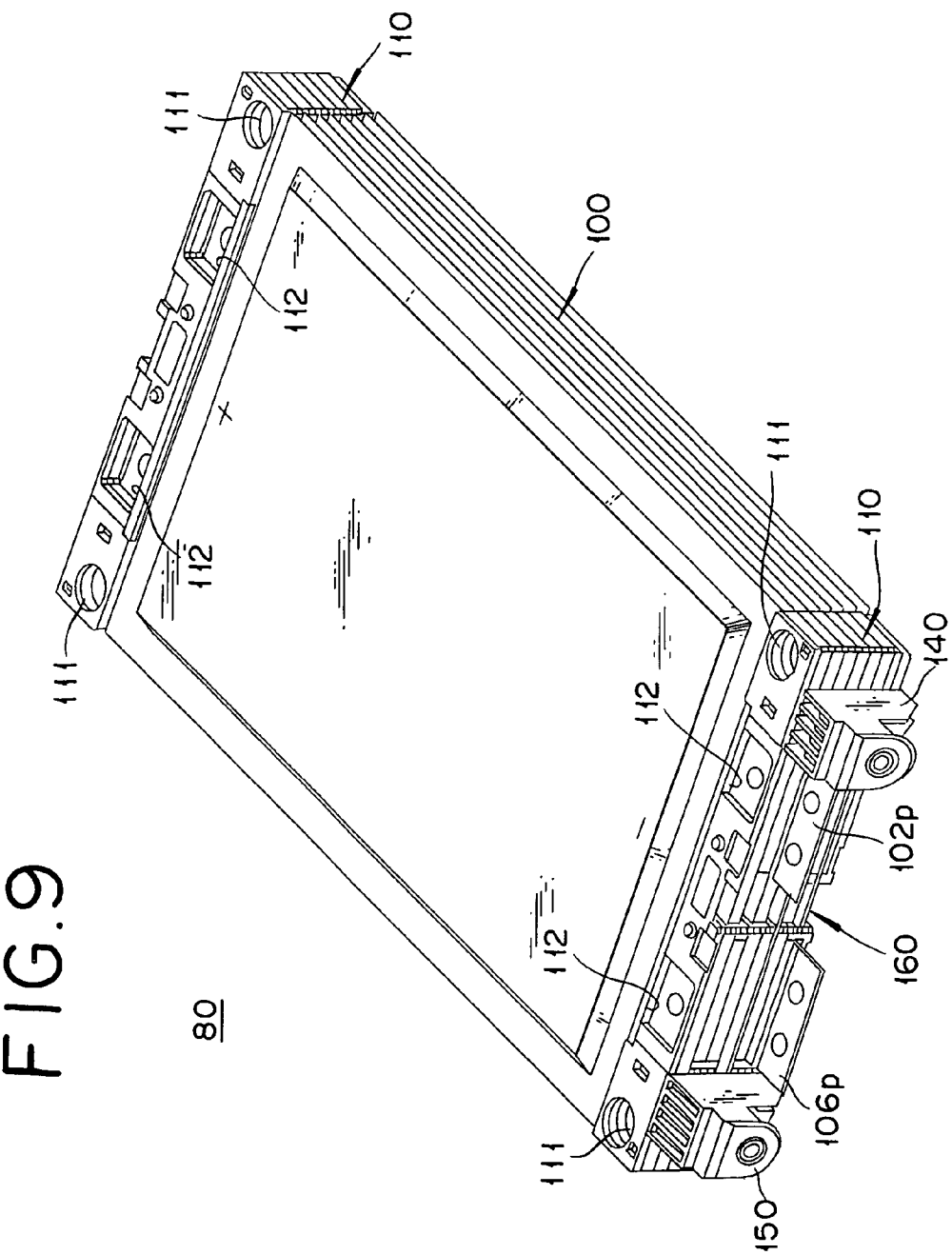
FIG. 9 is a perspective view illustrating the main body of the cell unit.

These steps complete the mutual connection of the sub-assemblies 81 and 82 and 82 and 83, with the result that the cell unit main body 80 illustrated in FIG. 9 will be obtained.

The mutually joined parts of the electrode tabs 100t and the joined parts of the electrode tabs 100t and the bus bars 141 and 151 are divided to a plurality of positions in the shorter direction of the cells 100 (the longer direction of the spacers 110). When the specific joined parts are to be joined by ultrasonic welding, the electrode tabs 100*t* destined to be paired can be mutually nipped by causing the welding head of a welding device to be positioned at the specific joined parts without performing an operation of dispersing the other cells along the stacking direction by way of provisional retraction, with the result that the welding operation will be facilitated. Further, the freedom of the selection of the shape of the welding head is increased and the automation of the welding operation is facilitated. Moreover, the quality to be expected can be maintained without entailing the possibility of exposing the already joined electrode tabs 100*t* to undue stress.

(Assemblage of Cell Unit 60, etc.)

Figure 3:
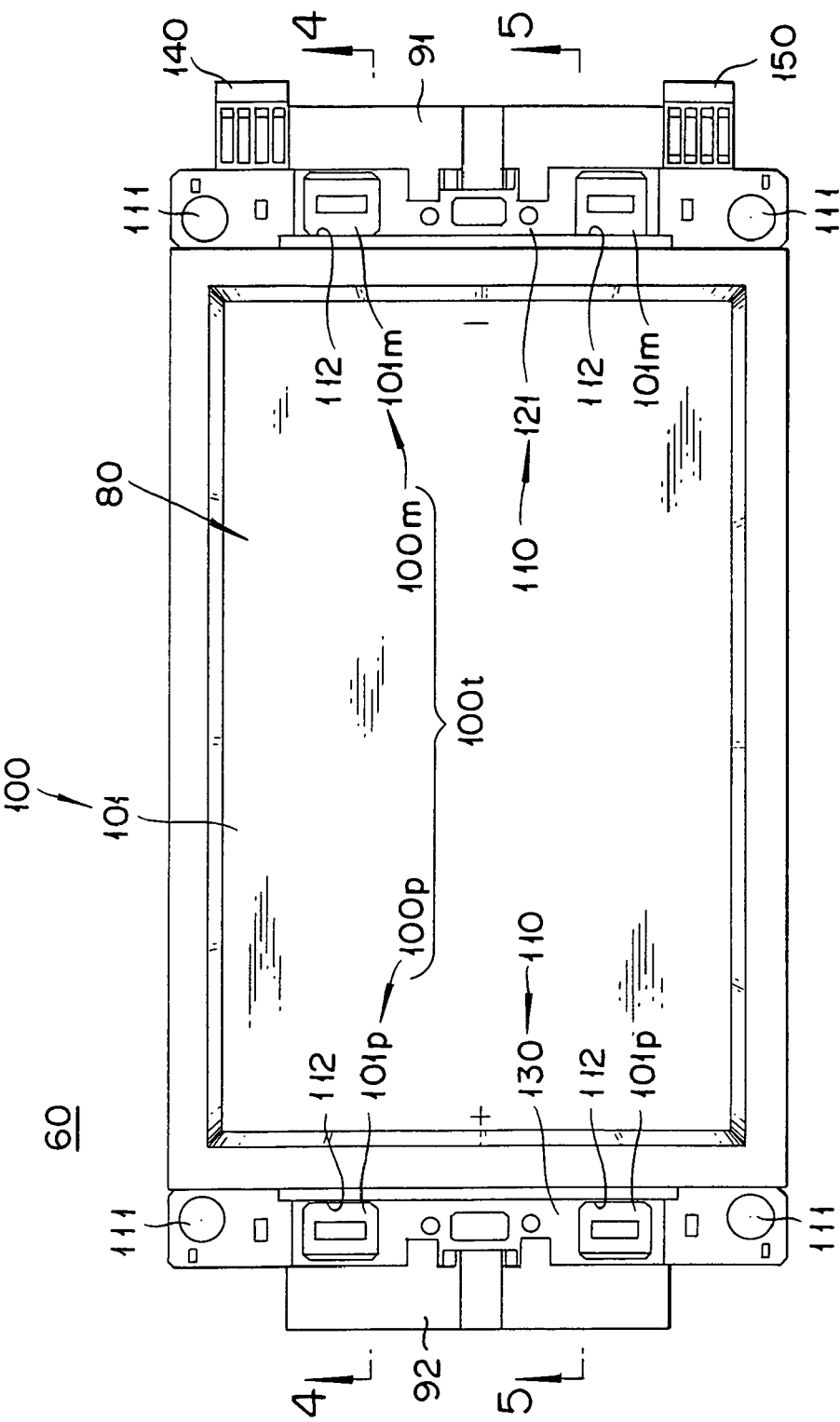
FIG. 3 is a plan view illustrating a cell unit contained in a case.
Figure 4:
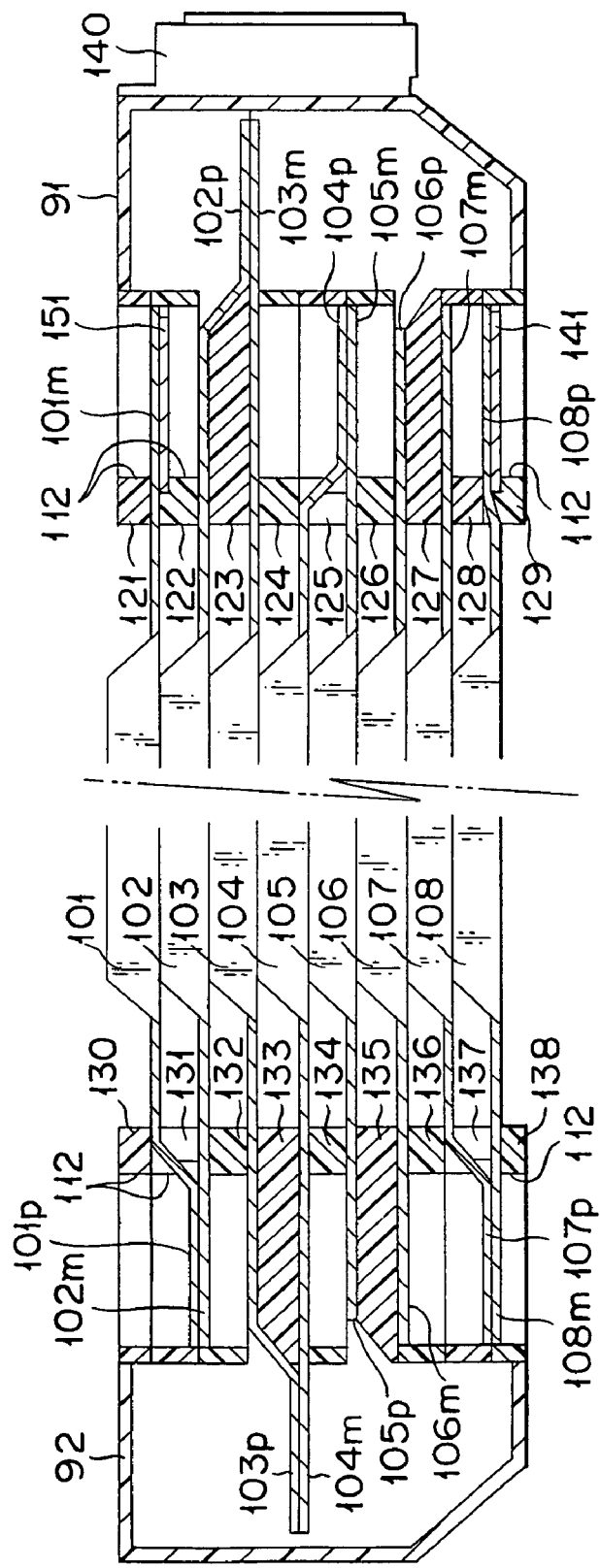
FIG. 4 is a cross section taken through FIG. 3 along the line 4-4.
Figure 5:
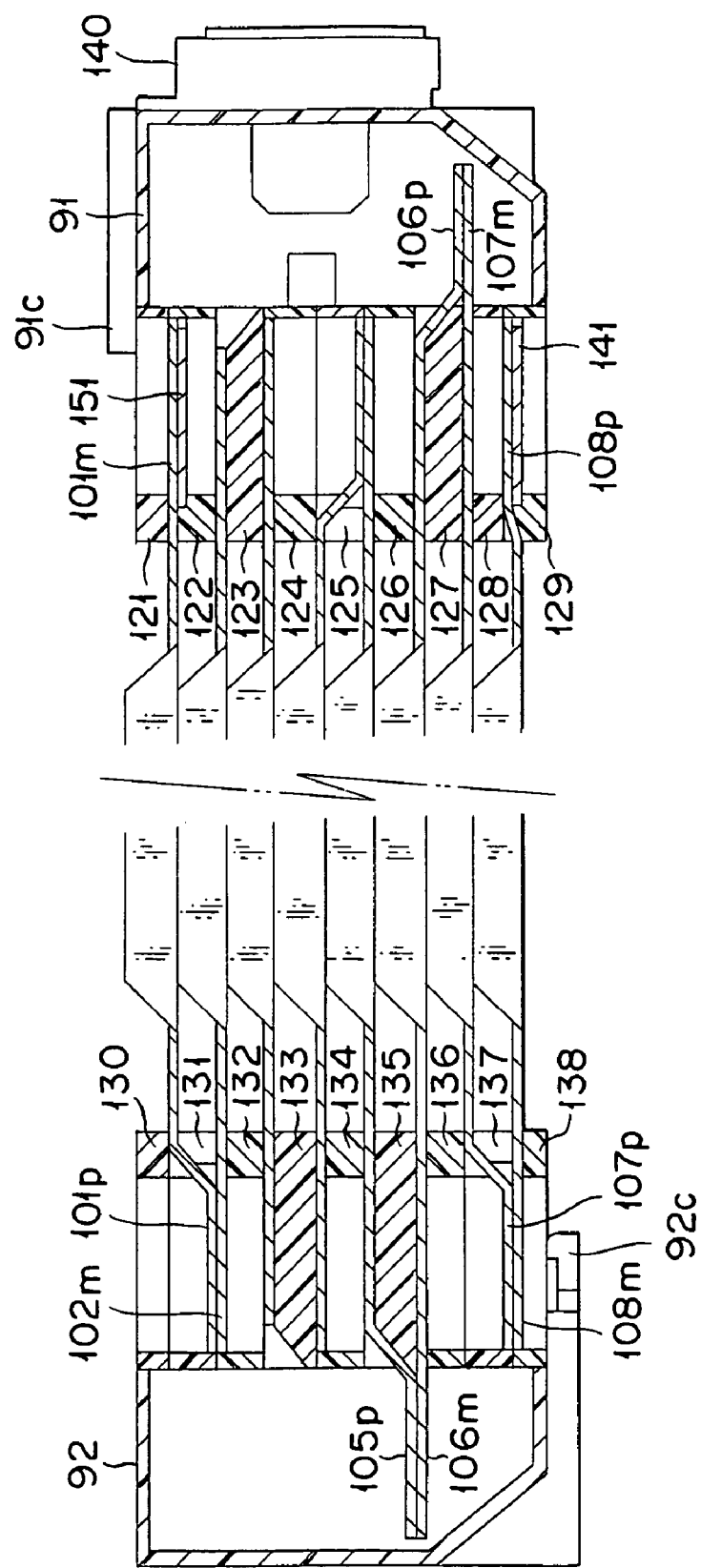
FIG. 5 is a cross section taken through FIG. 3 along the line 5-5.
Figure 6:
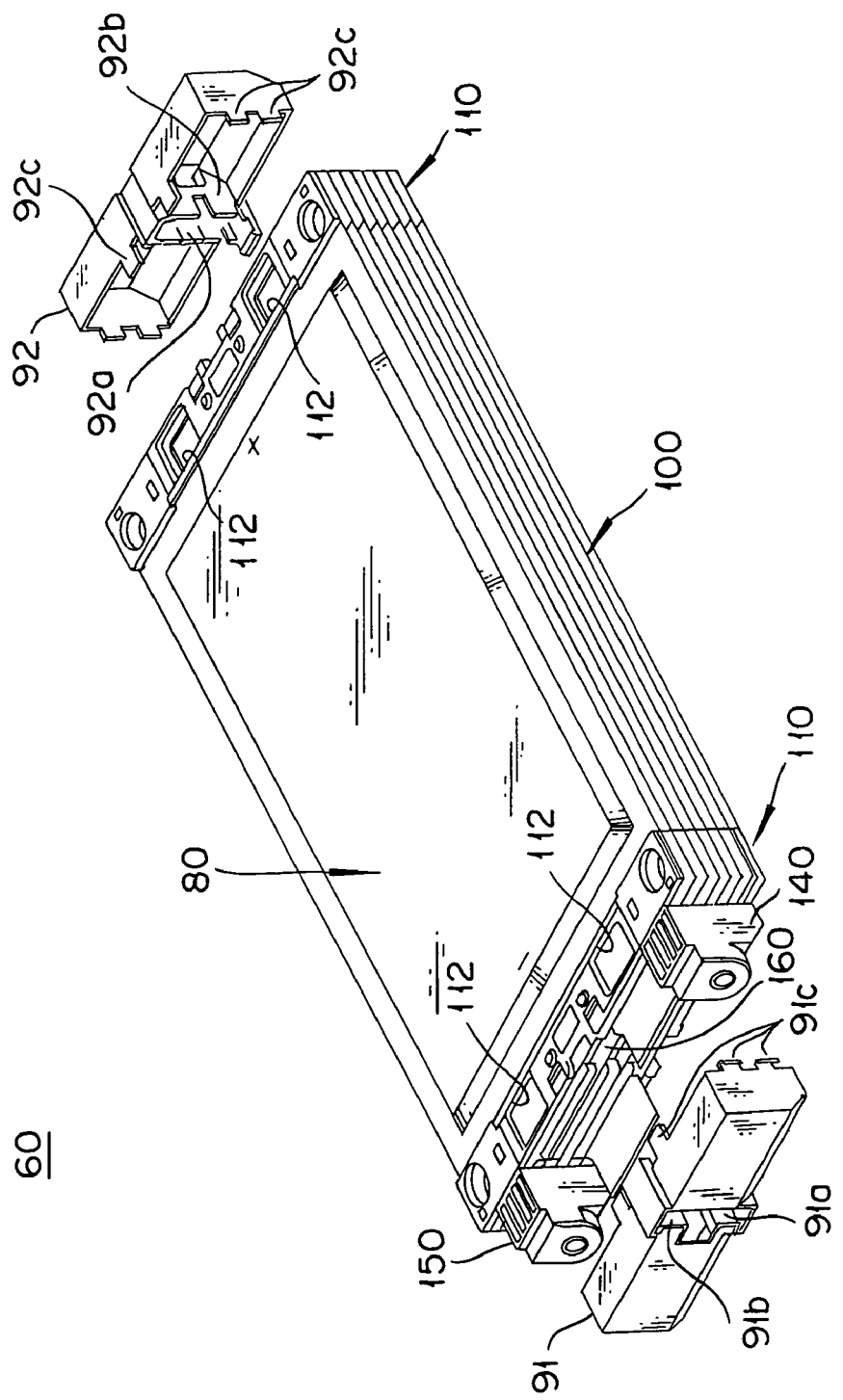
FIG. 6 is a perspective view illustrating the cell unit exposed by removing an insulating cover from the main body of the cell unit.
Figure 7:
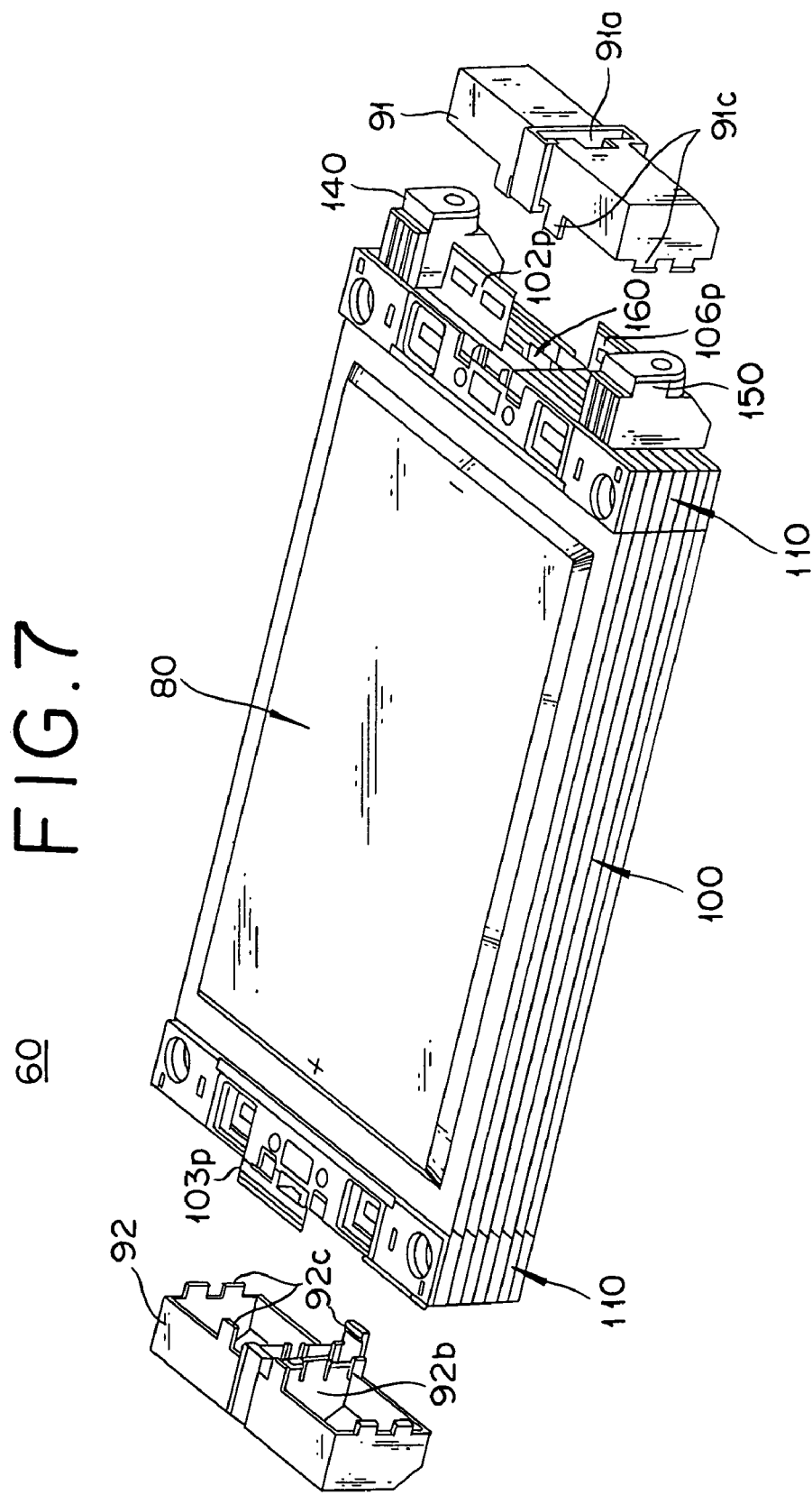
FIG. 7 is a perspective view illustrating the same cell unit as viewed from the direction different from that of FIG. 6.
Figure 8:
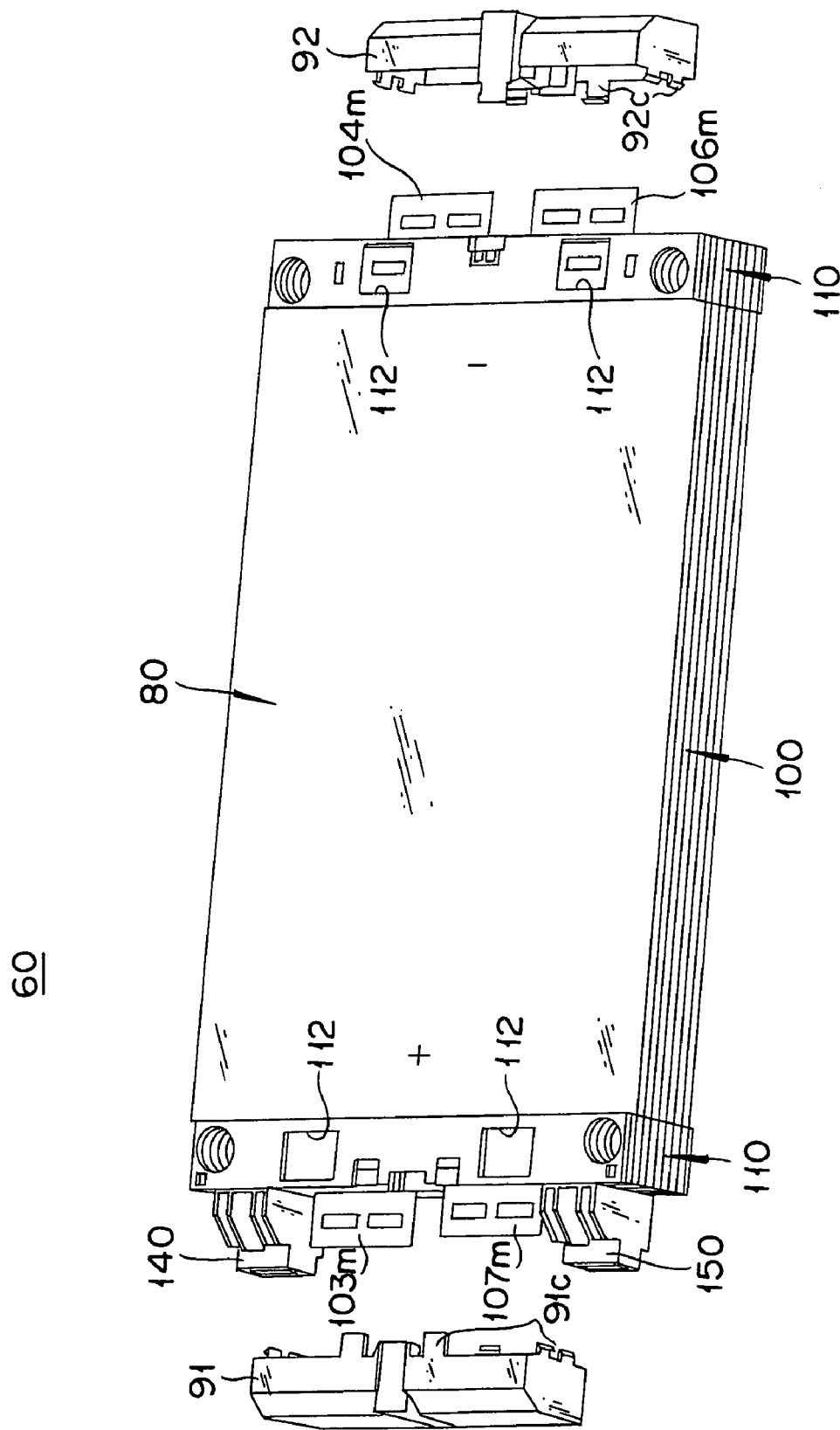
FIG. 8 is a perspective view illustrating the same cell unit as viewed from the bottom face side.

Subsequently, the insulating covers 91 and 92 are imposed respectively on the front surface and the rear surface of the cell unit main body 80 (refer to FIG. 6 and FIG. 23A) to obtain the cell unit 60 illustrated in FIG. 3.

The cell unit 60 is contained in the lower case 71 and the sleeves 93 are inserted into the volt holes 111 of the spacers 110 as illustrated in FIG. 2. The buffer 94 is disposed on the cell unit 60 and the opening part 71*a* of the lower case 71 is closed with the upper case 72. The assemblage of the battery module 50 illustrated in FIG. 1 is completed by causing the edge part 72*a* of the upper case 72 to be lapped around the edge part 71*c* of the peripheral wall 71*b* of the lower case 71 by a caulking work. The connectors 170 are inserted via the receptacles 91*a* and 92*a*.

By having through bolts passed through the bolt holes 73 of the case 70 and the sleeves 93, the positions of the spacers 110 relative to the case 70 are fixed. As a result, the positions of the plurality of cells 100 relative to the case 70 are fixed.

MODIFIED EXAMPLE

The embodiment having the electrode tabs 100*t* mutually joined by ultrasonic welding has been depicted. The mutual joining of the electrode tabs 100*t*, however, does not need to be restricted to ultrasonic welding.

Second Embodiment

The second embodiment differs from the first embodiment in respect that the construction of spacers 230 and the manner of mutually joining electrode tabs 222 and 224 are changed.

A battery module 210 of the second embodiment, similarly to the first embodiment, has a plurality of stacked cells 220 formed by sealing power generating elements with a package member and, at the same time, deriving platelike electrode tabs 222 and 224 to the exterior from the package member and has the electrode tabs 222 and 224 of the individual cells 220 mutually connected electrically. This battery module 210 is also furnished with platelike electrically insulating spacers 230 adapted to nip the electrode tabs from the opposite surface sides of the electrode tabs 222 and 224 along the stacking direction of cells (the vertical direction in FIG. 40). The plurality of cells 220 are contained in a case 240 in such a manner as to press down the power generating elements.

Figure 41:
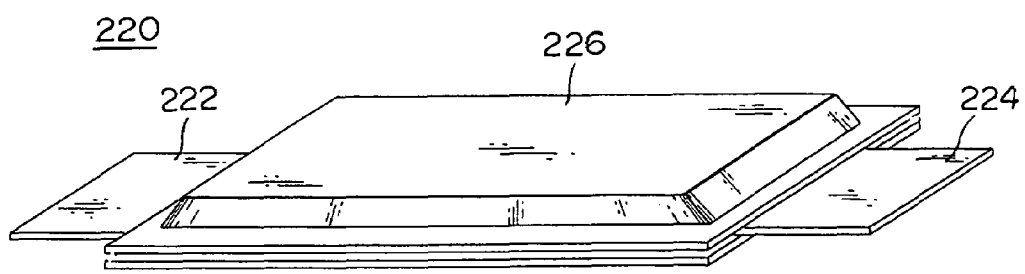
FIG. 41 is a perspective view illustrating a flat cell.

The cell 220 is a flatly shaped cell as illustrated in FIG. 41. A stack type power generating element (not shown) resulting from sequentially laminating a positive electrode plate, a negative electrode plate, and a separator is contained in a flat type main body 226. The cell 220 is a secondary cell such as a lithium ion secondary cell. In the battery module 210, a plurality of cells 220 are stacked in the same direction as the stacking direction of the power generating elements contained therein.

The cell 220 is furnished with the positive electrode tab 222 and the negative electrode tab 224 which extend from the flat main body 226 including the power generating elements. The negative electrode tab 224 is formed of a thin copper sheet. The positive electrode tab 222 is formed of a thin aluminum sheet. The plurality of cells 220 are so stacked that the positive electrode tabs 222 and the negative electrode tabs 224 may alternate with each other along the stacking direction, namely the electric polarities of electrode tabs may alternate with each other.

The cells 220 are mutually fixed by the application of a double-coated tape or an adhesive agent to the flat main body 226. One pair of the spacers 230 nip the positive electrode tab 222 and the negative electrode tab 224 together as a superposed pair. Thus, the plurality of cells 220 are joined in serial connection. The cell 220 forming the uppermost layer has the negative electrode tab 224 connected to a negative output terminal 252 and the cell 220 forming the lowermost layer has the positive electrode tab 222 connected to a positive output terminal 250.

Figure 40:
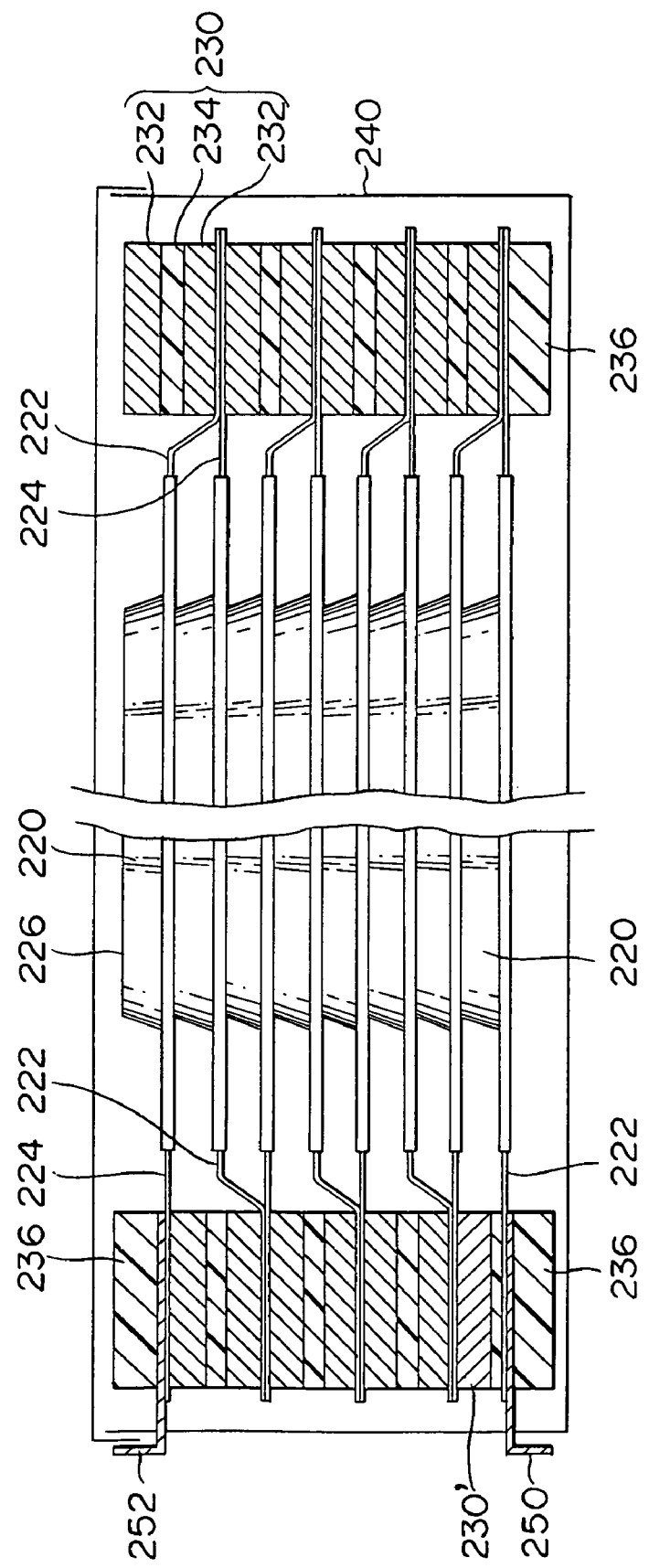
FIG. 40 is a cross section illustrating a battery module according to a second embodiment of the present invention.

The spacer 230 of the second embodiment is furnished with an insulating layer 234 possessing an electric insulating property and a heat sink layer 232 possessing a higher heat radiating property than the insulating layer 234. The spacer 230 illustrated as an example is formed in a three-layer structure having the insulating layer 234 possessing an insulating property nipped by the heat sink layers 232 possessing a heat radiating property as illustrated in FIG. 40. When the electrode tabs 222 and 224 are nipped by a pair of spacers 230 which each possess this three-layer structure, the heat sink layer 232 is enabled to contact both the superposed electrode tabs 222 and 224.

The insulating layer 234 may be formed of a proper material so long as it is capable of imparting an electric insulating property to the spacer 230. The heat sink layer 232 may be formed of a proper material so long as it acquires a higher heat radiating property than the insulating layer 234. By forming the heat sink layer 232 of a material possessing a higher heat conducting ratio than the material forming the insulating layer 234, the heat sink layer 232 is enabled to acquire a higher heat radiating property than the insulating layer 234. Since the insulating layer 234 enables the spacer 230 to retain its own electric insulating property, the material for forming the heat sink layer 232 does not need to be limited to a substance possessing an electric insulating property but may be selected from among substances possessing an electric conducting property. It suffices to select the material for forming the heat sink layer 232 from the viewpoint of heightening the heat radiating property. To be specific, such a material as aluminum which possesses an excellent heat radiating property is used for the heat sink layer 232. For the insulating layer 234, such an insulating material as ceramic or resin is used. When an electric conducting substance is selected as the material for forming the heat sink layer 232, it goes without saying that the insulating layer 234 must be disposed along the plane direction of the electrode tabs 222 and 224 for the purpose of imparting an electric insulating property to the spacer 230.

The insulating layer 234 is preferably formed in the smallest possible thickness within the range in which the electric insulating property is secured. This is because the heat radiating property due to the heat sink layer 232 can be heightened within the limited thickness of the spacer 230.

Figure 42:
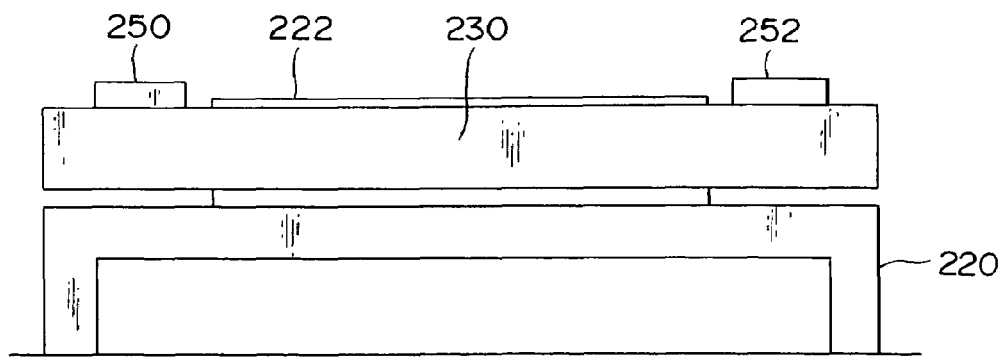
FIG. 42 is a plan view illustrating the electrode tabs are mutually nipped by insulating plates.

The spacer 230, as illustrated in FIG. 42, possesses an approximately equal width to the cell 220 and is disposed over the total width of the electrode tabs 222 and 224.

A pair of spacers 230, as illustrated in FIG. 40, nip two superposed positive electrode tab 222 and negative electrode tab 224 as a pair and are disposed together with the positive electrode tab 222 and negative electrode tab 224 along the stacking direction. In order to handle the two positive electrode tab 222 and negative electrode tab 224 as a pair, the individual spacers 230 have a thickness approximately equal to the total thickness of two cells 220 and are disposed at intervals of two layers. The spacers 230 are disposed on the individual electrode tab sides (the lateral sides in the diagram) of the cells 220 as staggered by one step. Thus, the individual cells 220 excepting the cells 220 forming the uppermost and lowermost layers positioned at the opposite ends along the stacking direction have the negative electrode tabs 224 contact the positive electrode tabs 222 of the other cells 220 deposited one step upward and the positive electrode tabs 222 contact the negative electrode tabs 224 of the other cells disposed one step downward. As a result, the plurality of cells 220 are joined in serial connection. As described above, the negative output terminal 252 is connected to the negative electrode tabs 224 of the cell 220 forming the uppermost layer and the positive output terminal 250 is connected to the positive electrode tabs 222 of the cell 220 forming the lowermost layer. Incidentally, the plurality of cells 220 may be so joined in serial connection that the positive output terminal 250 may be connected to the cell 220 forming the uppermost layer and the negative output terminal 252 may be connected to the cell 220 forming the lowermost layer.

The case 240 includes the cells 220 and the spacers 230. The case 240 has formed therein holes for drawing out the positive output terminal 250 and the negative output terminal 252 extended from the stacked cells 220. The cells 220 and the spacers 230 are stably fixed inside the case 240 and protected thereby.

(Procedure of Assemblage)

Now, the procedure for assembling the battery module 210 in the present embodiment will be explained below.

Figure 43:
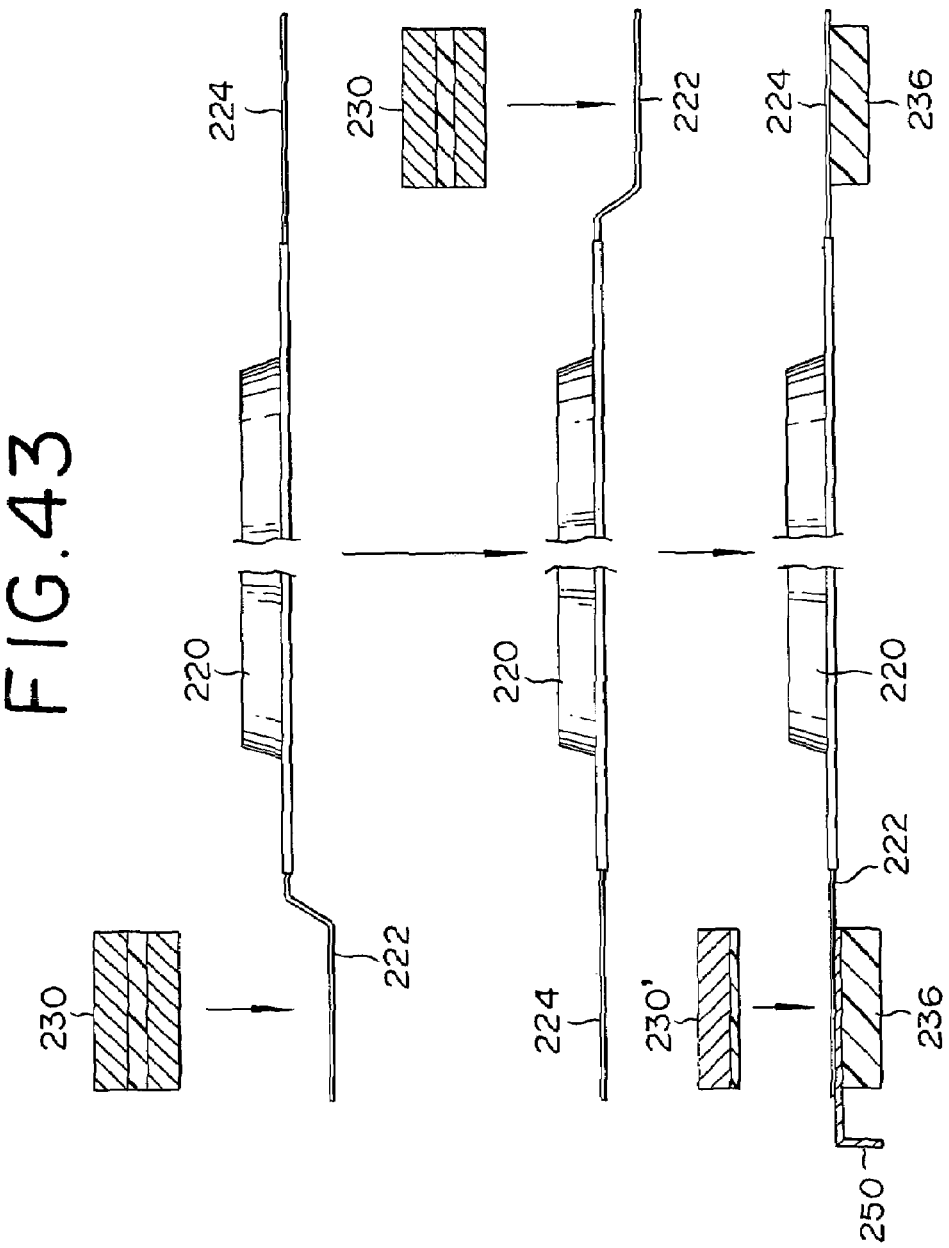
FIG. 43 is a cross section illustrating the manner of piling flat cells.

For a start, the positive output terminal 250 is attached to the positive electrode tab 222 of the cell 220 forming the lowermost layer as by ultrasonic welding as illustrated in FIG. 43. In the ensuant state, the cell 220 forming the lowermost layer is supported by a supporting body 236. Here, the supporting body 236 is formed of an insulating material and is attached to the positive electrode tab 222 and the negative electrode tab 224 with a high friction sheet, a double-coated tape, or an adhesive agent.

Subsequently, the spacer 230' is attached to the positive electrode tab 222 of the cell 220 forming the lowermost layer. The spacer 230' used herein possesses the thickness of one cell with the object of adjusting the total thickness of the whole battery module 210. It is formed in a two-layer structure by reason of the thickness. The spacer 230', however, is furnished with the insulating layer 234 and the heat sink layer 232 similarly to the aforementioned possession of a thickness equaling the total thickness of two cells.

Then, the next cell 220 is stacked. The adjacent cells 220 have a double-coated tape or an adhesive agent interposed there between and are mutually fixed. The spacer 230 is attached to the positive electrode tab 222 of the stacked cell 220. During the course of this attachment, the spacer 230, while deforming the straightly stretched positive electrode tab 222, presses it against the negative electrode tab 224 of the cell 220 forming the lowermost layer. The positive electrode tab 222 is formed of aluminum, it is more liable to bend than the negative electrode tab 224. The negative electrode tab 224 of the cell 220 forming the lowermost layer and the positive electrode tab 222 of the cell 220 contacting this tab 224 and lying one layer upward there from give rise to a difference in length proportionately to the deformation caused in the positive electrode tab 222 when they are piled up.

Subsequently, the cells 220 are similarly stacked. This time, the spacer 230 is disposed on the left side in the diagram and caused to contact the two positive electrode tab 222 and negative electrode tab 224 in the stacking direction.

Figure 44:
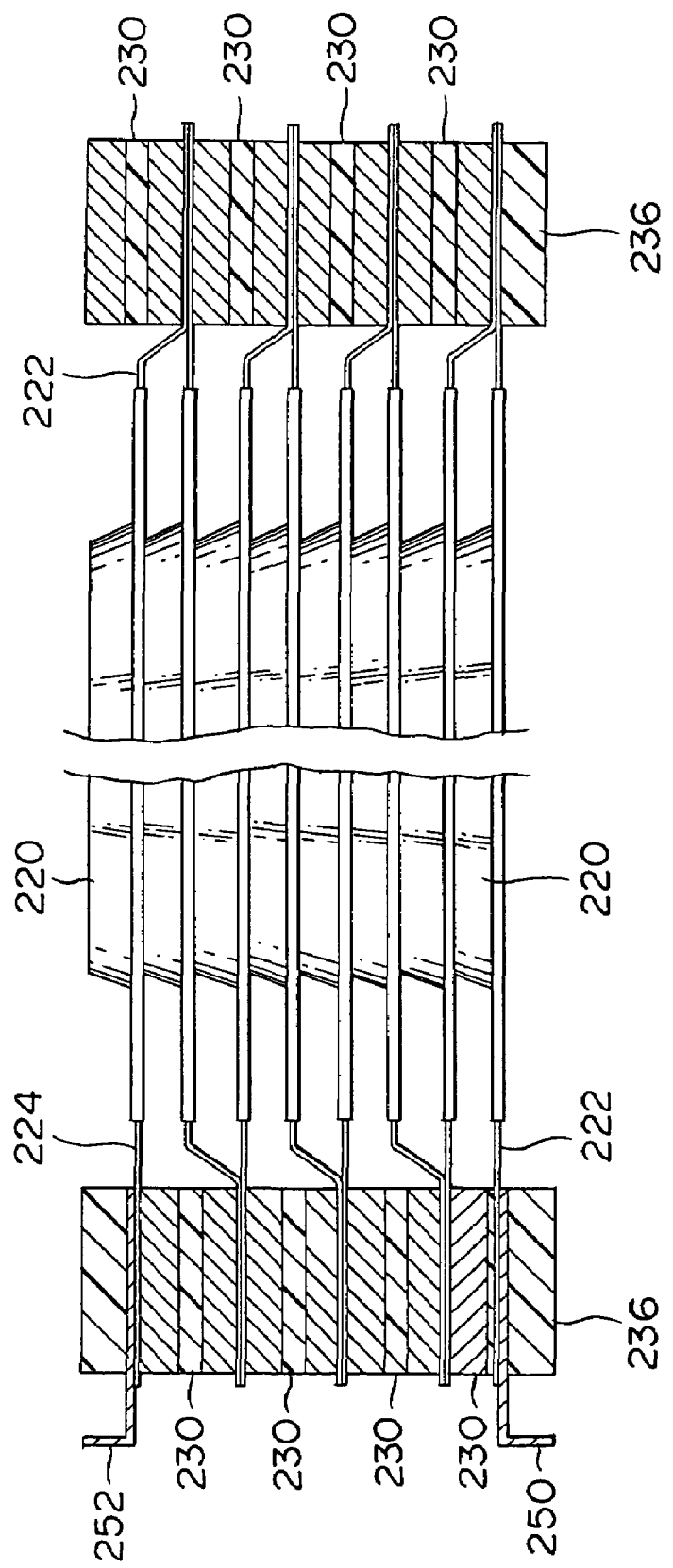
FIG. 44 is a cross section illustrating the manner of having piled flat cells.

Such a stacked body as illustrated in FIG. 44 is formed when the stacking described above is repeated and the negative output terminal 252 is joined to the negative electrode tab 224 of the cell 220 forming the uppermost layer.

Here, the positive electrode tabs 222 and the negative electrode tabs 224 which are superposed differ in length and the end faces of the positive electrode tabs 222 and the negative electrode tabs 224 are not aligned. The incompletely aligned end faces of the positive electrode tabs 222 and the negative electrode tabs 224 interferes with their union. Thus, the end faces of the positive electrode tabs 222 and the negative electrode tabs 224 which are superposed are aligned by the use of a cutter.

Figure 45:
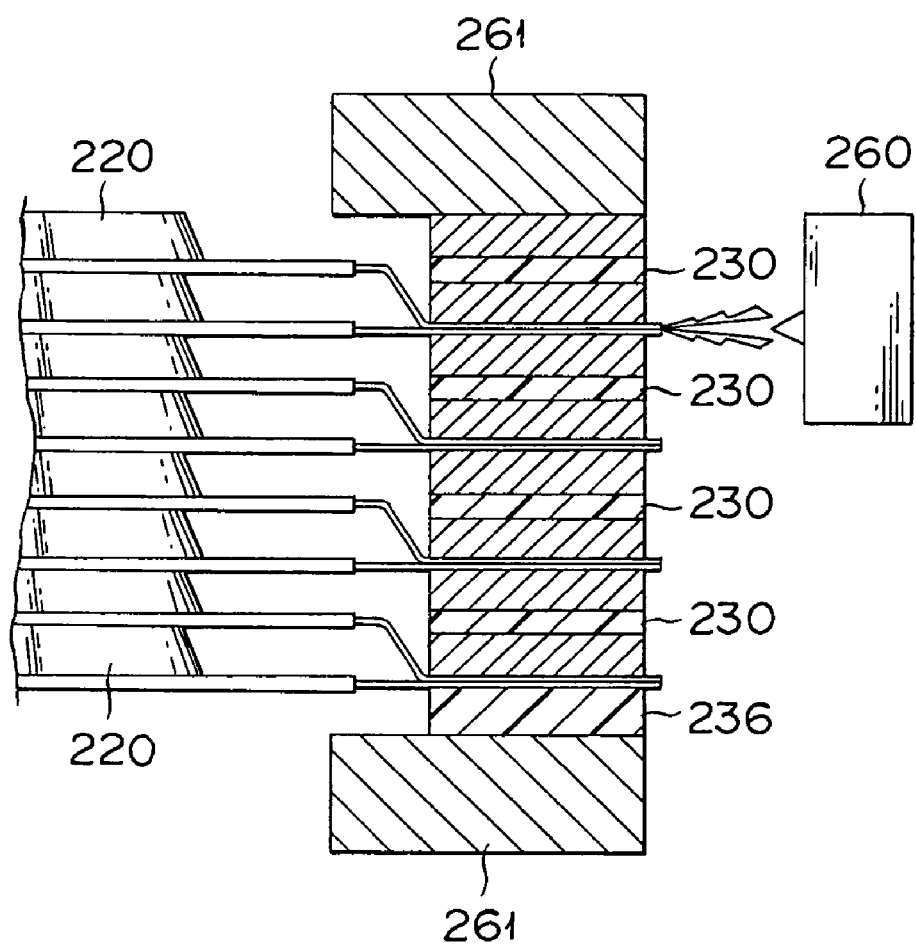
FIG. 45 is a cross section illustrating a method of mutually joining end parts of piled electrode tabs by TIG welding.

The aligned end faces of the electrode tabs 222 and 224 are joined by TIG welding by the use of a TIG welding device 260 as illustrated in FIG. 45. The TIG welding device 260 is furnished with a tungsten electrode impervious to heat and is operated to effect welding by feeding a current of an inert gas to the environment thereof. During the course of the welding, a jig 261 concurrently serving as a heat sink retains the spacers 230 from above and below. The jig 261 retains the stability during the course of the welding and promotes diffusion of the heat generated during the course of the welding as well.

By the TIG welding, the electric connection between the positive electrode tabs 222 and the negative electrode tabs 224 is ensured. After the whole TIG welding is terminated, such a battery module 210 as illustrated in FIG. 40 is completed by placing the stacked body in the case 240.

According to the second embodiment similarly to the first embodiment, by causing the electrode tabs 222 and 224 to be nipped by the spacers 230 as described above, it is made possible to provide the battery module 210 which acquires exalted vibration-resisting strength, exhibits imperviousness to the influence of the input of vibration, and permits compaction in size. This battery module 210 has two positive electrode tab 222 and negative electrode tab 224 nipped as a pair by the spacers 230. Since the positive electrode tabs 222 and the negative electrode tabs 224 are collected as a pair, they can be joined in their unaltered posture. This operation, therefore, is easy to perform and is capable of producing stable joining.

As a way of joining the electrode tabs, a method which comprises nipping the superposed electrode tabs between a horn and an anvil and joining them by ultrasonic welding is available. When the adjacent electrode tabs are joined by ultraviolet welding, it is necessary that an empty space for admitting the horn and the anvil be secured above and below the electrode tabs. When the electrode tabs of the cells to be superposed have an identical shape, therefore, the empty space is secured by spreading the already joined regions apart and the joined regions are consequently exposed to the force used for the separation. The cells and the electrode tabs are exposed to the force which is uncalled for when the spread joined regions are closed to the former state. As a result, the joined regions and the cells possibly sustain fracture and the acquisition of a stable quality possibly fails. In contrast, in the second embodiment, though the electrode tabs 222 and 224 of the superposed cells 220 possess an identical shape, the plurality of electrode tabs 222 and 224 nipped by the paired spacers 230 are joined in the end parts thereof which verge on the outer sides of the spacers 230. Since the end parts of the positive electrode tabs 222 and the negative electrode tabs 244 are joined by the TIG welding, the necessity for securing the empty space for admitting the horn is obviated. As a result, the joined regions and the cells 220 can avoid the fracture and the joining can be attained with stable quality because the already joined regions are no longer required to be spread apart or closed.

The positive electrode tabs 222 and the negative electrode tabs 224 have the end parts thereof joined. The lengths of the positive electrode tabs 222 and the negative electrode tabs 224, therefore, are only required to be such that these tabs may protrude slightly from the spacers 230. As a result, the positive electrode tabs 222 and the negative electrode tabs 224 having smaller lengths then ever suffice and the battery module 210 allows a decrease of size.

Since the spacers 230 support the positive electrode tabs 222 and the negative electrode tabs 224, the cells 220 can be mutually joined collectively finally after completion of the whole stacking even when the number of cells 220 to be stacked is large. Thus, the stacking can be carried out without imposing any limit on the number of layers to be stacked.

Further, the spacers 230 each containing the heat sink layer 232 possessing the heat radiating property are disposed each on and below the superposed positive electrode tabs 222 and the negative electrode tabs 224. When the positive electrode tabs 222 and the negative electrode tabs 224 generate heat while they are being joined as by welding, therefore, the spacers 230 radiate the heat. As a result, the heat is hardly transmitted to the cells 220. The damage of the cells 220 by the heat during the course of the joining, therefore, can be prevented.

Incidentally, the preceding embodiment joins the cells 220 by the TIG welding. The joining of the cells 220 nevertheless does not need to be limited to the TIG welding.

Figure 46:
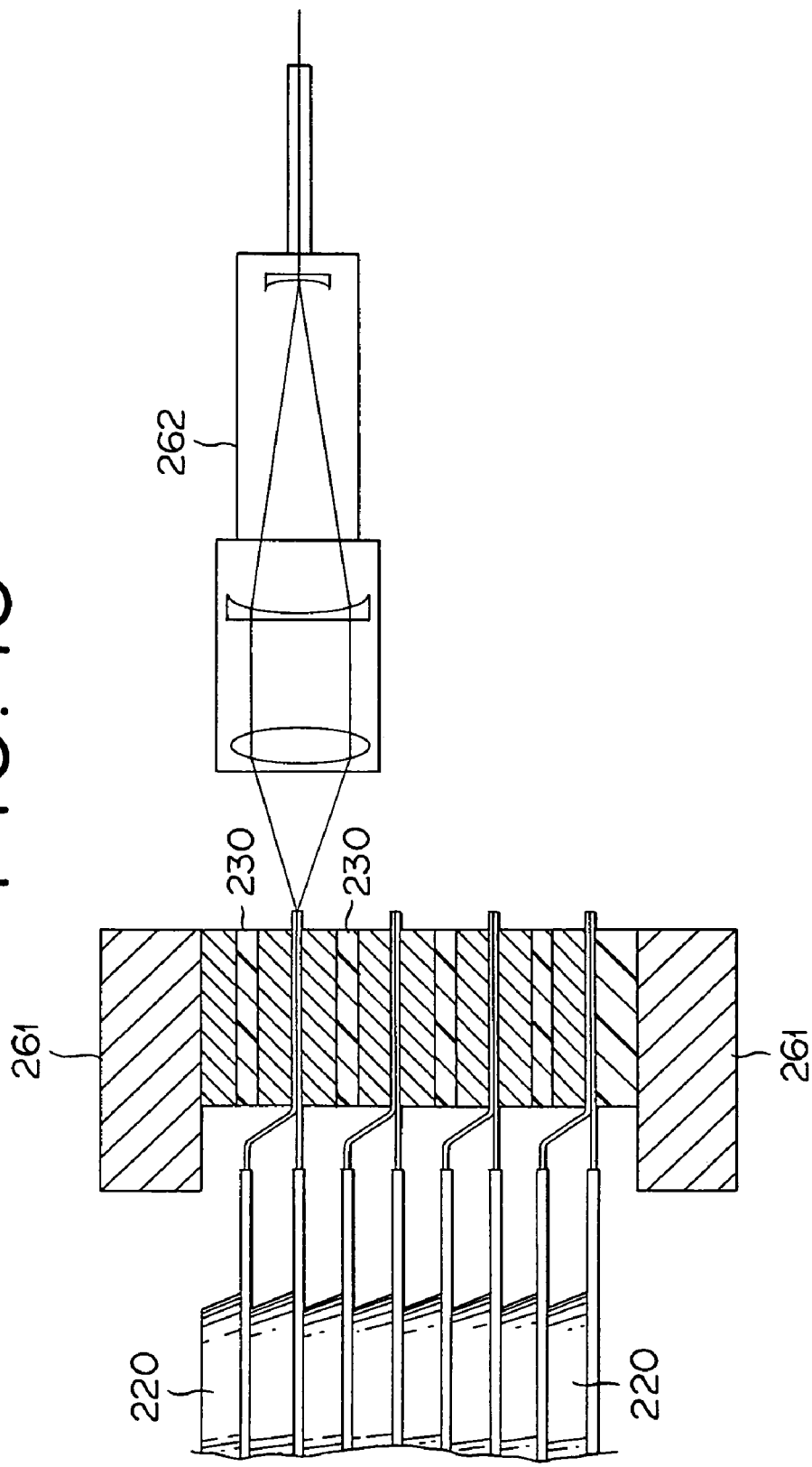
FIG. 46 is a diagram illustrating a method of mutually joining end parts of piled electrode tabs by laser welding.

The superposed electrode tabs 222 and 224 may be mutually joined by laser welding by using a laser welding device 262 as illustrated in FIG. 46.

The laser welding device 262, by means of a lens, condenses the laser emitted by an oscillator on the end parts of the superposed positive electrode tab 222 and negative electrode tab 224. The end parts of the positive electrode tab 222 and the negative electrode tab 224 are consequently fused and joined.

Figure 47:
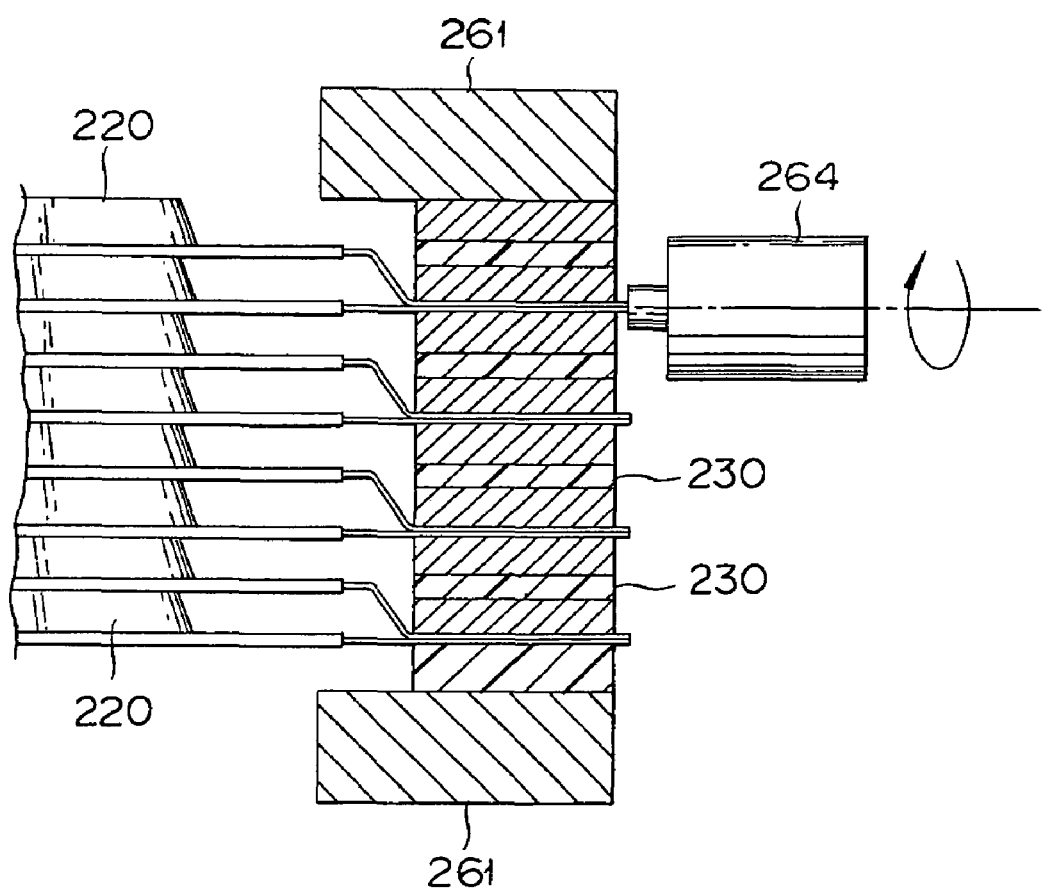
FIG. 47 is a diagram illustrating the manner of mutually joining the end parts of piled electrode tabs by friction agitation bonding.

Otherwise, the superposed electrode tabs 222 and 224 may be mutually joined by the friction agitation bonding as illustrated in FIG. 47. In this case, a friction agitation tool 264 kept in rotation is inserted into the end faces of the positive electrode tab 222 and the negative electrode tab 224 and enabled to stir and join the materials themselves of the positive electrode tab 222 and the negative electrode tab 224.

The joined parts are enabled to acquire an exalted mechanical strength because this method joins the superposed tabs without melting the materials thereof unlike the method which melts the materials. Further, the method is advantageous in respect that the joined materials are deformed or warped only to an extremely small extent.

MODIFIED EXAMPLE

The embodiment forming the spacer 230 in a three-layer structure of the heat sink layer 232—insulating layer 234—heat sink layer 232 has been illustrated. The spacer 230, however, does not need to be limited to this structure. The spacer may be formed in a two-layer structure containing one heat sink layer 232 and one insulating layer 234, for example. When the electrode tabs 222 and 224 are nipped by one pair of two-layer type spacers, the heat sink layer 232 in one of these spacers is required to contact either of the superposed electrode tabs 222 and 224. Even by such a structure as this, the damage of the cells 220 by heat can be prevented while the electrode tabs 222 and 224 are being mutually joined as by welding.

The spacer 110 explained in the first embodiment may adopt a spacer which is furnished with the insulating layer 234 and the heat sink layer 232. Further, instead of the mode of mutually joining by ultrasonic welding the electrode tabs 100$p$ and 100$m$ verging on the open window part 122, the plurality of electrode tabs 100$p$ and 100$m$ nipped by one pair of spacers may be joined at the end parts thereof verging on the outer side of the spacer as contemplated by the second embodiment.

Third Embodiment

The positioning function fulfilled during the stacking of the cells 220 on the spacers may be added, similarly to the first embodiment, to the function of the spacers 230 in the second embodiment.

The third embodiment will be explained below with respect to the spacers which are furnished with the positioning function.

Figure 48:
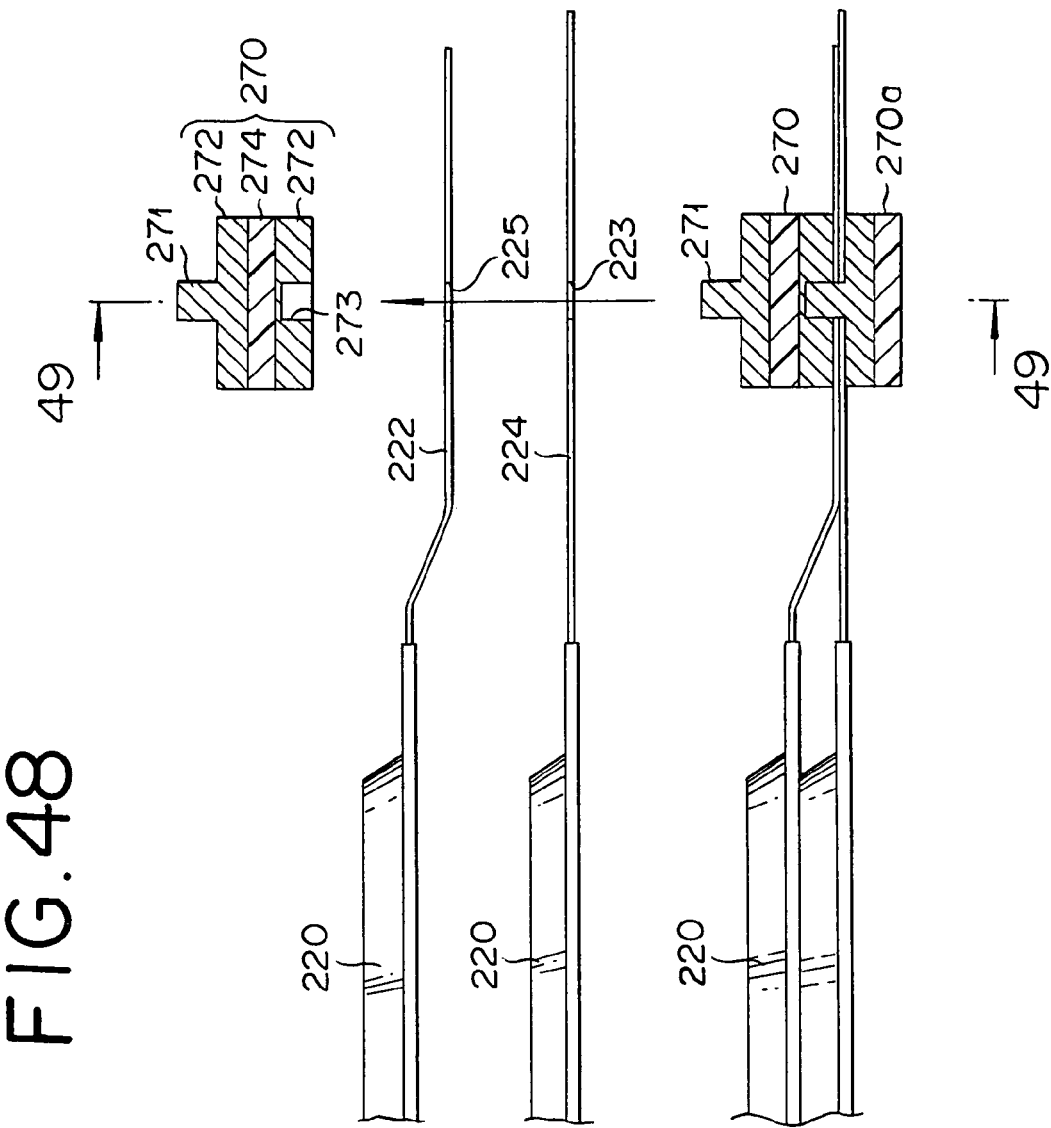
FIG. 48 is a diagram illustrating the manner of piling flat cells according to a third embodiment of the present invention.
Figure 49:
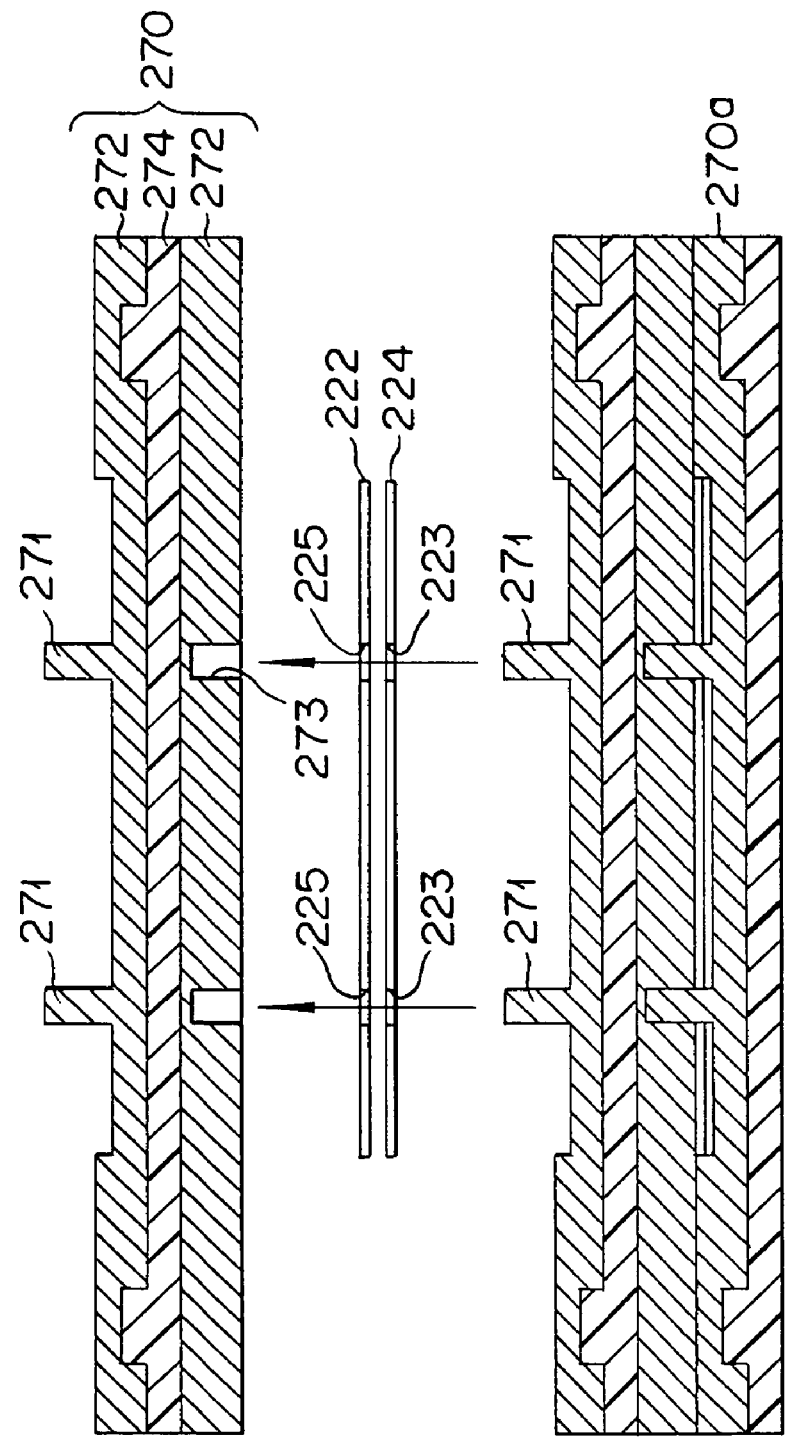
FIG. 49 is a cross section taken through FIG. 48 along the line 49-49.

Spacers 270 in the third embodiment are formed, as illustrated in FIG. 48 and FIG. 49, in a three-layer structure having an insulating layer 274 possessing an insulating property nipped by heat sink layers 272 possessing a heat radiating property. Here, the heat sink layer 272 forming the uppermost layer is provided with convex parts 271 (corresponding to a projecting part). Then, the heat sink layer 272 forming the lower most layer is provided with concave parts 273. The convex parts 271 and the concave parts 273 have approximately identical diameter and depth and are disposed at the corresponding positions on the front and rear face of the heat sink layer 272.

Figure 50:
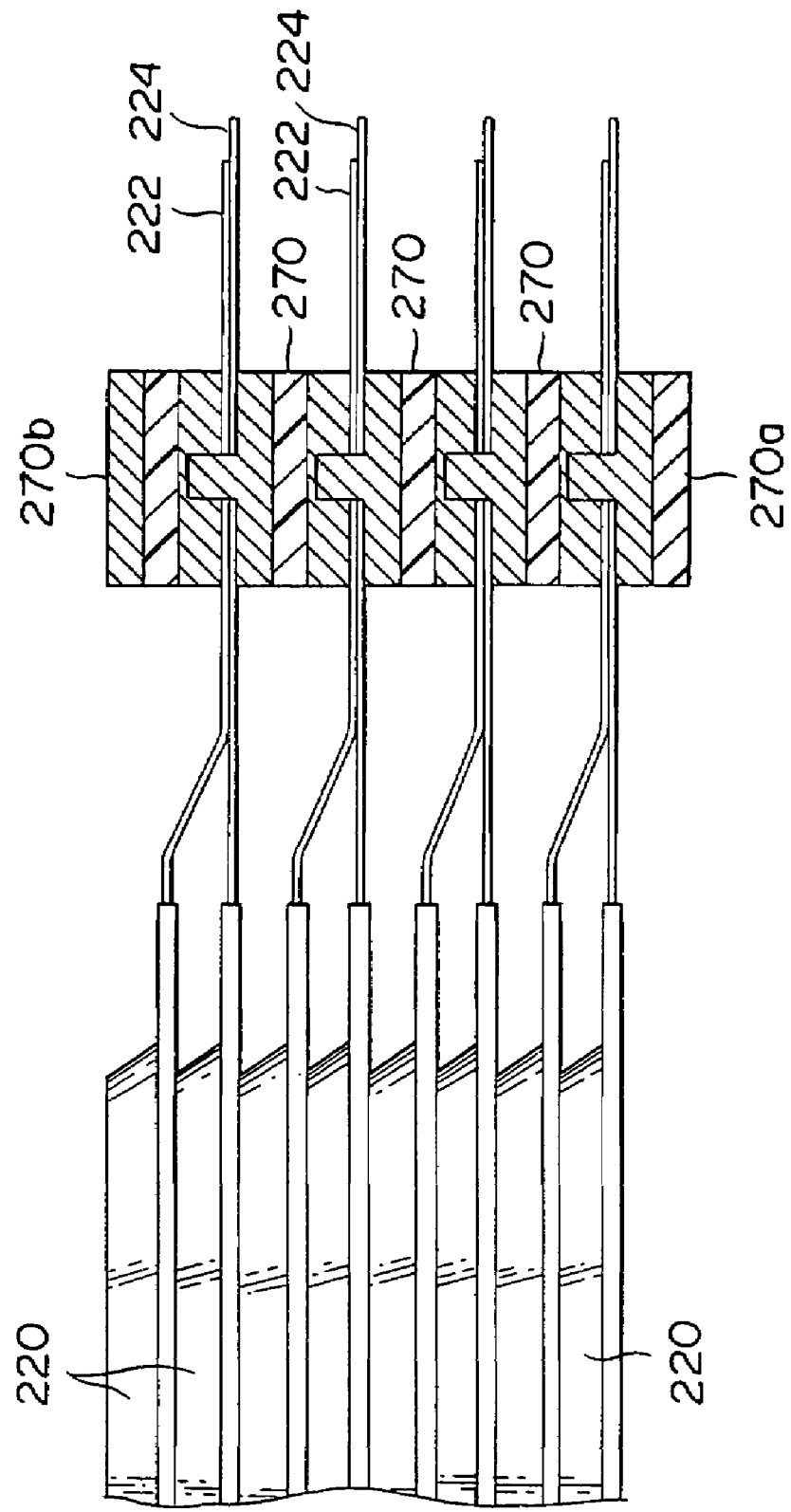
FIG. 50 is a cross section illustrating a battery module according to a third embodiment of the present invention.

When the spacers 270 are so superposed as to nip the electrode tabs 222 and 224 of the cell 220, therefore, the spacers 270 are mutually fitted in convexo-concave union, as illustrated in FIG. 50. Here, the electrode tabs 222 and 224 of the cell 220 have preparatorily formed respectively therein hole parts 223 and 225 which permit the convex parts 271 of the spacers 270 to be inserted there through. Similarly to the first embodiment, the electrode tabs 222 and 224 have the hole parts 223 and 225 formed therein and the convex part 271 and the concave part 273 form the engaging member 117.

By the procedure of passing the electrode tabs 222 and 224 of the cell 220 as a pair through the convex parts 271 of the spacer 270 while mutually fitting the spacers 270, the stacked body illustrated in FIG. 50 is obtained. The produced stacked body, similarly to the second embodiment, has the end faces of the electrode tabs 222 and 224 aligned as with a cutter. The aligned end faces are joined by welding. As a result, the battery module having the stacked body disposed inside the case 240 is completed.

Incidentally, a spacer 270$a$ which is deposited in the lowermost layer has formed therein only a convex part which fits the concave part 273 of the spacer 270 deposited one step upward and has no concave part formed therein. Then, a spacer 270$b$ which is deposited in the uppermost layer has formed therein only a concave part which fits the convex part 271 of the spacer 270 one step downward and has no convex part formed therein. Thus, the convex part 271 and the concave part 273 which are not called for are suffered to remain in the uppermost layer and the lowermost layer.

The third embodiment has the spacers 270 provided with the convex parts 271 and the concave parts 273 as described above. The convex parts 271 of the spacers 270 are passed through the electrode tabs 222 and 224 of the cells 220 and then fit into the concave parts 273. As a result, the spacers 270 are mutually positioned and the electrode tabs 222 and 224 are positioned as well. That is, the cells 220 are positioned likewise. The mutual fitting of the convex parts 271 and the concave parts 273 of the spacers 270 which is effected as described above results in facilitating the positioning during the course of stacking.

It is obvious that this invention is not limited to the particular embodiments shown and described above but may be variously changed and modified without departing from the technical concept of this invention.

The entire disclosure of Japanese Patent Application Nos. 2004-310545 and 2004-376184 filed on Oct. 26, 2004 and Dec. 27, 2004 including specification, claims, drawings, and summary are incorporated herein by reference in its entirety.

What is claimed is:

1. A battery module comprising:
   a plurality of flat cells having a package member sealing a power generating element and an electrode tab extending from the package member, the plurality of the flat cells being stacked and the electrode tabs of the flat cells positioned adjacent to each other in a stacking direction to be connected electrically; and
   paired insulating plates nipping the electrode tab on opposite surface sides of the electrode tab along the stacking direction of the plurality of the flat cells and possessing an electric insulating property,
   wherein the paired insulating plates nipping the electrode tab are provided with an engaging member adapted to fasten the electrode tab by passing through the electrode tab along the stacking direction,
   wherein the electrode tab is provided with a through hole along the stacking direction, and
   wherein the engaging member is provided with a projecting part configured to be inserted into the through hole, wherein the engaging member is provided in at least one of the paired insulating plates, and a concave part provided in at least one of the paired insulating plates is configured to permit insertion therein of the leading end of the projecting part inserted in the through hole,
   wherein the leading end of the projecting part does not completely penetrate the insulating plate having the concave part.

2. A battery module according to claim 1, wherein one of the paired insulating plates nipping the electrode tab is concurrently nipping another electrode tab.

3. A battery module according to claim 1, wherein the insulating plates are interconnected.

4. A battery module according to claim 1, wherein
   the insulating plates are provided with the projecting part provided on one of the opposite surfaces along the stacking direction and the concave part provided on the remainder of the opposite surfaces along the stacking direction and
   the projecting part and the concave part are disposed on one and the same line along the stacking direction.

5. A battery module according to claim 1, wherein
   the insulating plates are provided with a notch for exposing part of the peripheral edge of the nipped electrode tab and
   the region of the electrode tab exposed through the notch is utilized as a voltage detecting part for detecting the voltage of each of the flat cells.

6. A battery module according to claim 5, further comprising a connector with a connecting terminal capable of being connected to the voltage detecting part and removably attached to the voltage detecting part.

7. A battery module according to claim 6, wherein
   the plurality of the voltage detecting parts are arrayed on one and the same line along the stacking direction and
   the connector is provided with a plurality of the connecting terminals disposed in conformity with the positions of the voltage detecting parts.

8. A battery module according to claim 5, wherein the voltage detecting part is provided with a voltage detecting terminal plate joined as superposed to the electrode tab.

9. A battery module according to claim 8, wherein the electrode tab which is nipped as superposed on the electrode tab provided with the voltage detecting terminal plate is furnished with a notch for receiving the voltage detecting terminal plate.

10. A battery module according to claim 8, wherein
    the electrode tabs are connected by ultrasonic welding and
    the electrode tab and the voltage detecting terminal plate are joined by either punch caulking or a rivet.

11. A battery module according to claim 8, wherein
    the electrode tab and the voltage detecting terminal plate are joined by either punch caulking or a rivet having a head and
    each of the insulating plates is provided with a concave part for permitting insertion therein of a convex part formed on the surface of the voltage detecting terminal plate by punch caulking or the head of the rivet on the surface of the voltage detecting terminal plate.

12. A battery module according to claim 1, wherein
    the insulating plates are provided with an aperture formed along the stacking direction,
    the plurality of electrode tabs are piled up, aligned on the aperture, and nipped by the paired insulating plates, and
    the plurality of the flat cells electrically connected by joining the electrode tabs aligning on the open window part.

13. A battery module according to claim 1, wherein
    the electrode tab is nipped by the insulating plates while part of the electrode tab aligns on the outer sides of the paired insulating plates and
    the plurality of the flat cells are electrically connected by joining the electrode tabs aligning on the outer sides of the insulating plates.

14. A battery module according to claim 1, which further comprises positive and negative battery module terminals and wherein
    the insulating plates are provided with an aperture formed along the stacking direction,
    the electrode tab and one of the battery module terminals are piled up, aligned on the aperture, and nipped by the paired insulating plates, and
    each of the battery module terminals is electrically connected to the flat cell by joining the electrode tab aligning with the aperture and the battery module terminal.

15. A battery module according to claim 14, wherein
    the plurality of superposed flat cells are joined in serial connection by electrically joining the electrode tabs of differing in electric polarity and
    the positive battery module terminal and the negative battery module terminal are electrically connected to the cells which are positioned at the opposite ends along the stacking direction.

16. A battery module according to claim 1, wherein the insulating plates are provided with an insulating layer possessing an electric insulating property and a heat sink layer possessing a greater heat radiating property than the insulating layer.

17. A battery module according to claim 1, wherein
the plurality of the electrode tabs are piled up, positioned to have the end parts thereof align on the outer sides of the insulating plates, and nipped by the paired insulating plates and
the plurality of the flat cells are electrically connected by joining the end parts of the electrode tabs aligning on the outer sides of the insulating plates.

18. A battery module according to claim 1, further comprising a case for fixing the position of the insulating plates and containing a plurality of flat cells.

19. A battery module according to claim 1, wherein each insulating plate forms a respective projecting part and a respective concave part.

20. A battery module according to claim 1, wherein the projecting part is formed in a first insulating plate and the concave part is formed in a second insulating plate.

21. A battery module according to claim 1, wherein the concave part covers the leading end of the projecting part.

* * * * *